(12) United States Patent
Treadway et al.

(10) Patent No.: US 9,174,692 B2
(45) Date of Patent: Nov. 3, 2015

(54) FOLDABLE MOBILITY DEVICE

(71) Applicant: ACTON, INC., Altadena, CA (US)

(72) Inventors: Peter Treadway, Arcadia, CA (US); Janelle Wang Treadway, Arcadia, CA (US); Enoch Morishima, Pasadena, CA (US); Jason Hill, Signal Hill, CA (US)

(73) Assignee: Acton, Inc., Altadena, CA (US)

( * ) Notice: Subject to any disclaimer, the term of this patent is extended or adjusted under 35 U.S.C. 154(b) by 0 days.

(21) Appl. No.: 14/041,904

(22) Filed: Sep. 30, 2013

(65) Prior Publication Data

US 2014/0090910 A1    Apr. 3, 2014

Related U.S. Application Data

(60) Provisional application No. 61/744,783, filed on Oct. 2, 2012, provisional application No. 61/878,531, filed on Sep. 16, 2013.

(51) Int. Cl.
*B62K 5/025* (2013.01)
*B62K 5/027* (2013.01)
*F16C 11/04* (2006.01)
*B62K 15/00* (2006.01)

(52) U.S. Cl.
CPC ............... *B62K 5/027* (2013.01); *B62K 15/00* (2013.01); *B62K 15/008* (2013.01); *F16C 11/045* (2013.01); *Y10T 403/32* (2015.01)

(58) Field of Classification Search
CPC ........ B60K 7/0007; B62K 5/02; B62K 5/023; B62K 5/025; B62D 61/06; B62D 61/08
USPC ............. 180/208, 209, 210, 211, 212, 65.51, 180/907, 908
See application file for complete search history.

(56) References Cited

U.S. PATENT DOCUMENTS

| 3,887,218 | A | * | 6/1975 | Di Blasi | 280/278 |
|---|---|---|---|---|---|
| 5,097,922 | A | * | 3/1992 | Stagi | 180/208 |
| 5,388,659 | A | * | 2/1995 | Pepe | 180/219 |
| 6,390,216 | B1 | * | 5/2002 | Sueshige et al. | 180/65.51 |
| 7,461,715 | B1 | * | 12/2008 | Tsai | 180/208 |

(Continued)

OTHER PUBLICATIONS

PCT International Search Report and Written Opinion dated Jan. 22, 2014, issued in International Application No. PCT/US2013/062758 (11 pages).

*Primary Examiner* — Frank Vanaman
(74) *Attorney, Agent, or Firm* — Finnegan, Henderson, Farabow, Garrett & Dunner, LLP

(57) ABSTRACT

A foldable mobility device includes a chassis assembly, a steering assembly rotatably coupled to the chassis assembly, a seat assembly coupled to the chassis assembly through a first folding mechanism configured to convert the seat assembly between a first folded position and a first unfolded position, a front wheel assembly coupled to the steering assembly and configured to be rotated by the steering assembly for steering the foldable mobility device, and one or more rear wheel assemblies coupled to the chassis assembly through a second folding mechanism configured to convert the one or more rear wheel assemblies between a second folded position and a second unfolded position.

16 Claims, 74 Drawing Sheets

(56) References Cited

U.S. PATENT DOCUMENTS

| | | | |
|---|---|---|---|
| 8,733,482 B2* | 5/2014 | Meyers | 180/65.51 |
| 2002/0139591 A1* | 10/2002 | Wisecarver | 180/65.1 |
| 2003/0047363 A1* | 3/2003 | Makuta et al. | 180/65.5 |
| 2007/0051548 A1 | 3/2007 | Kosco et al. | |
| 2007/0187164 A1* | 8/2007 | Yang et al. | 180/209 |
| 2009/0020350 A1 | 1/2009 | Wu | |
| 2009/0115167 A1 | 5/2009 | Chin et al. | |
| 2012/0061942 A1 | 3/2012 | Kulikov et al. | |

* cited by examiner

FOLDABLE MOBILITY DEVICE

CROSS REFERENCES TO RELATED APPLICATIONS

This application is a non-provisional application of U.S. Provisional Application No. 61/744,783, filed Oct. 2, 2012, and U.S. Provisional Application No. 61/878,531, filed Sep. 16, 2013, the contents of all of which are hereby incorporated by references.

FIELD OF THE INVENTION

This application relates to a personal transportation device in general and a foldable mobility device for personal transportation in particular.

BACKGROUND OF THE INVENTION

Personal transportation devices may provide a great deal of benefits and convenience in both urban and rural settings. For example, college students are under a lot of pressure to get to classes on time. Many schools around the world are so large that getting from one building or area on campus to another can take longer than a student has between classes. Although scooters, rollerblades, skateboards, bicycles, or cars may shorten the commute, these conventional devices all have limited functions and may be inconvenient to carry or store when not in use.

In another example, in large warehouses and facilities, workers are often required to travel a great distance in order to perform and complete their work. As a result, a great deal of production time may be wasted on getting the workers from one point to another. Gas or electric-powered vehicles are often used for many tasks in these settings. But these conventional vehicles may be very expensive to purchase and maintain so that many businesses may not be able to afford them.

Conventional gas-powered vehicles such as automobiles have caused road congestion and higher prices for gasoline. There have been efforts to replace automobiles with other forms of transportation devices such as inline skates, scooters, and Segways. These conventional devices, however, all have flaws that often raise many issues, such as legality, inconvenience, security, safety, and, thus, render them unsuitable for practical day-to-day use.

SUMMARY OF THE INVENTION

In accordance with an embodiment, a foldable mobility device includes a chassis assembly, a steering assembly rotatably coupled to the chassis assembly, a seat assembly coupled to the chassis assembly through a first folding mechanism configured to convert the seat assembly between a first folded position and a first unfolded position, a front wheel assembly coupled to the steering assembly and configured to be rotated by the steering assembly for steering the foldable mobility device, and one or more rear wheel assemblies coupled to the chassis assembly through a second folding mechanism configured to convert the one or more rear wheel assemblies between a second folded position and a second unfolded position.

In accordance with another embodiment, a foldable mobility device includes a chassis assembly, one or more rear wheel assemblies coupled to the chassis assembly through a first folding mechanism configured to convert the one or more rear wheel assemblies between a first folded position and a first unfolded position, a steering assembly rotatably coupled to the chassis assembly, the steering assembly including a second folding mechanism configured to convert the steering assembly between a second folded position and a second unfolded position, a front wheel assembly coupled to the steering assembly and configured to be rotated by the steering assembly for steering the foldable mobility device, a floor assembly coupled to the chassis assembly through a third folding mechanism configured to convert the floor assembly between a third folded position and a third unfolded position, and a seat assembly coupled to the chassis assembly through a fourth folding mechanism configured to convert the seat assembly between a fourth folded position and a fourth unfolded position.

In accordance with another embodiment, a folding mechanism for a foldable mobility device includes a center hub mounted on a chassis of the foldable mobility device and a plurality of control arms, each control arm including a first end rotatably coupled to the center hub and a second end coupled to a wheel assembly. The control arms are rotated between a first angular position and a second angular position with respect to the center hub. The control arms extend substantially laterally with respect to the chassis in the first angular position and extend substantially axially with respect to the chassis in the second angular position. The folding mechanism further comprises one or more spring elements coupled between the center hub and the respective control arms. The one or more spring elements are configured to increase resistance during the rotation of the control arms.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate one (several) embodiment(s) of the invention and together with the description, serve to explain the principles of the invention.

DESCRIPTION OF THE EMBODIMENTS

Figure 1:
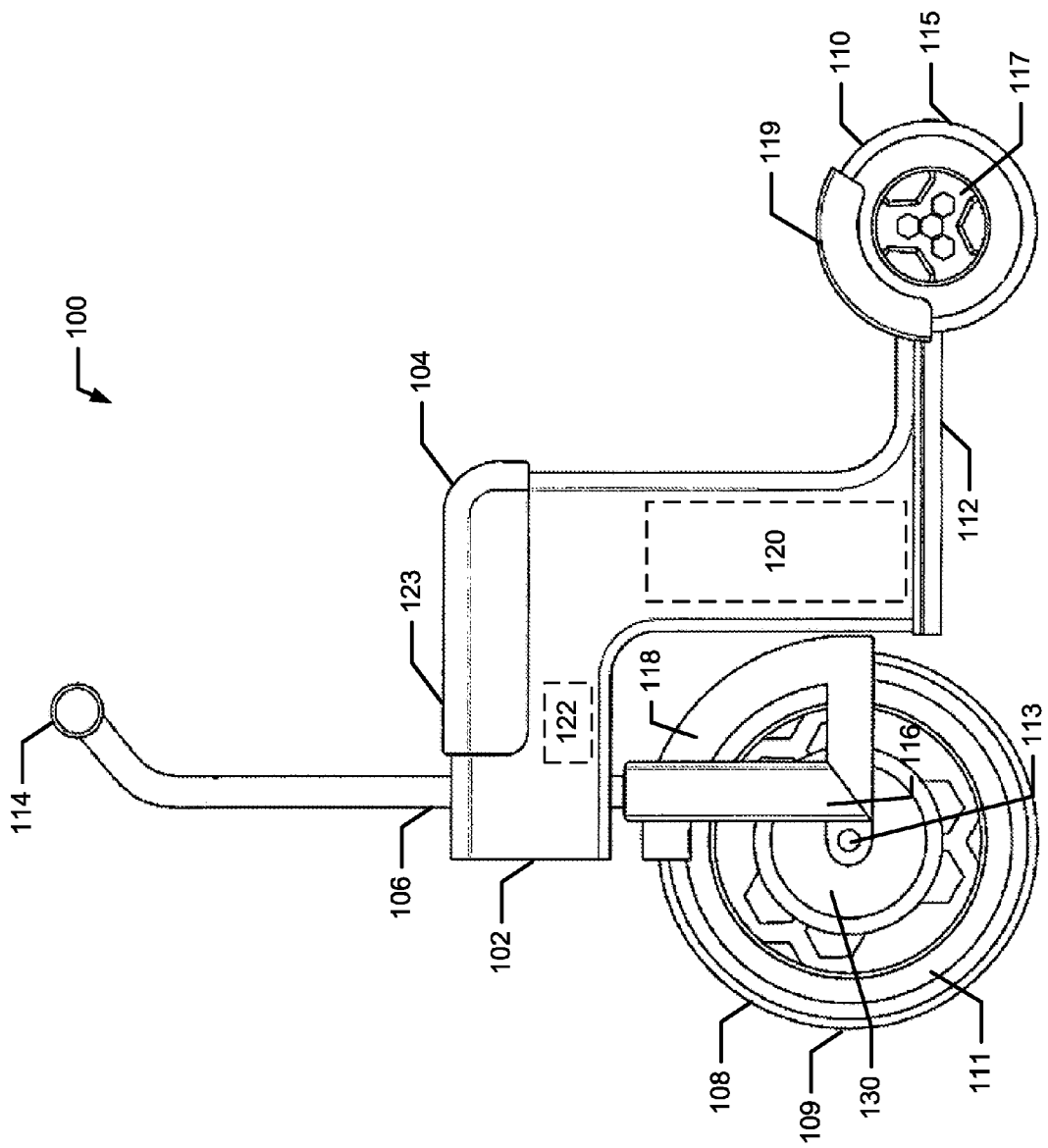
FIG. 1 shows a side view of a mobility device with a seat assembly in an unfolded position, according to one embodiment.

Reference will now be made in detail to the exemplary embodiments of the invention, examples of which are illustrated in the accompanying drawings. Wherever possible, the same reference numbers will be used throughout the drawings to refer to the same or like parts.

FIGS. 1-6 illustrate various views of a mobility device 100 according to one embodiment. Mobility device 100 may include a chassis assembly 102, a seat assembly 104, a steering assembly 106, a front wheel assembly 108, a rear wheel assembly 110, and a floor assembly 112.

Chassis assembly 102 may be made of extruded aluminum or composite material that is lightweight and strong. Chassis assembly 102 provides a structure upon which other components are mounted. Chassis assembly 102 may include an upper section, a middle section, and a base section. The middle section is configured to connect the upper section and the base section. These sections may be formed individually and coupled together or may be formed as one piece. The upper section and the middle section may form an "L" shape with the middle section being formed vertically and the upper section being formed horizontally on top of the middle section. The base section and the middle section may form another "L" shape with the base section being formed horizontally and the middle section being formed vertically on top of the base section.

The chassis assembly 102 may include an internal compartment for holding other components, such as a battery pack 120, a controller 122, an engine, or other ancillaries. Alternatively, the internal compartment of chassis assembly 102 may provide a storage space for a user of device 100 to store personal properties, such as wallets, keys, documents, or other items that may fit within the chassis. Chassis assembly 102 may further include seals for sealing the internal compartment to prevent water and dust. Accordingly, chassis assembly 102 provides protections to the components and properties stored therein from external environments.

In addition, chassis assembly 102 may include battery pack 120 configured to provide electrical power to drive device 100 and a controller 122 configured to control operation of device 100. Battery pack 120 and controller 122 may be attached to an exterior surface of chassis assembly 102. Alternatively, battery pack 120 and controller 122 may be disposed within the internal compartment of chassis assembly 102 so as to be hidden from plain view and protected from the external environments. Chassis assembly 102 may form a housing enclosing battery pack 120 and controller 122 and prevent moisture, dirt, or impacts from damaging the battery pack 120 and controller 122.

According to a further embodiment, battery pack 120 may be removable from chassis assembly 102. For example, when battery pack 120 is disposed with chassis assembly 102 under seat assembly 104, seat assembly 104 may be removed to access and remove battery pack 120. When seat assembly 104 is removed from chassis assembly 102, battery pack 120 may be slid out through a top opening of chassis assembly 102. Alternatively, battery pack 120 may also be accessed from a side surface or a bottom surface of chassis assembly 102. Chassis assembly 102 may include a panel on the side surface or the bottom surface that may be removed with or without tools to allow access to battery pack 120.

According to another embodiment, battery pack 120 may include lithium ion batteries, polymer batteries, nanophosphate batteries, lead/acid batteries, or other batteries known in the art. Alternatively, mobility device 100 may use other types of power sources, such as compressed air, diesel, biodiesel, gasoline, fuel cell, field drive, zero point, or other substances that may provide power storage/generation.

According to another embodiment, battery pack 120 may include rechargeable batteries that may be recharged from any power sources, such as a wall outlet, a solar panel, or other sources known in the art. Mobility device 120 may include a charging system, such as a transformer, integrated therein so that battery pack 120 may be charged in the device. The charging system may include a power line with a power plug for drawing power from a power source, such as a wall outlet so that battery pack 120 may be recharged when not in use. Thus, it is not required to remove the battery pack for recharging. When not used for charging, the power line may be rewound or retracted for storage in device 100. Alternatively, battery pack 120 may be interchanged so that the user may carry a fully-charged spare battery pack and replace the drained battery pack with the fully-charged one.

In another embodiment, device 100 may include mechanisms for adding additional battery packs that may be mounted to the device itself or the user. According to another embodiment, mobility device 100 may be powered by a power source that is attached to the user. For example, the mobility device may draw power from a battery belt attached to the user. The battery belt may be slim enough to be worn by the user under clothing as comfortably as a regular leather belt. Alternatively, the battery pack may be part of the clothing that a user wears for day-to-day activities.

As further shown in FIGS. 1, 2, 9, and 10, seat assembly 104 may include a seat portion 123 coupled to chassis assembly 102 by a folding mechanism 124. Seat portion 123 may include a base with a cushion mounted thereon to provide a comfortable seat to a user of device 100. The base of seat portion 123 may have an elongated opening having a width that is slightly greater than a width of chassis assembly 102. Thus, seat portion 123 may be coupled to chassis assembly 102 through the elongated opening. Alternatively, the base of seat portion 123 may be slightly narrower than an opening disposed on top of chassis assembly 102. Accordingly, chassis assembly 102 may receive the base of seat portion 123 when seat portion 123 is coupled to chassis assembly 102. When coupled to chassis assembly 102, seat portion 123 serves as a cover to seal the internal compartment of chassis assembly 102.

Folding mechanism 124 may include a first end coupled to the base of seat portion 123 and a second end coupled to chassis assembly 102. According to an embodiment, the first end and the second end of folding mechanism 124 may include rotatable joints coupled to seat portion 123 and chassis assembly 102, respectively. The rotatable joints on chassis assembly 102 may be in proximity to a corner of the "L" shape formed by the upper section and the middle section of chassis assembly 102. The rotatable joints allow folding mechanism 124 to be rotated with respect to seat portion 123 and chassis assembly 102 so that seat portion 123 may be converted from a folded position A to an unfolded position B. In folded position A, seat portion 123 is coupled to chassis assembly 102 and supported by chassis assembly 102 through the coupling between chassis assembly 102 and the base of seat portion 123. In unfolded position B, seat portion 123 is decoupled from chassis assembly 102 and supported by folding mechanism 124 that extends in a pre-determined angular position between seat portion 123 and chassis assembly 102. The first end of folding mechanism 124 may further include lock members configured to maintain seat portion 123 at a substantially horizontal position and support members configured to support an additional weight when the user sits on seat portion 123.

Alternatively, the first end and the second end of folding mechanism 124 may include sliding joints that allow folding mechanism 124 to slide with respect to seat portion 123 and chassis assembly 102. Accordingly, seat portion 123 may be converted from the folded position A to the unfolded position B by sliding folding mechanism 124 with respect to seat portion 123 and/or chassis assembly 102. The sliding joints may further including lock members that may be engaged to maintain the relative position between folding mechanism 124 and seat portion 123 and the relative position between folding mechanism 124 and chassis assembly 102.

Figure 7:
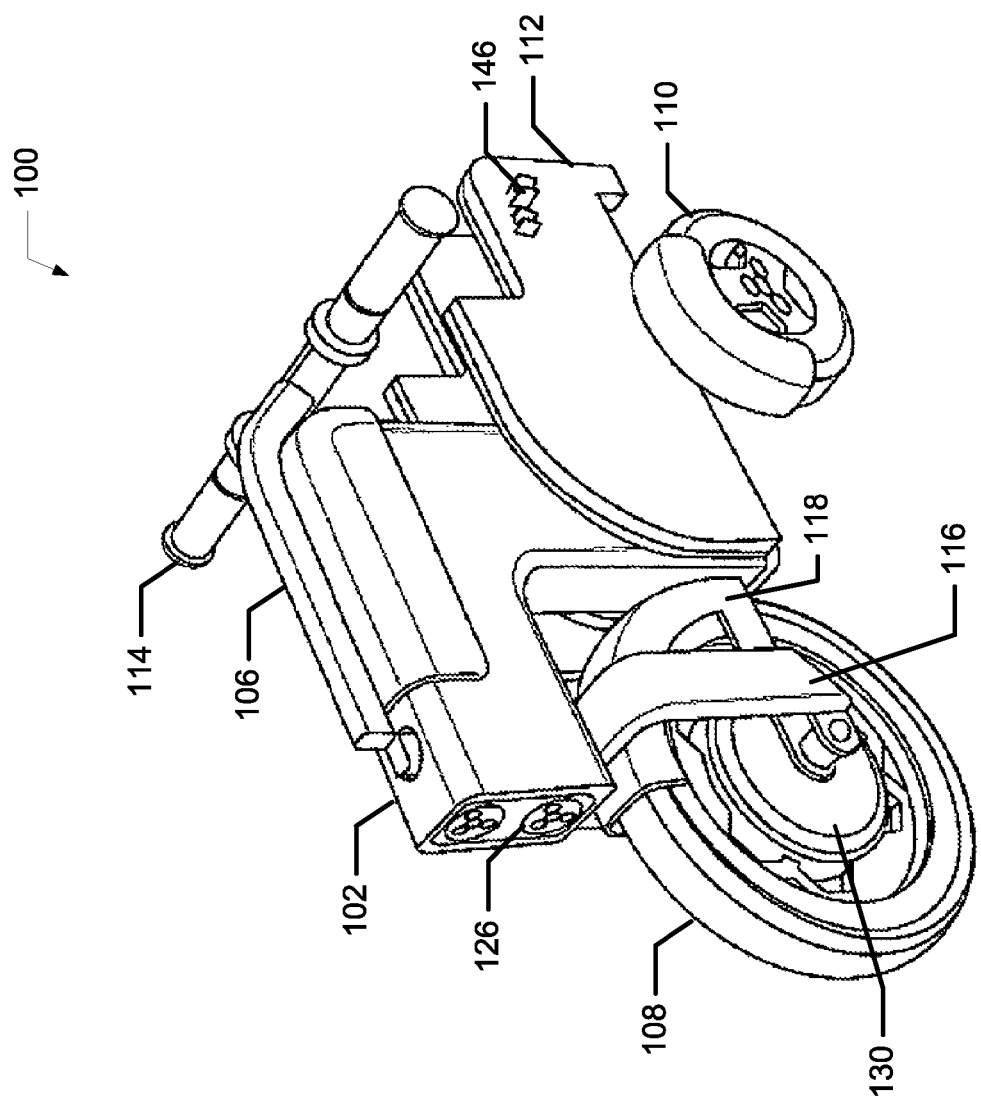
FIG. 7 is an oblique view of the mobility device in a folded state, according to one embodiment.

Steering assembly 106 may include a vertical section passing through a vertical shaft housing disposed in a front portion of the upper section of chassis assembly 102. The vertical section of steering assembly 106 may be coupled to chassis assembly 102 through a rotatable joint, such as a bearing disposed in the shaft housing. Thus, steering assembly 106 may be rotated with respect to chassis assembly 102. The vertical section of steering assembly 106 may include an upper portion and a lower portion connected by a folding mechanism, such as a hinge or other rotatable joints. The vertical section of steering assembly 106 may be folded by pivoting the upper portion forwards or backwards (FIG. 7) through the folding mechanism. When folded, the upper portion may rest on a top surface of chassis assembly 102 as shown in FIG. 7.

Steering assembly 106 may further include a horizontal section 114 coupled to the vertical section and extending laterally. Horizontal section 114 may include handle bars disposed towards distal ends of horizontal section 114. The handle bars provide comfort and security for the user to hold onto horizontal section 114 and control a direction of device 100.

Steering assembly 106 further includes a suspension assembly 116 coupled to a lower end of the vertical section of steering assembly 106. Suspension assembly 116 includes one or more struts for supporting front wheel assembly 108. The user may control a direction of travel of device 100 by rotating horizontal section 114 through the handle bars. Accordingly, suspension assembly 116 may cause front wheel assembly 108 to point to a desired direction of travel.

Front wheel assembly 108 may include a tire 109 mounted on a rim 111. Rim 111 may be mounted to suspension assembly 116 through a shaft 113. Thus, front wheel assembly 116 may be rotated freely around the shaft 113. A mud cover 118 may be disposed above a top portion of tire 109 and supported by shaft 113 or suspension assembly 108. Mud cover 118 provides protection to front wheel assembly 108 and shields other components and the user from the water or dirt dispensed from tire 109.

According to an embodiment, front wheel assembly 108 may further include an electric motor 130 disposed between rim 111 and shaft 113. Electric motor 130 may be a wheel hub motor that is mounted on shaft 113 coaxially with rim 111. Electric motor 130 may receive electrical power from battery pack 120 to drive front wheel assembly 108 to rotate around shaft 113. Electric motor 130 may also receive control signals from controller 122 for controlling the rotation of front wheel assembly 108. For example, the control signals may control a rotational speed of front wheel assembly 108 or a rotational direction of front wheel assembly 108.

The electrical power and control signals may be transmitted from battery pack 120 and controller 122 through power lines and control lines routed through steering assembly 106. In particular, the vertical section of steering assembly 106 and the struts of suspension assembly 116 may have tunnels for passing through the power lines and control lines from chassis assembly 102 to motor 130.

Rear wheel assembly 110 may include a tire 115 mounted on a rim 117. As further shown in FIG. 12, which illustrates a bottom view of device 100 according to an embodiment, rim 117 may be mounted to chassis assembly 102 through a folding mechanism 142. Folding mechanism 142 may include one or more control arms connected between rim 117 and chassis assembly 102. Folding mechanism 142 may further include rotatable joints to allow rear wheel assembly 110 to move in vertical and horizontal directions with respect to chassis assembly 102.

Figure 12:
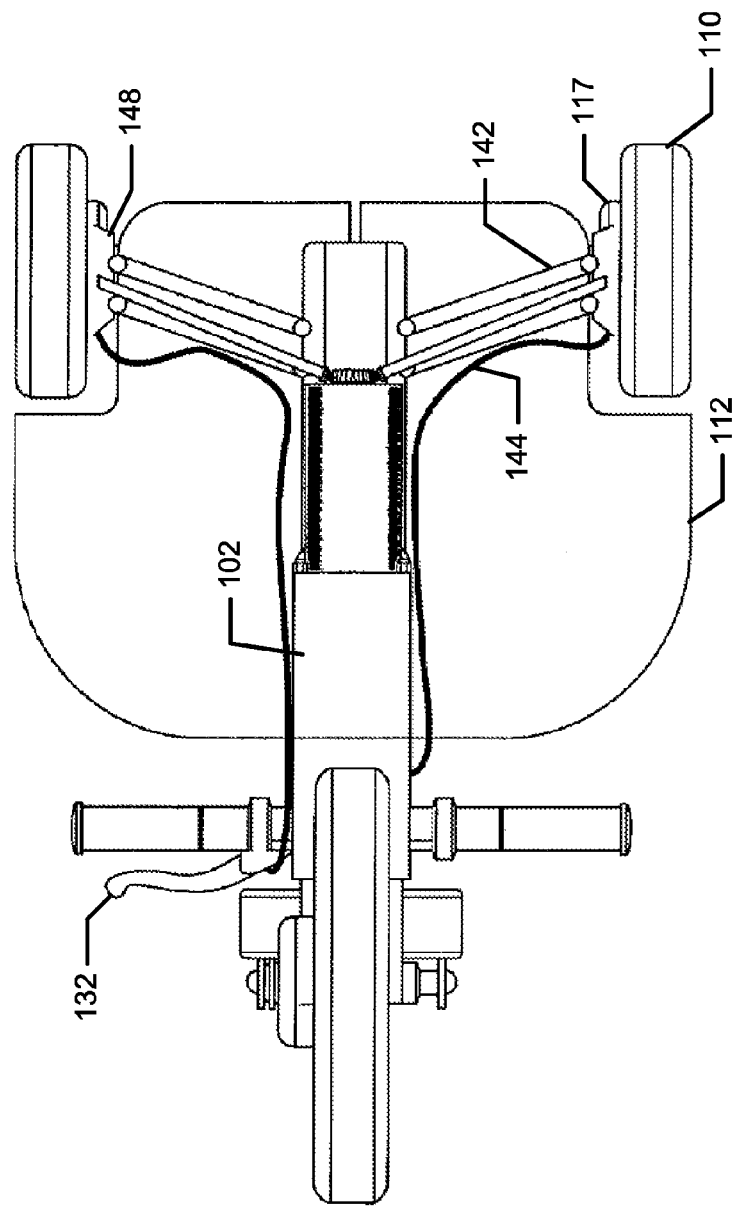
FIG. 12 shows a bottom view of the mobility device, according to one embodiment.

In an embodiment, rear wheel assembly 110 may be converted between a folded position and an unfolded position by rotating or pivoting folding mechanism 142. Folding mechanism 142 may be rotated or pivoted forwards with respect to chassis assembly 102 to convert rear wheel assembly 110 to the folded position (FIG. 7). Accordingly, rear wheel assembly 110 moves forwards and inwards with respect to chassis assembly 102 and near a side surface of chassis assembly 102. Folding mechanism 142 may be rotated or pivoted backwards with respect to chassis assembly 102 to convert rear wheel assembly 110 to the unfolded position (FIG. 12). Accordingly, rear wheel assembly 110 moves backwards and outwards with respect to chassis assembly 102.

Alternatively, folding mechanism 142 may be rotated or pivoted backwards with respect to chassis assembly 102 to convert rear wheel assembly 110 to the folded position. Accordingly, rear wheel assembly 110 moves backwards and inwards with respect to chassis assembly 102. Folding mechanism 142 may be rotated or pivoted forwards with respect to chassis assembly 102 to convert rear wheel assembly 110 to the unfolded position. Accordingly, rear wheel assembly 110 moves forwards and outwards with respect to chassis assembly 102.

In an alternative embodiment, folding mechanism 142 may include retractable or telescopic members that couple rear wheel assembly 110 to chassis assembly 102. The retractable members may be retracted or extended to convert rear wheel assembly 110 between the folded and unfolded positions.

In one embodiment, folding mechanism 142 may independently connect multiple rear wheel assemblies 110 to chassis assembly 102. Thus, folding mechanism 142 may allow rear wheel assemblies 110 and corresponding floor boards 112A and 112B to operate independently from each other. Folding mechanism 142 may further include spring elements and/or strut elements so as to allow rear wheel assemblies 110 and corresponding floor boards 112A and 112B to adapt to any inconsistencies or variations in a ground surface and provide comfortable and smooth traveling experience to the user in different terrains. Alternatively, folding mechanism 142 may provide a rigid coupling between chassis assembly 102 and rear wheel assemblies 110. Thus, when floor boards 112A and 112B are unfolded and rest on folding mechanism 142, they are connected to the chassis assembly through the rigid coupling.

Figure 11:
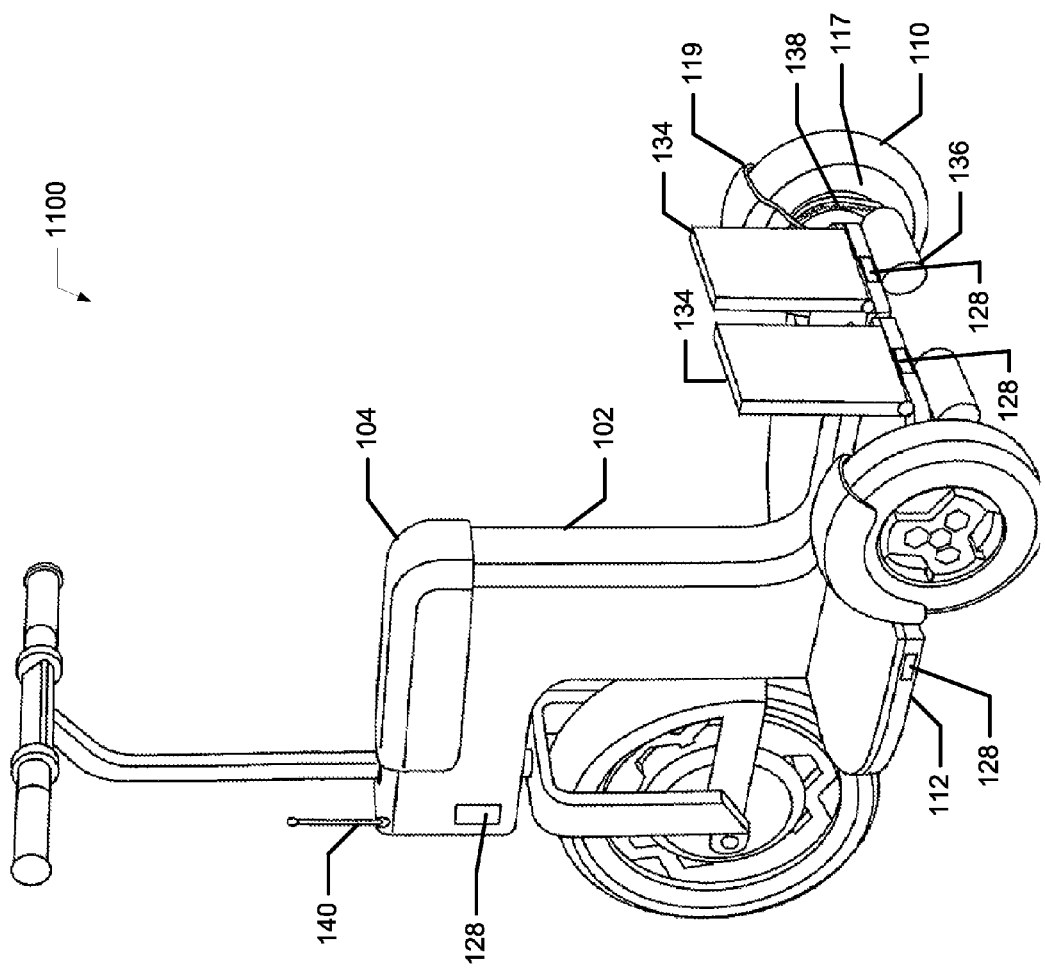
FIG. 11 shows an oblique view of the mobility device with a motor coupled to a rear wheel assembly, according to one embodiment.

As further shown in FIG. 11, rear wheel assembly 110 may further include an electric motor 136 for device 100. Electric motor 136 may be secured to floor assembly 112 or chassis assembly 102 through a motor bracket. Electric motor 136 may be coupled to rim 117 through a transmission assembly including meshed gears mounted to electric motor 136 and rim 117. Alternatively, the transmission assembly may include a transmission chain 138 and configured to transfer the rotational power from motor 136 to rim 117.

Similar to front wheel assembly 108, rear wheel assembly 110 may receive electrical power and control signals from battery pack 120 and controller 122, respectively. The electrical power and control signals may be transmitted through power lines and signal lines routed through chassis assembly 102 and suspension assembly 116.

According to a further embodiment, a mud cover 119 may be coupled to rear wheel assembly 110 and mounted on floor assembly 112. Similar to mud cover 118, mud cover 119 may provide protection to rear wheel assembly 110 and shield the user and other components from water and dirt dispensed from rear wheel assembly 110.

Although FIGS. 1-13 illustrate that device 100 has one front wheel assembly 108 and two rear wheel assemblies 110, one skilled in the art will appreciate upon reading this disclosure that any number of front wheel assemblies 108 and any number of rear wheel assemblies 110 may be mounted on device 100. One or more of these assemblies may include motors similar to motor 130 or 136 for driving device 100.

Floor assembly 112 may include a first floor board 112A and a second floor board 112B coupled to respective sides of chassis assembly 102 through rotational joints. Each one of floor board 112A and 112B may be converted between a folded position and an unfolded position.

In the unfolded position, as shown in FIGS. 1-6, 9, 12, and 13, floor boards 112A and 112B are positioned horizontally and extend laterally from the respective sides of chassis assembly 102. Thus, floor boards 112A and 112B provide a platform sufficient to accommodate a user. In the unfolded position, floor boards 112A and 112B may rest on respective rear wheel assemblies 110 or folding mechanism 142 for rear wheel assemblies 110. Accordingly, folding mechanism 142 provides additional support to floor boards 112A and 112B in the unfolded position. Each one of floor boards 112A and 112B may include a locking member 146 mounted on a bottom surface of respective floor boards 112A and 112B. Locking member 146 may include an opening that is aligned with and receives the control arms of the folding mechanism 142 when the floor board rests thereon. Thus, locking member 146 secures the floor board to folding mechanism 142 and prevents the floor board from being accidentally detached during traveling.

Figure 8:
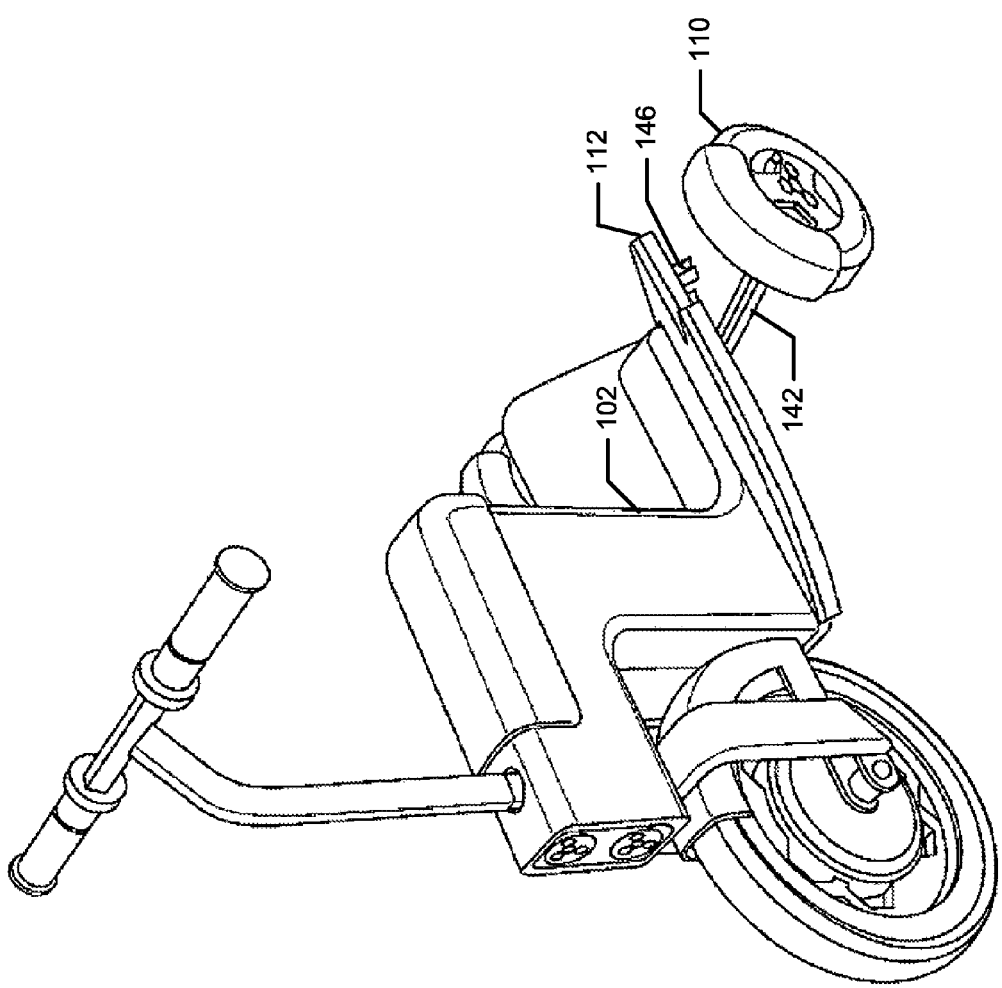
FIG. 8 shows a folding process of the mobility device, showing a floor board being folded, according to one embodiment.

When converted from the unfolded position to the folded position, floor boards 112A and 112B may be rotated upwards around the rotational joints between chassis assembly 102 and the respective floor boards. In the folded position, floor boards 112A and 112B may extend vertically and rest against respective side surfaces of chassis assembly 102. When both floor boards 112A and 112B and rear wheel assemblies 110 are converted to the folded position, floor boards 112A and 112B may rest between chassis assembly 102 and respective rear wheel assemblies 110, as shown in FIG. 7. In another embodiment, as shown in FIG. 8, floor boards 112A and 112B are folded or partially folded before the folding of rear wheel assemblies 110 are initiated, thereby preventing interference between floor boards 112A and 112B and respective rear wheel assemblies 110.

As further shown in FIG. 11, floor boards 112A and 112B may each include a guard element 134. Guard element 134 may be coupled to a rear portion of the respective floor board through a rotational joint. When in use, guard elements 134 may be raised and locked to a vertical, unfolded position (as shown in FIG. 11) to prevent the user from moving off floor boards 112A and 112B. When not in use, guard elements 134 may be rotated forwards and rest on a top surface of the respective floor board. Alternatively, guard elements 134 may be rotated backwards to a bottom surface of the respective floor board.

Figure 2:
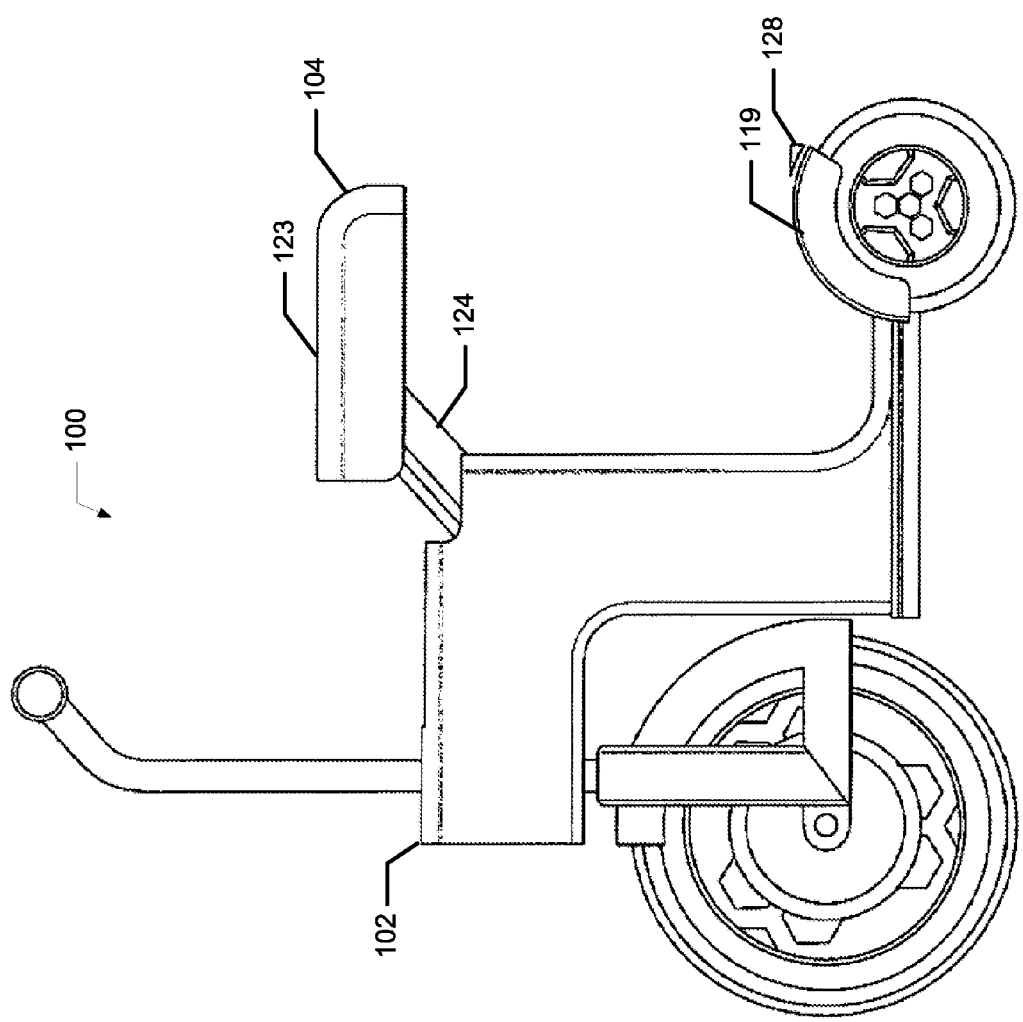
FIG. 2 shows a side view of the mobility device with the seat assembly in an unfolded position, according to one embodiment.
Figure 3:
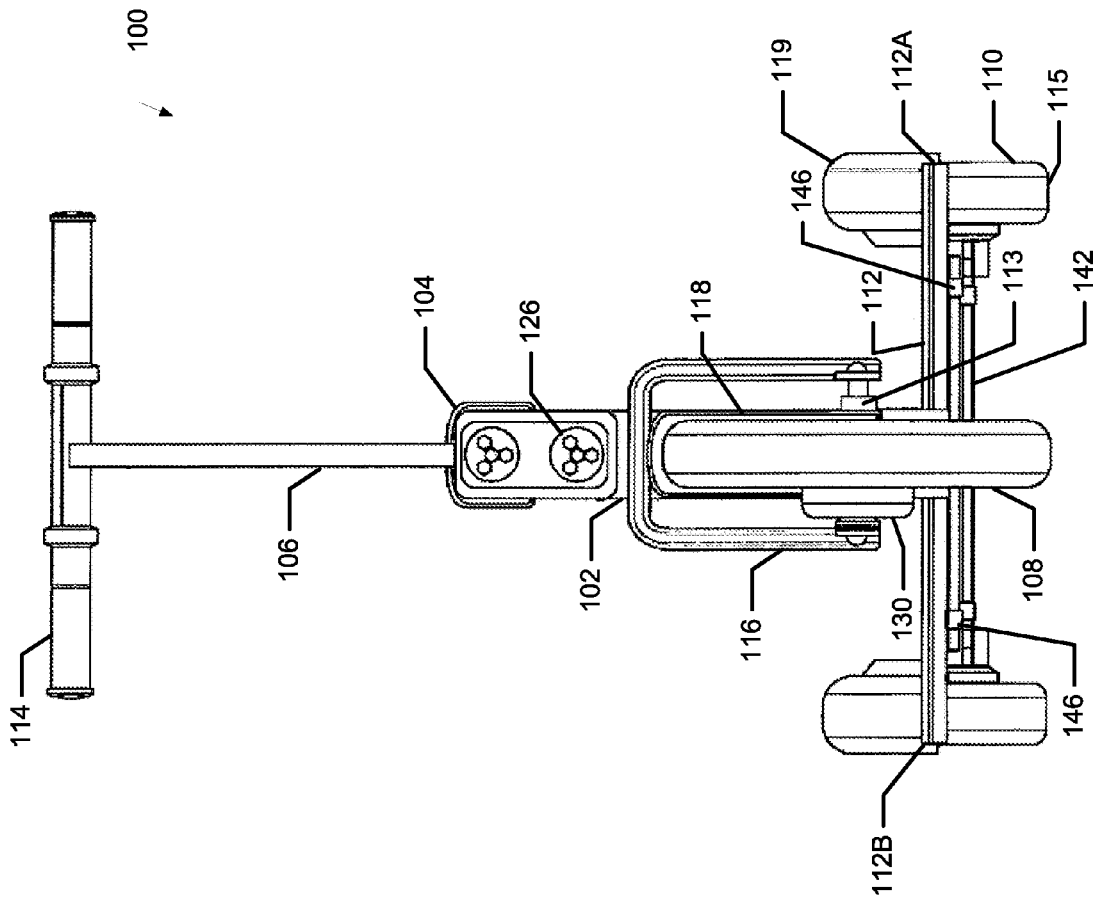
FIG. 3 is a front view of the mobility device, according to one embodiment.
Figure 4:
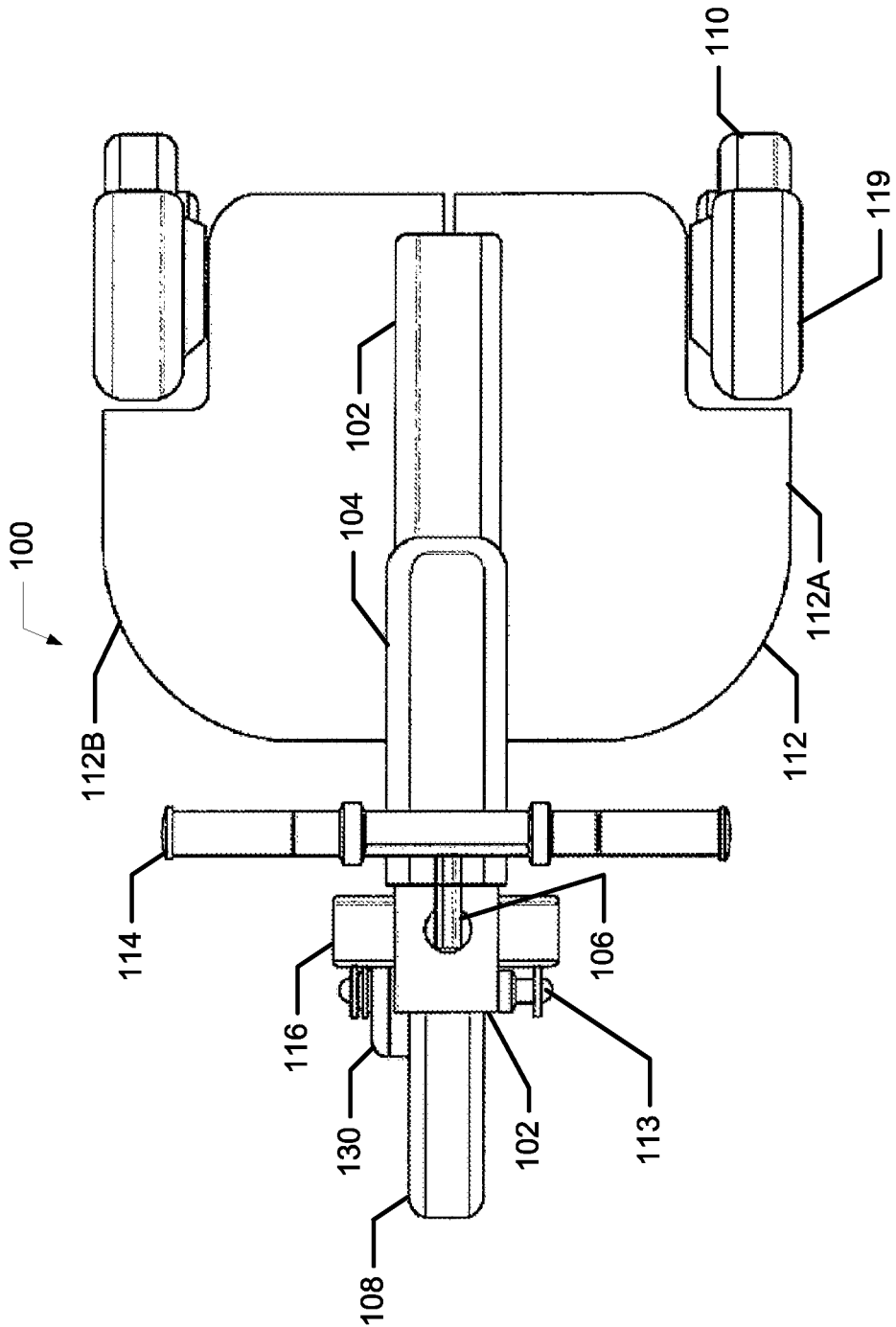
FIG. 4 is a top view of the mobility device with the seat assembly in the folded position, according to one embodiment.
Figure 5:
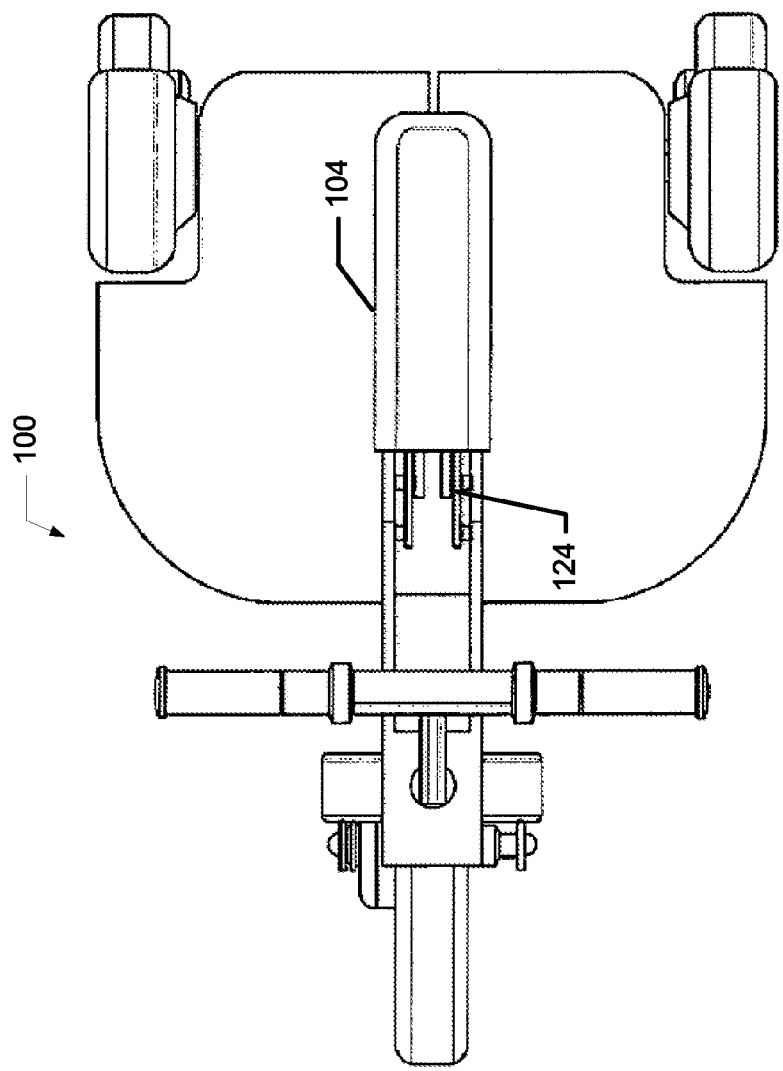
FIG. 5 is a top view of the mobility device with the seat assembly in the unfolded position, according to one embodiment.
Figure 6:
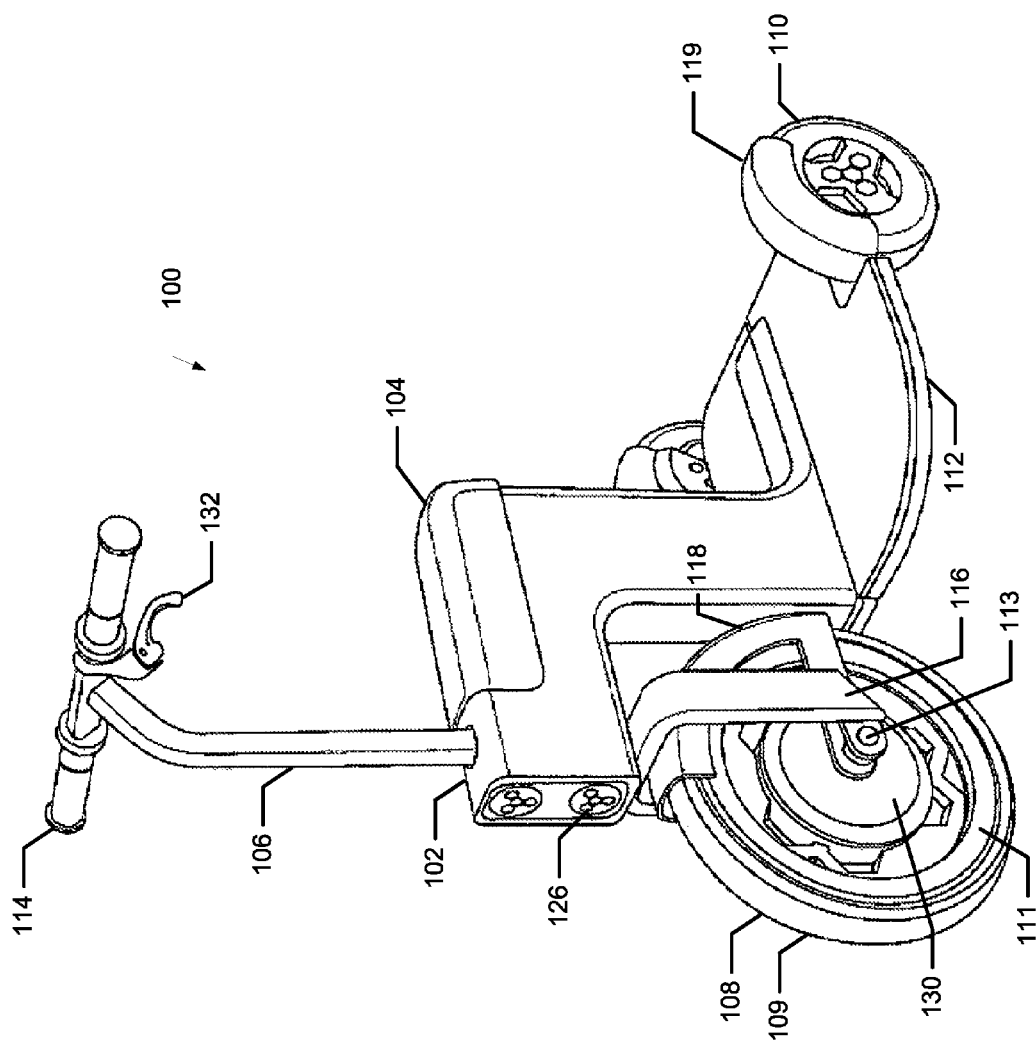
FIG. 6 is an oblique view of the mobility device, according to one embodiment.

According to an embodiment, as shown in FIGS. 2 and 6, device 100 may further include one or more lighting elements 126 mounted thereon to illuminate an environment at night or indoors. Lighting elements 126 may be mounted on a front portion of chassis assembly 102 and configured to generate forward light beams. Lighting elements 126 may drawing electric power from battery pack 120. Lighting elements 126 may include a halogen bulb, an LED bulb, a neon bulb, or other devices known in the art for generating visible light.

Figure 13:
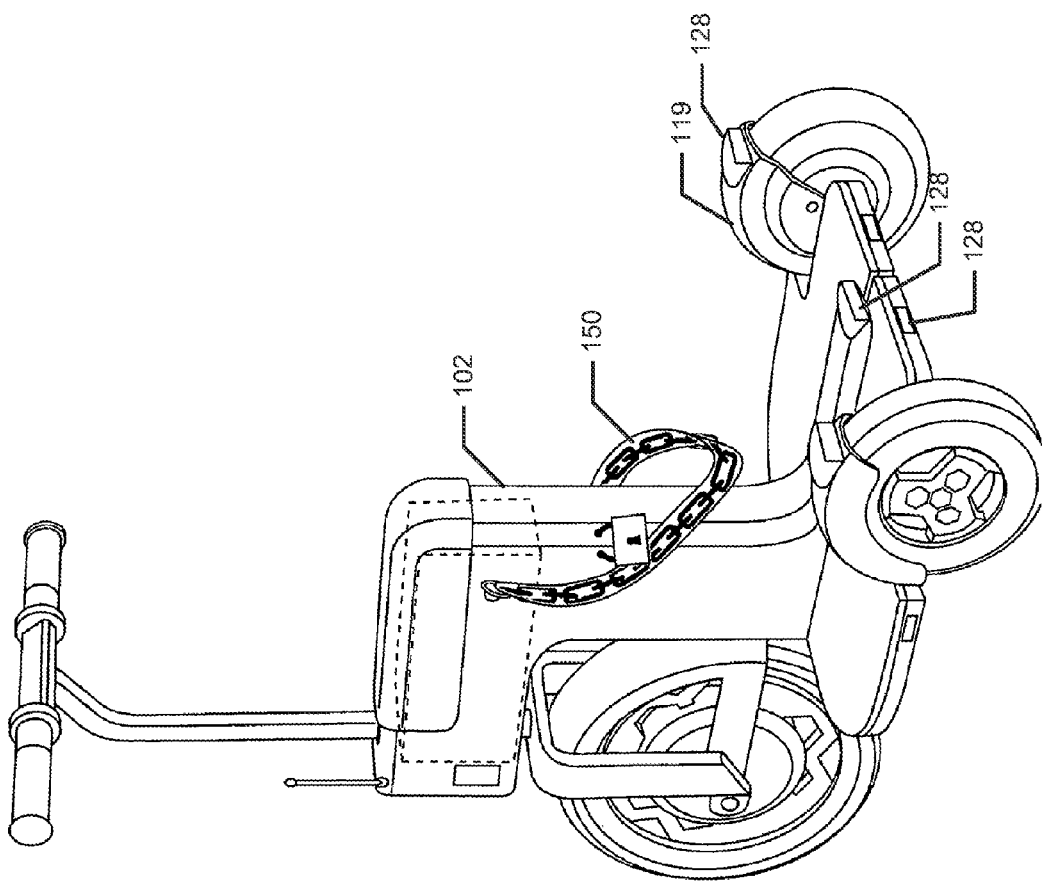
FIG. 13 shows another oblique view of the mobility device with a lock and taillights, according to one embodiment.

In a further embodiment, as shown in FIGS. 2, 11, and 13, device 100 may further include one or more reflective elements 128. Reflective elements 128 may be disposed on a side surface of chassis assembly 102, a side or rear surface of floor boards 112A and 112B, on mud cover 119, or any other components of device 100. Reflective elements 128 may reflect ambient light or directional light from the environment or other light sources, thereby signaling the presence of device 100 to others. Thus, reflective elements 128 may increase visibility of device 100 and provide improved safety at night.

As further shown in FIG. 13, device 100 may include a lock assembly 146 configured to secure device 100 to a stationary or large object, such as a tree, a guard rail, a utility pole, an automobile, etc. Lock assembly 146 may include a cable system and a lock. The cable system may be wrapped around a portion of the stationary or large object and attach device 100 thereto. The lock may be configured to secure the attachment between device 100 and the stationary or large object to prevent others from removing device 100 without a key to the lock. When not in use, lock assembly 146 may be retracted within chassis assembly 102.

In another embodiment, device 100 includes a throttle controller for the user to control the speed of device 100. For example, the hand bar of steering assembly 106 may be coupled to controller 122 and may be rotated by the user to generate a throttle control signal. Controller 122 may control the rotational speed of the motors in front wheel assembly 108 or rear wheel assembly 110 according to the throttle control signal. Alternatively, one or more floor boards 112A and 112B may include a foot pedal configured to generate the throttle control signal. When the user operates the foot pedal, controller 122 may receive the throttle control signal and control the rotational speed of the motors in front wheel assembly 108 or rear wheel assembly 110 accordingly.

In an alternative embodiment, sensors, such as gyroscopic sensors or pressure sensors, may be disposed in device 100. The sensors may be configured to determine motions or gestures of the user and generate commands for controlling device 100 according to the motions or gestures of the user. For example, when the user leans or shifts his/her weight in a particular direction or manner, the sensors may determine the direction of leaning and generate a control command to cause device 100 to move in that direction. Accordingly, device 100 may move forwards or rearwards or turn left or right, according to the motions or gestures of the user. Additionally, device 100 may further include a plurality of buttons disposed on the handle bar, chassis assembly 102, or other components and configured to provide a variety of functions, such as turning on/off device 100, turning on/off light 126, etc.

Figure 9:
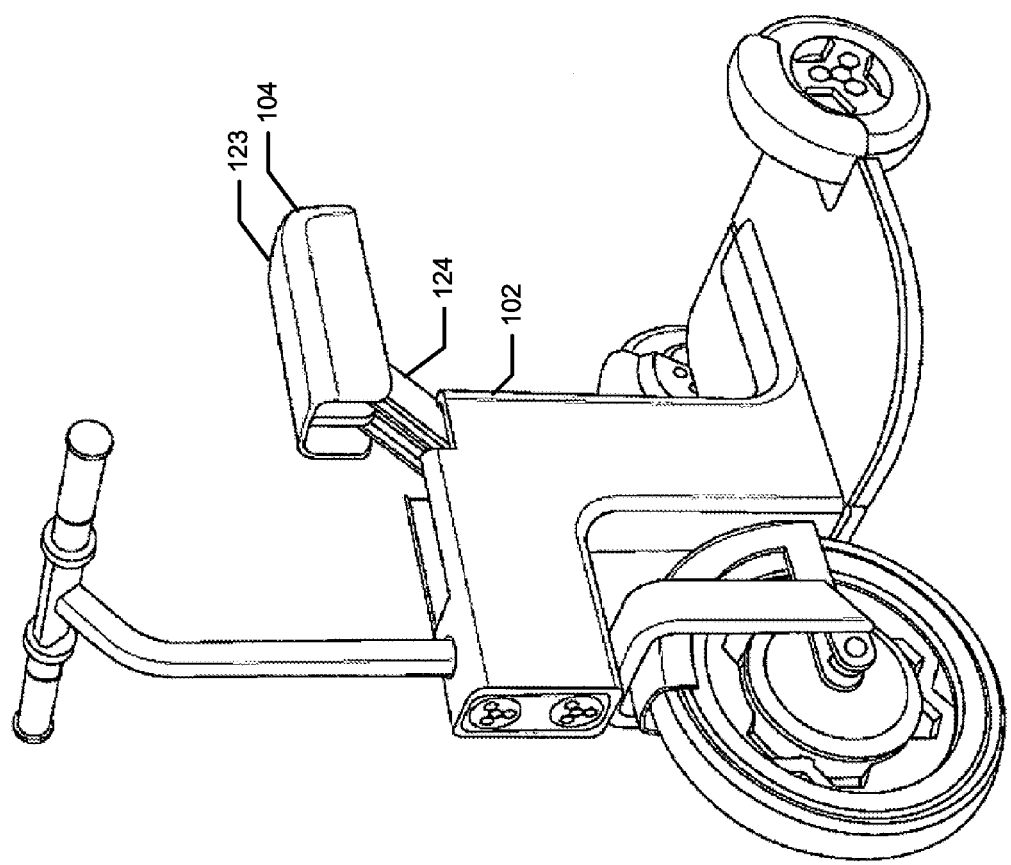
FIG. 9 shows an oblique view of the mobility device with the seat assembly in the unfolded position, according to one embodiment.
Figure 10:
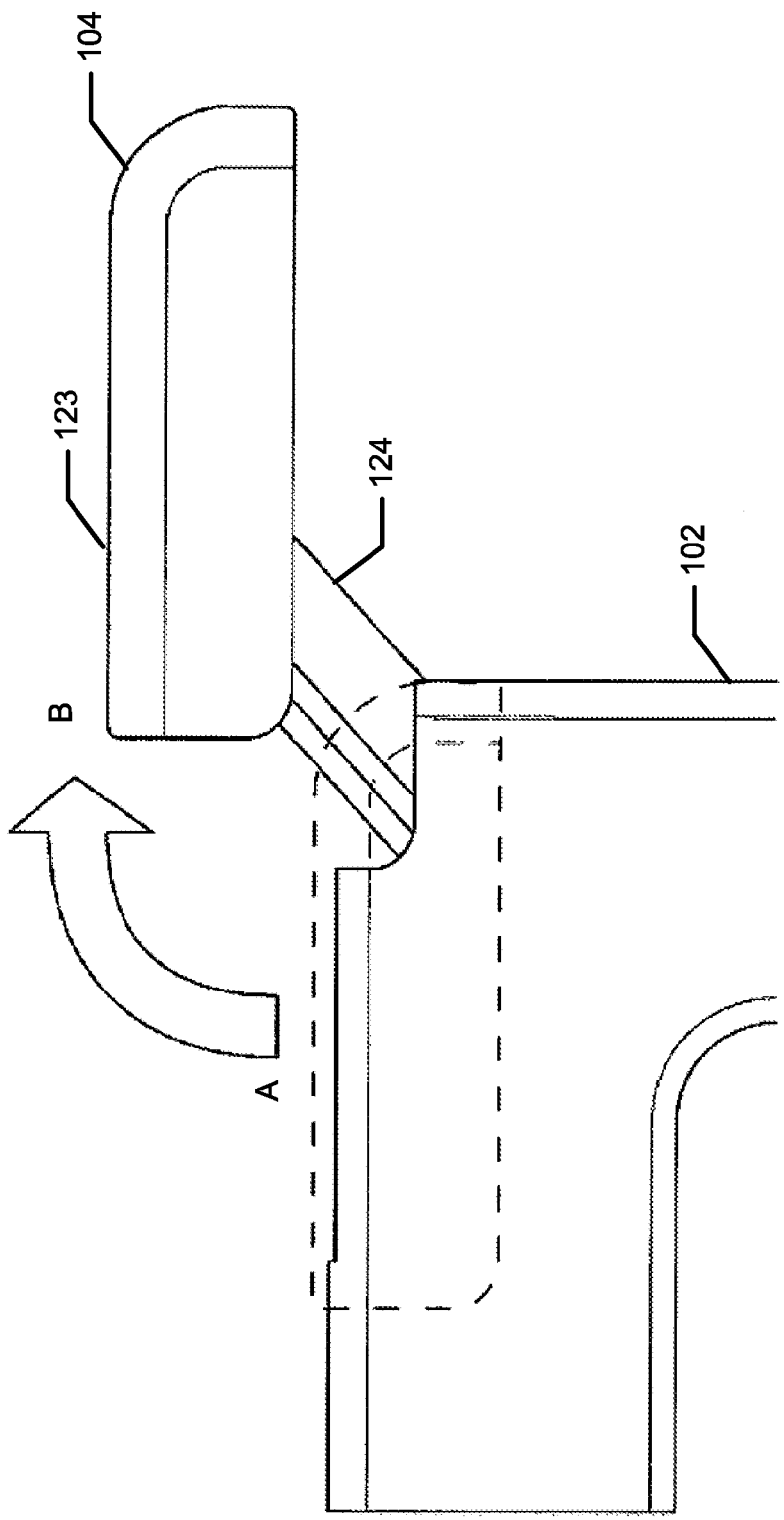
FIG. 10 shows the seat assembly being converted from the folded position to the unfolded position, according to one embodiment.

In an embodiment, device 100 may be converted from an unfolded state, as shown in FIGS. 2 and 9, to a folded state, as shown in FIG. 7. For example, seat assembly 104 may be folded by pivoting or rotating folding mechanism 124 forwards so that seat portion 123 may be coupled to and rest on a top portion of chassis assembly 102. Steering assembly 106 may be folded by pivoting the upper portion from the vertical, unfolded position to the substantially horizontal, folded position and rest on folded seat assembly 104. Alternatively, the upper portion of steering assembly 106 may be pivoted forwards and downwards so that the upper portion may rest against front wheel assembly 108. In another embodiment, horizontal section 114 of steering assembly 106 may be rotated 90 degrees with respect to the vertical section, to further reduce the lateral dimension of device 100. Alternatively, horizontal section 114 may be conveniently removed when desired.

Floor assembly 112 may be folded by pivoting or rotating floor boards 112A and 112B from respective substantially horizontal, unfolded positions to substantially vertical, folded positions. Floor boards 112A and 112B in their folded positions may rest in proximity to and against respective side surfaces of chassis assembly 102.

Rear wheel assemblies 110 may be converted from the unfolded position to the folded position by pivoting respective folding mechanism 142 forwards. Thus, rear wheel assemblies 110 may move forwards and inwards and rest in proximity to and against respective folded floor boards 112A and 112B. Alternatively, folding mechanism 142 may be pivoted backwards to bring rear wheel assemblies 110 backwards and inwards to the folded positions. Still alternatively, rear wheel assemblies 110 may be folded to the folded position by retracting the telescopic members of folding mechanism 142, so that rear wheel assemblies 110 may be moved inwards and rest against respective floor boards 112A and 112B.

In another embodiment, front wheel assembly 108 may be rotated 90 degrees with respect to chassis assembly 102 to a folded position and locked in the folded position. Thus, the axial dimension, measuring the dimension of device 100 from front to back, may be further reduced.

In another embodiment as shown in FIGS. 6 and 12, device 100 may include a brake system having one or more brake levers 132, brake lines 144, and one or more braking assemblies 148. Brake levers 132 may be coupled to the horizontal or vertical section of steering assembly 106 and operated by the user. Brake levers 132 may also include a foot pedal coupled to chassis assembly 102 or floor assembly 112 and operated by the user. Braking assembly 148 may be integrated with front wheel assembly 108 or rear wheel assembly 110 and include a disk, a clamp, or a pad. Alternatively, braking assembly 148 may include a regenerative brake system or an electrical motor operating in a braking mode, which applies braking force to device 100 by converting kinetic energy of device 100 to electrical energy that is stored in battery pack 120. Braking assembly 148 may also include other components for applying a braking force to decelerate mobility device 100. In one embodiment, the brake system may be a mechanical system. Thus, when the user operates lever 132, lever 132 may pull brake lines 144 to engage braking assemblies 148, thereby generating the braking force. In another embodiment, the braking system may be a hydraulic system. Thus, when the user operates lever 132, lever 132 may transmit a hydraulic pressure signal through brake lines 144, thereby engaging braking assemblies 148. In another embodiment, the braking system may be an electronic-mechanical system. Thus, when the user operates lever 132, lever 132 may generate and transmit an electrical brake signal through brake lines 144, thereby engaging braking assemblies 148. According to another embodiment, mobility device 102 may include a regenerative brake system that recharges battery pack 120 when the brake is applied or when the device decelerates.

FIGS. 14-19 illustrate various views of a foldable mobility device 200 according to another embodiment. Device 200 may include a chassis assembly 202, a seat assembly 204, a steering assembly 206, a front wheel assembly 208, a rear wheel assembly 210, and a floor assembly 212. The components of device 200 generally correspond to those of device 100 depicted in FIGS. 1-13. For example, at least one of front wheel assembly 208 and rear wheel assembly 210 includes an electric motor integrated in a wheel hub therein and configured to drive device 200. The electric motor may receive electric power from a battery pack and control signals from a controller. The battery pack and the controller may be coupled externally to device 200 or disposed internally within device 200.

The components of device 200 (e.g., chassis assembly 202, seat assembly 204, steering assembly 206, front wheel assembly 208, rear wheel assembly 210, and floor assembly 212) may each include a folding mechanism (e.g., 216, 218, 220, and 222) for converting between a folded position and an unfolded position. Folding mechanisms 216, 218, 220, and 222 may each include a rotatable joint, a hinge, a lever, a strut, an arm, a bendable member, etc. When the components are in their folded positions, device 200 is converted to a significantly smaller structure similar to those shown in FIGS. 7 and 66-71 with a relatively more regular shape, such as rectangular, square, disk, etc. Thus, device 200, when folded, may be conveniently stored or even placed in a suitcase or a backpack and carried by a user for easy transportation or storage.

Figure 14:
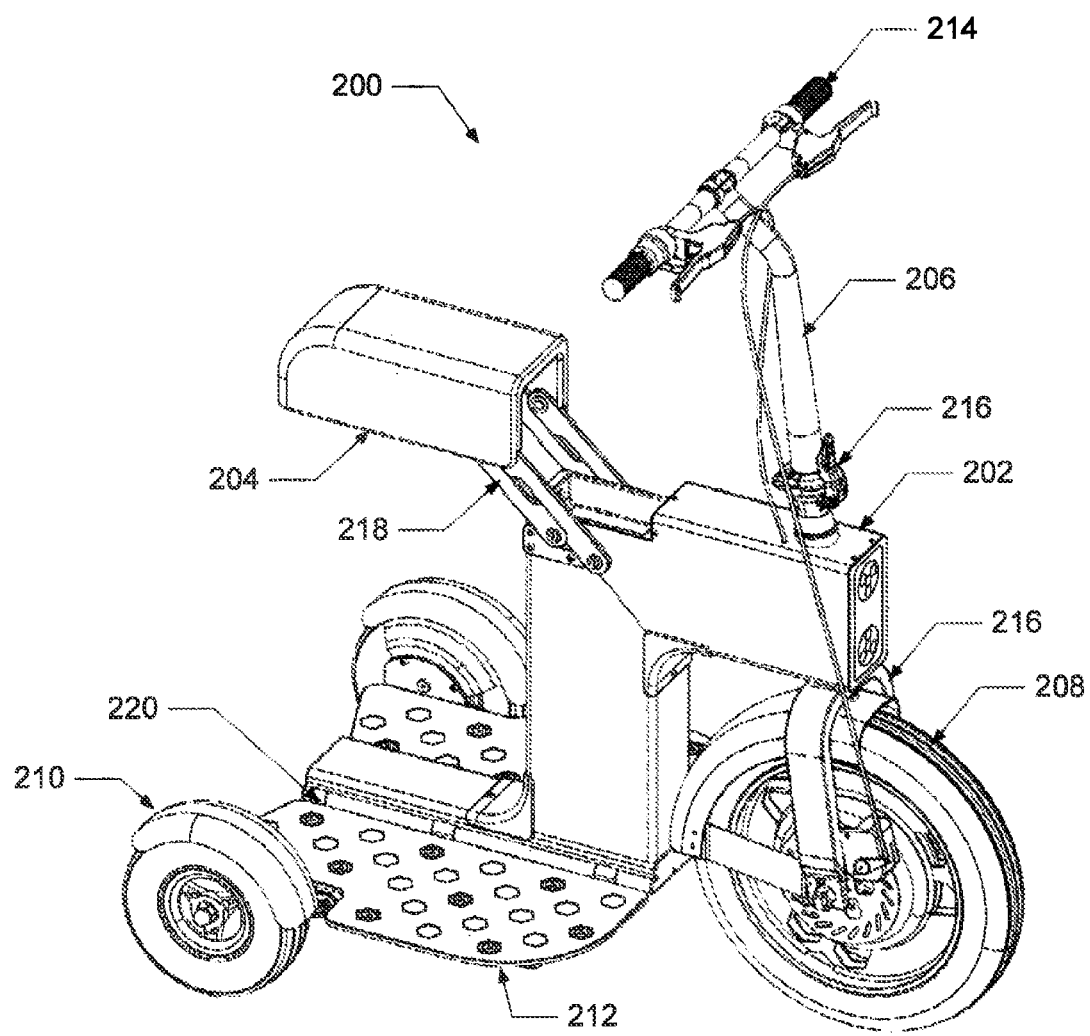
FIG. 14 illustrates an oblique view of a mobility device in an unfolded state, according to another embodiment.
Figure 15:
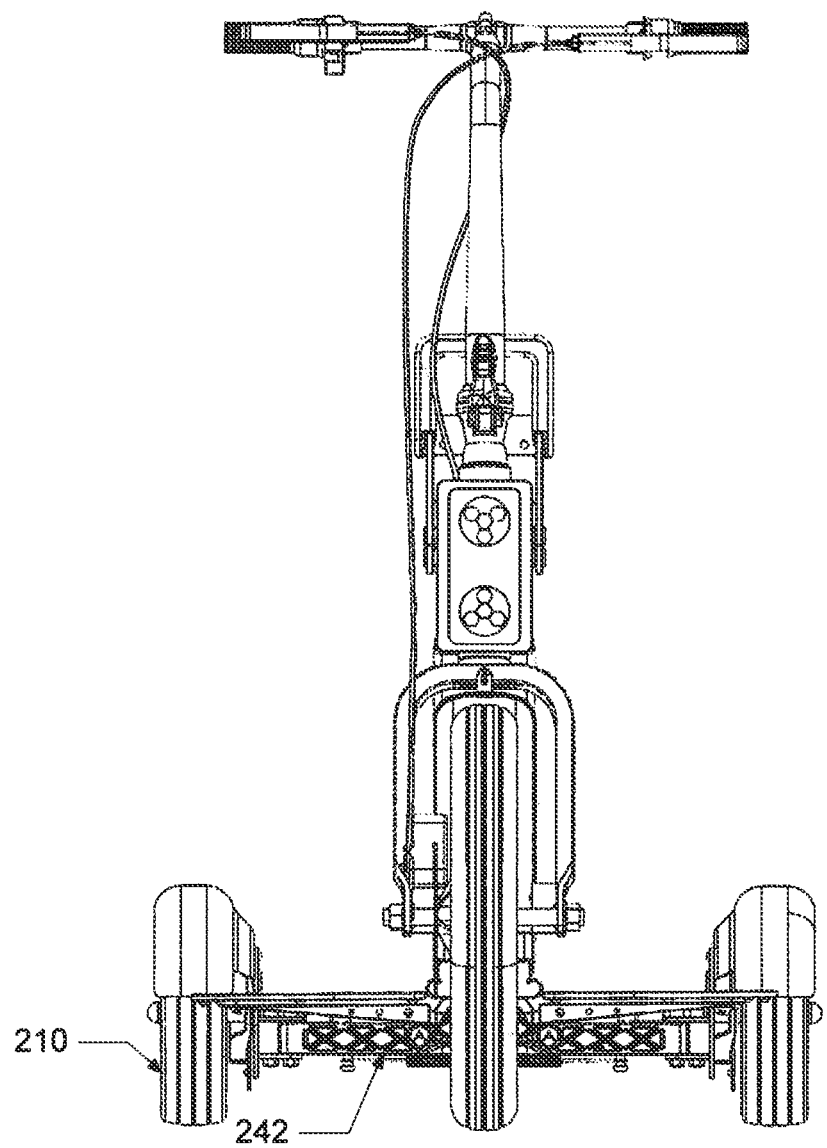
FIG. 15 illustrates a front view of the mobility device in the unfolded state, according to another embodiment.
Figure 16:
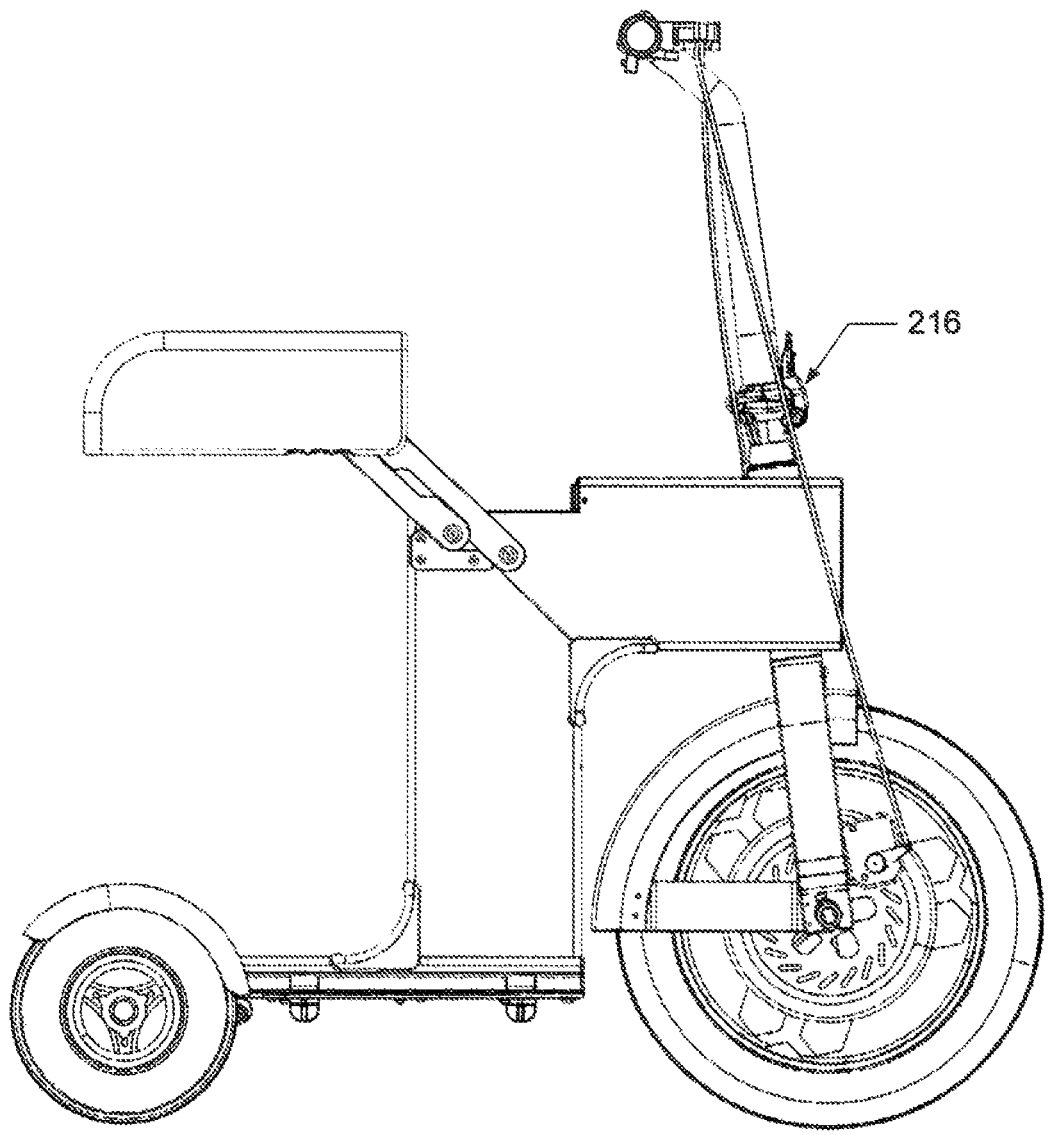
FIG. 16 illustrates a side view of the mobility device in the unfolded state, according to another embodiment.
Figure 17:
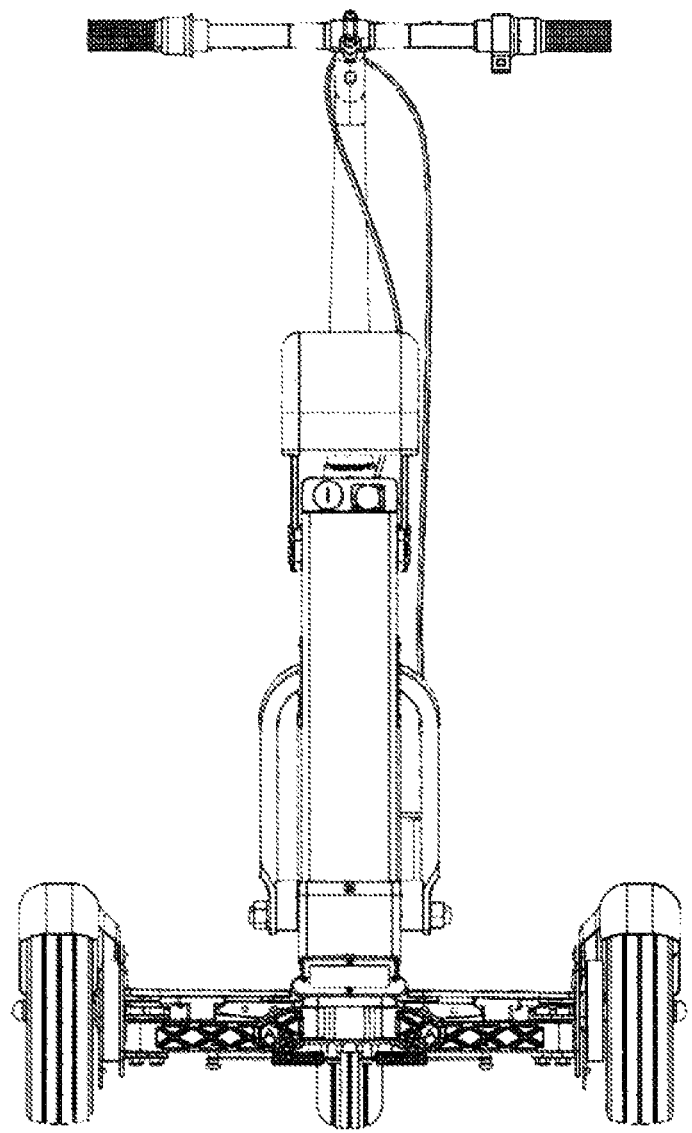
FIG. 17 illustrates a rear view of the mobility device in the unfolded state, according to another embodiment.
Figure 18:
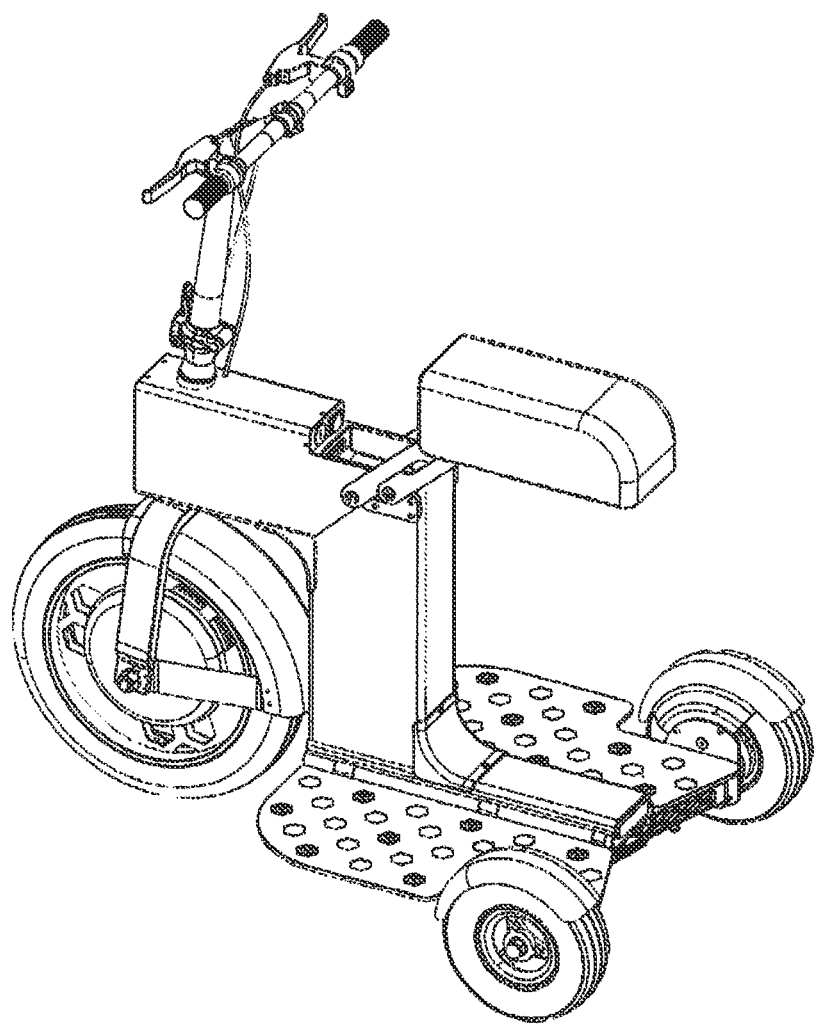
FIG. 18 illustrates another oblique view of the mobility device in the unfolded state, according to another embodiment.

As further shown in FIGS. 14 and 15, steering assembly 206 may include a horizontal bar having one or more brake levers 132 for controlling a braking assembly integrated in front wheel assembly 208 and/or rear wheel assembly 210. The brake system may use a hydraulic system, a cable system, or an electrical system for engaging and disengaging the braking assembly. Steering assembly 206 may be coupled to front wheel assembly 208 for controlling a direction of front wheel assembly 208. Steering assembly 206 may include a horizontal portion that allows the user to rotate steering assembly 206. The horizontal portion of steering assembly 206 may include handle bars that allow the user to hold. In one embodiment, at least one of the handle bars may include a throttle mechanism, such as an electronic or mechanical throttle. Thus, when the user rotates the handle bar, the throttle mechanism generates a throttle signal to control the rotational speed of the electric motor, thereby varying the speed of device 200. In another embodiment, the hand bar may also include a brake control mechanism for controlling the braking system. Thus, when the user rotates the handle bar, the brake control mechanism generates a braking signal to actively reduce the speed of device 200. The braking signal may activate the braking system described above. The throttle mechanism and the brake control mechanism may be integrated within different handle bars, so that the user may control the throttle using one hand and the braking system using the other hand. Alternatively, the throttle mechanism and the brake control mechanism may be integrated within a single handle bar, so that the user may activate the throttle mechanism by rotating the handle bar in one direction and activate the brake control mechanism by rotating the handle bar in the other direction.

Figure 62:
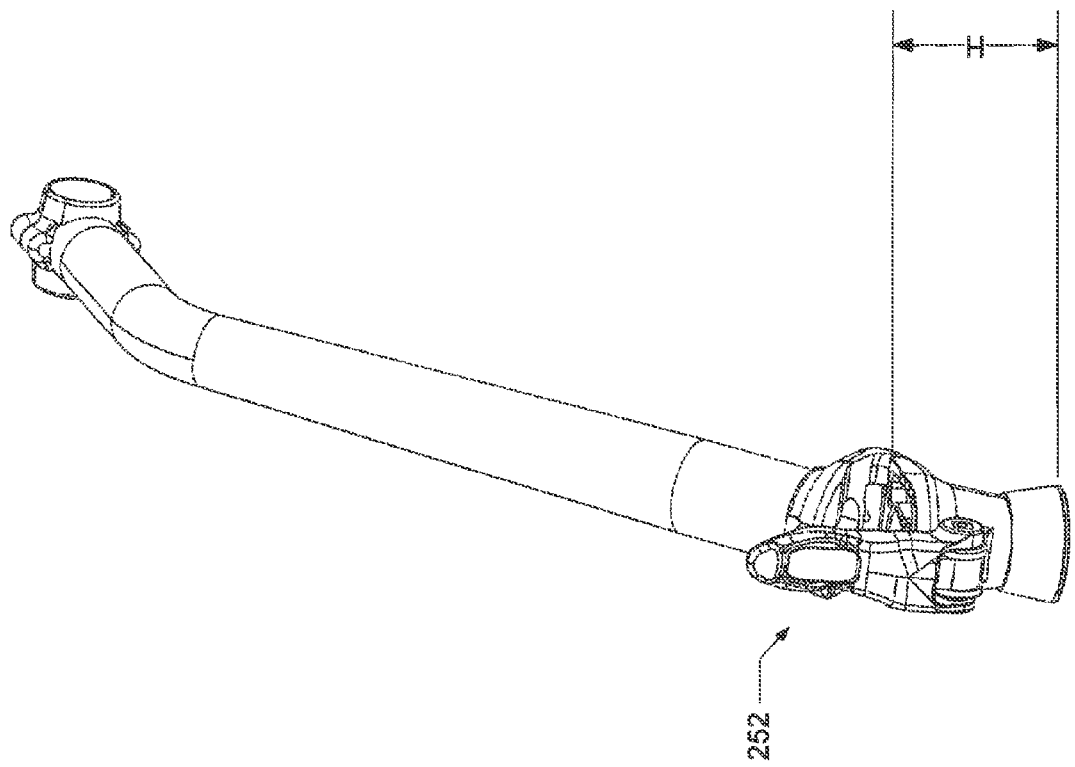
FIG. 62 illustrates an oblique view of a vertical section of the steering assembly in an unfolded position, according to another embodiment.
Figure 63:
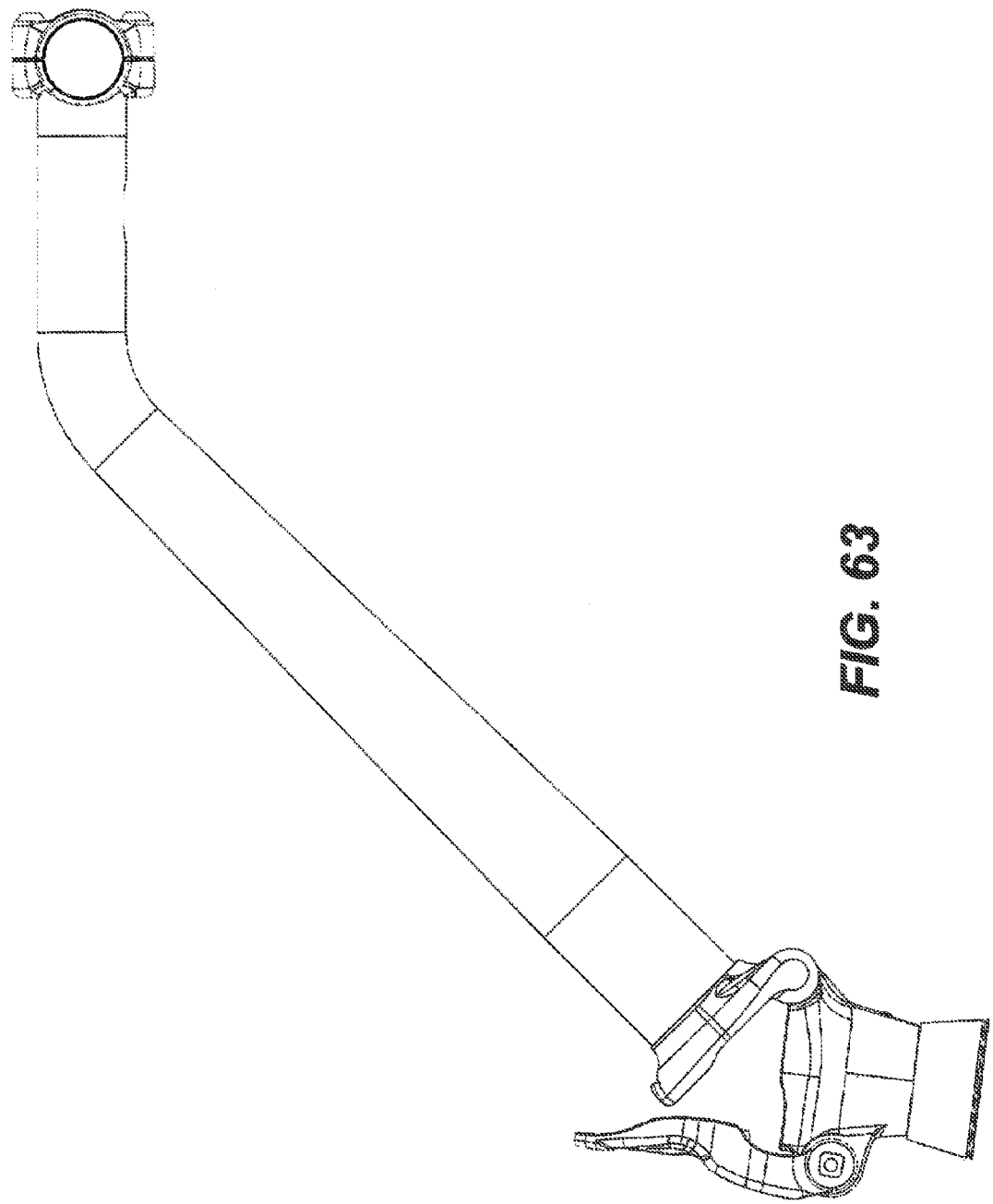
FIG. 63 illustrates a side view of the vertical section of the steering assembly in a partially folded position, according to another embodiment.
Figure 65:
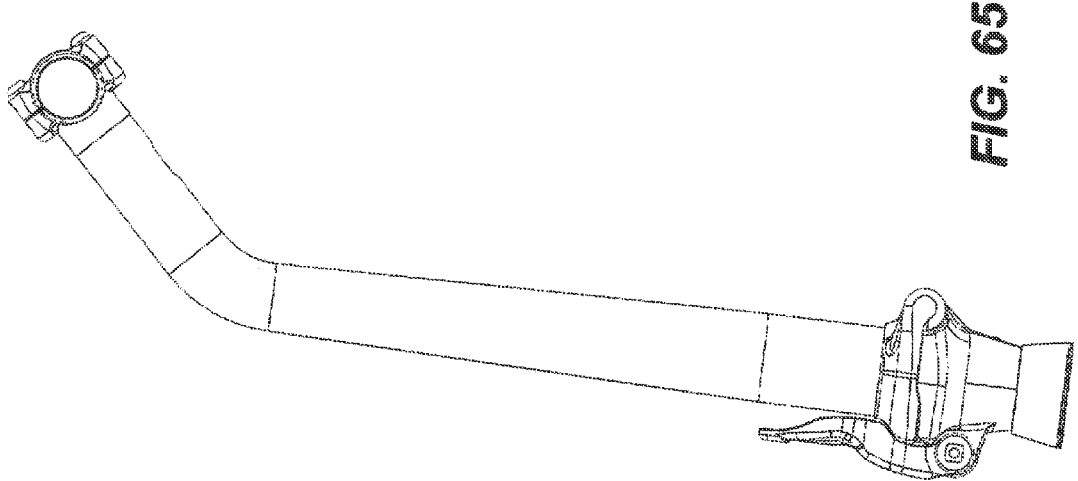
FIG. 65 illustrates a side view of the vertical section of the steering assembly in the unfolded position, according to another embodiment.
Figure 64:
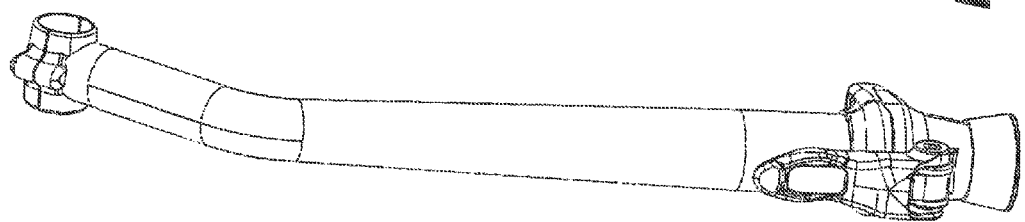
FIG. 64 illustrates an oblique view of the vertical section of the steering assembly in the unfolded position, according to another embodiment.

As further shown in FIGS. 16 and 62-65, steering assembly 206 may include an upper section and a lower section connected through a folding mechanism 216. Folding mechanism 216 may include a rotating joint or a hinge that allows the upper section to be folded backwards (or forwards) with respect to the lower section. When the upper section is fully folded, it may rest on an upper surface of chassis assembly 202 (see FIGS. 7, 68, and 70) or on front wheel assembly 208. In addition, folding mechanism 216 may include a lock element 252 to secure the upper section of the steering assembly 206 at the upright position when the upper section is unfolded. Lock element 252 may include a clip that may be engaged to secure the connection between the upper section and the lower section (see FIGS. 64 and 65). During the folding of steering assembly 206, lock element 252 may be disengaged, so as to allow the upper section of steering assembly 206 to be folded. FIGS. 62 and 63 illustrate the steering assembly 206 in a partially folded position during the folding/unfolding. In an embodiment, the rotating joint between the upper section and the lower section may be disposed to in proximity to an upper surface of chassis assembly 202, so that a height H of the lower section of steering assembly 206 may be minimized (see FIG. 62).

Figure 20:
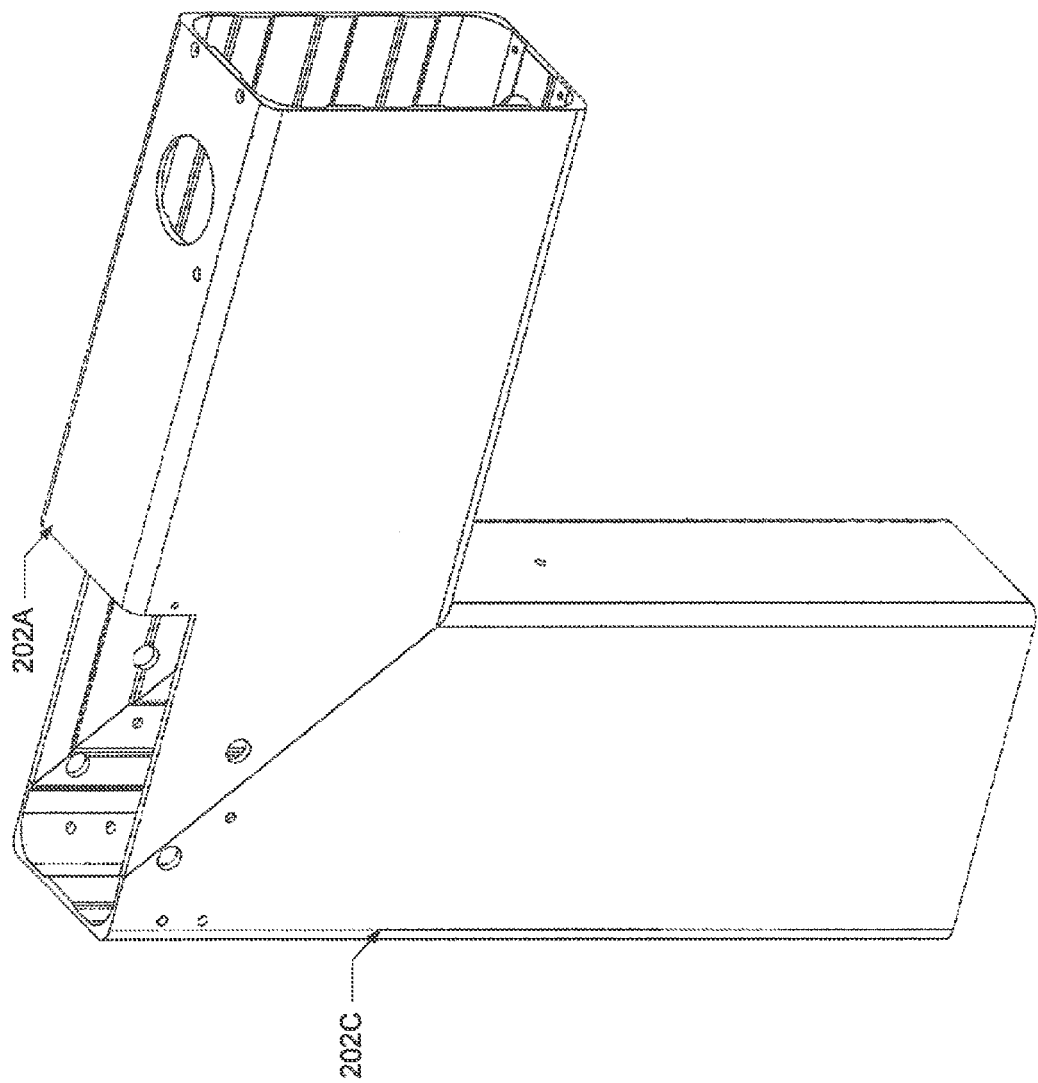
FIG. 20 illustrates an oblique view of an upper section of a chassis assembly of the mobility device, according to another embodiment.
Figure 21:
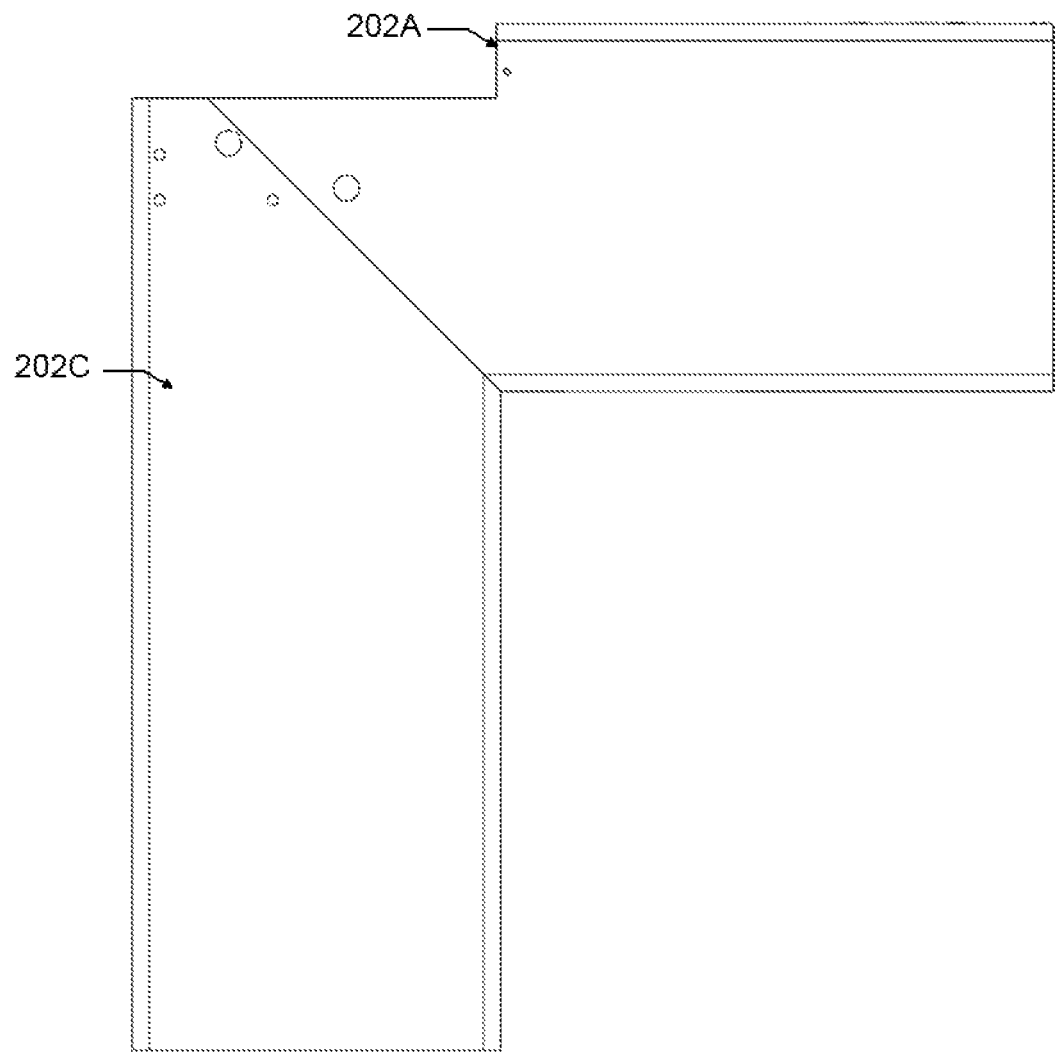
FIG. 21 illustrates a side view of the upper section of the chassis assembly of the mobility device, according to another embodiment.
Figure 22:
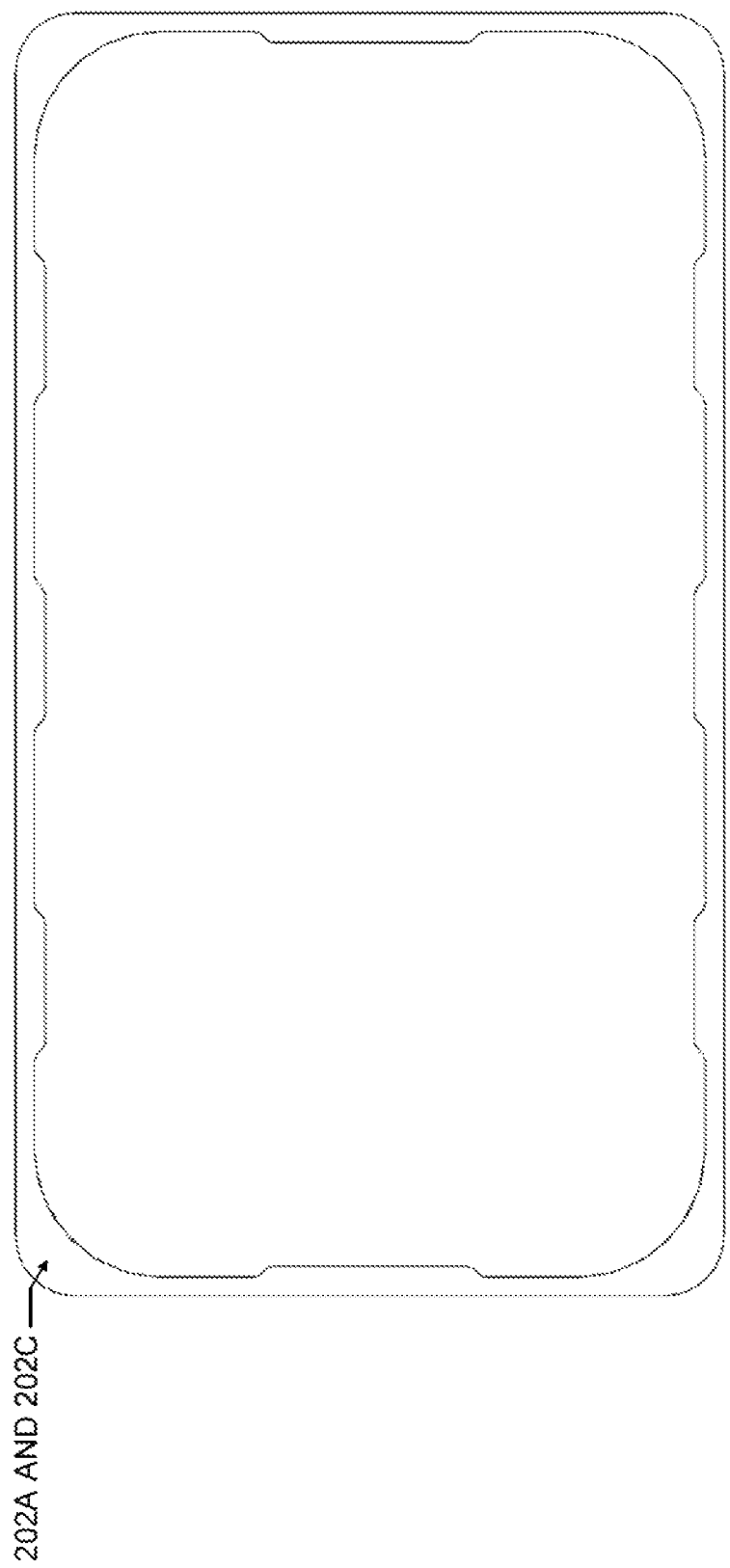
FIG. 22 illustrates a cross-sectional view of the upper section of the chassis assembly of the mobility device, according to another embodiment.

As further shown in FIGS. 20-27, chassis assembly 202 may include a plurality of sections, e.g., an upper section 202A, a base section 202B, and a middle section 202C connecting upper section 202A and base section 202B. Upper section 202A and middle section 202C, as shown in FIGS. 20-22, may be thin-wall structures joined together through respective obliquely cut surfaces. Upper section 202A and middle section 202C may be joined by welding, riveting, or other methods known in the art. As further shown in FIG. 22, upper section 202A and middle section 202C may each have a rectangular cross section with a cavity formed therein. Battery pack 120 and controller 122 as shown in FIG. 1 may be disposed within the cavity of upper section 202A or middle section 202C. Additionally, the cavity may serve as a storage space for storing other components or the user's properties. Alternatively, the first portion and the second portion may be formed as an integral structure.

Figure 23:
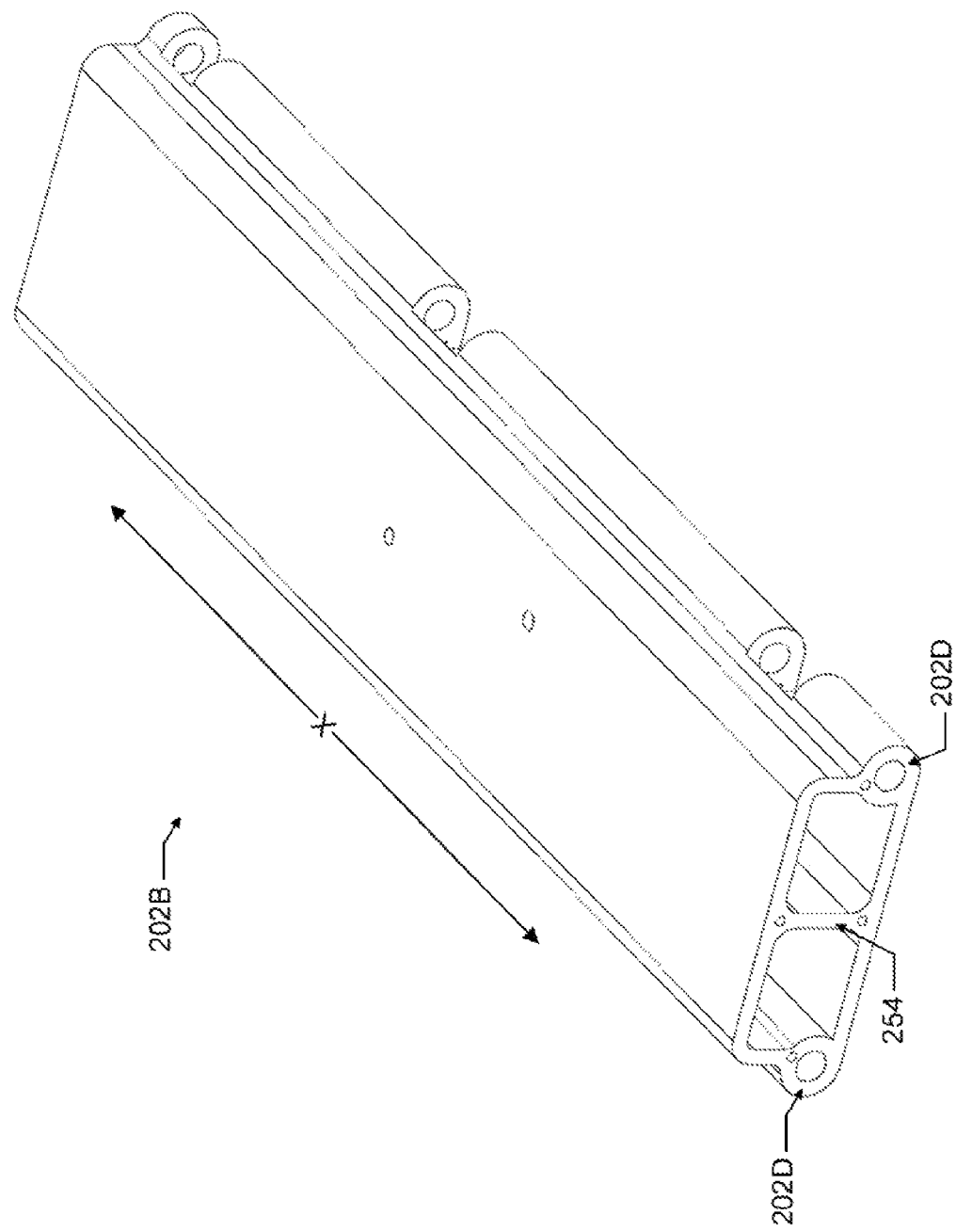
FIG. 23 illustrates an oblique view of a base section of the chassis assembly of the mobility device, according to another embodiment.
Figure 24:
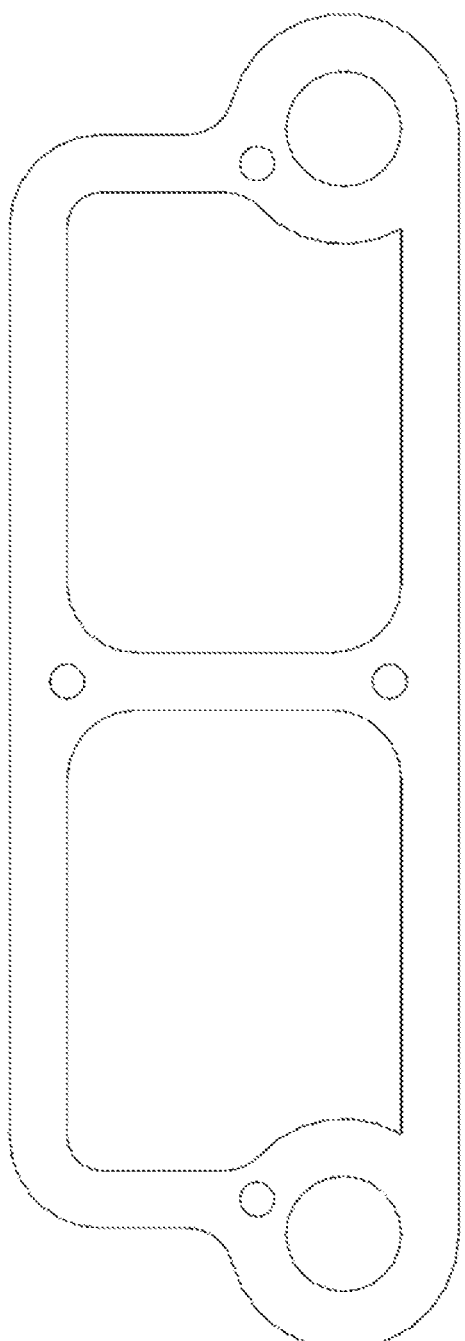
FIG. 24 illustrates a cross-sectional view of the base section of the chassis assembly of the mobility device, according to another embodiment.

Base section 202B of chassis assembly 202 may, as shown in FIGS. 23 and 24, also be a thin-wall structure including a cavity extending in an axial direction X. The cavity may serve as a storage space for storing batteries and other items. In order to provide reinforcement, base section 202B may include one or more additional middle walls 254 extending in the axial direction to provide extra supports. Base section 202B may include a first and second shaft housings 202D disposed horizontally along respective side surfaces of base section 202B for coupling with floor assembly 212 through folding mechanism 220 (see FIGS. 14, 28, 29, and 31).

Figure 25:
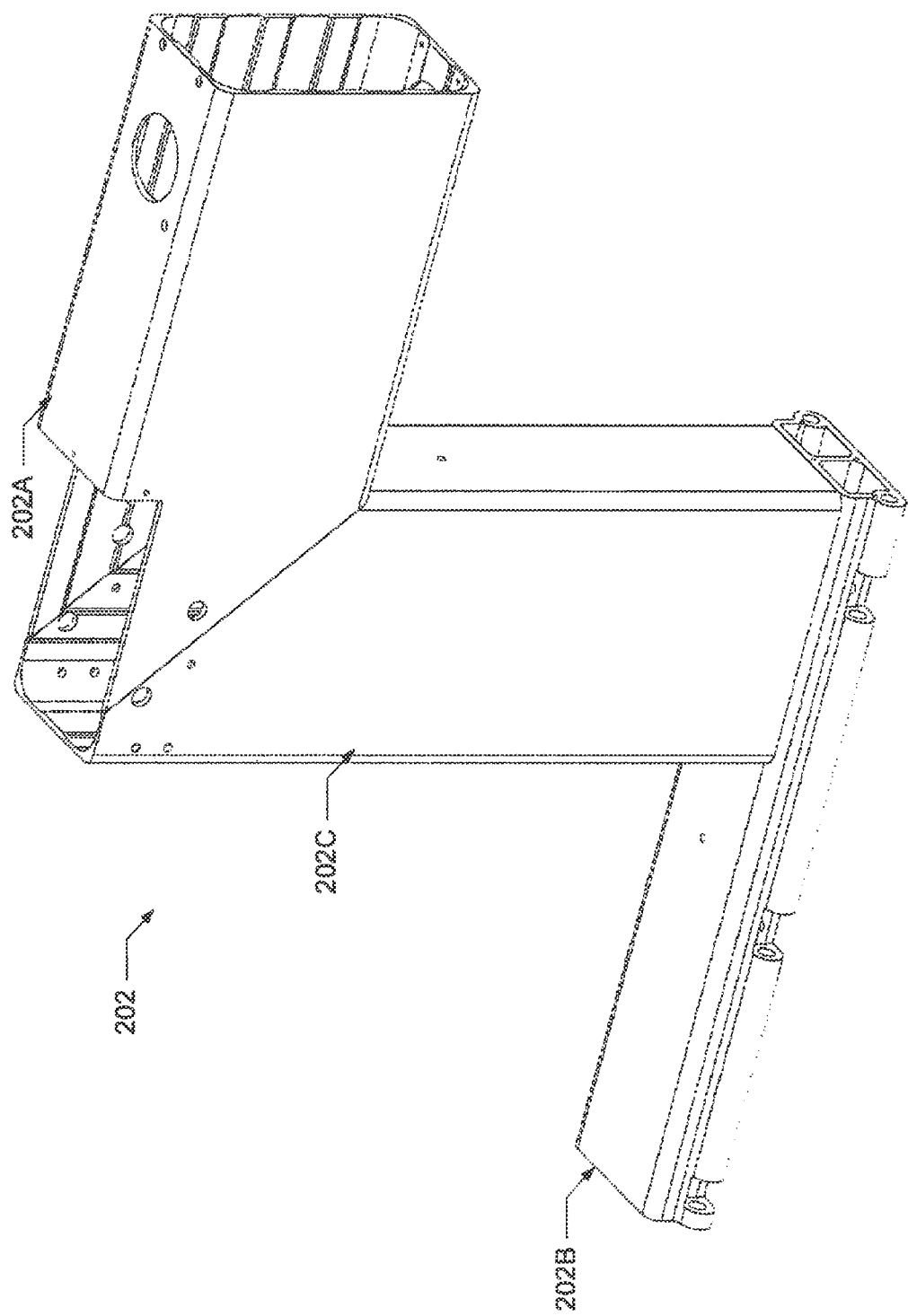
FIG. 25 illustrates an oblique view of the chassis assembly of the mobility device, according to another embodiment.
Figure 26:
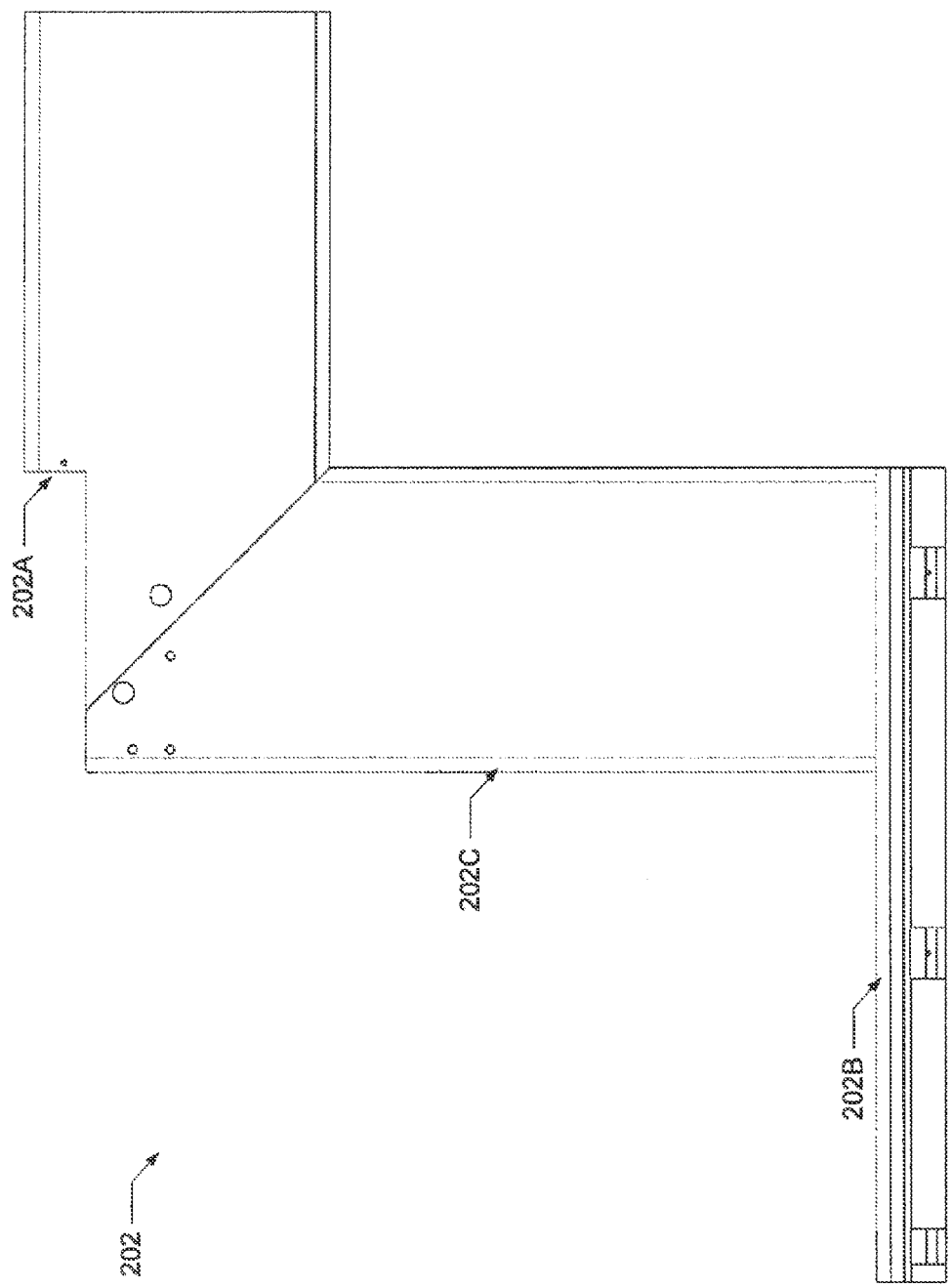
FIG. 26 illustrates a side view of the chassis assembly of the mobility device, according to another embodiment.
Figure 27:
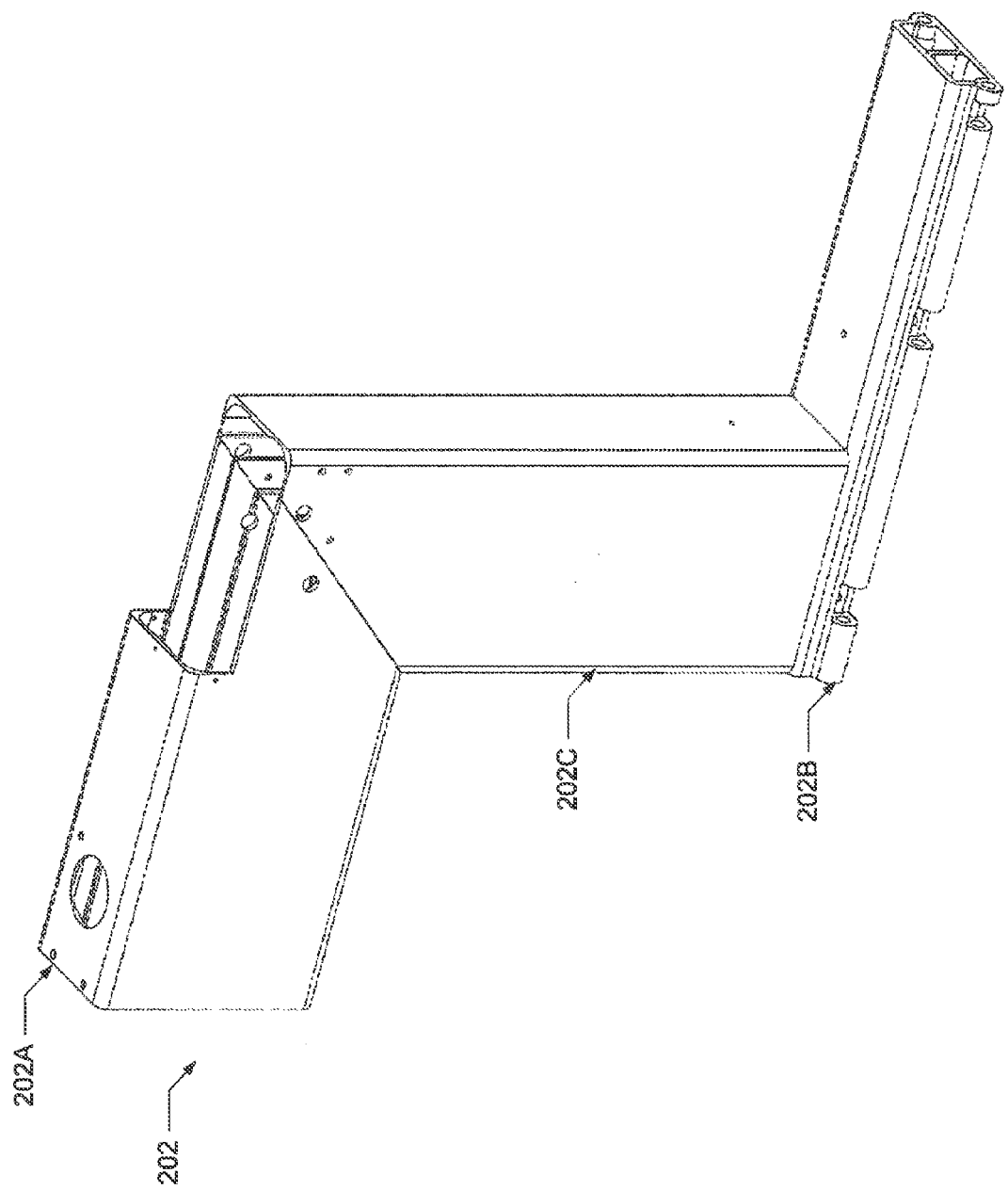
FIG. 27 illustrates another oblique view of the chassis assembly of the mobility device, according to another embodiment.
Figure 28:
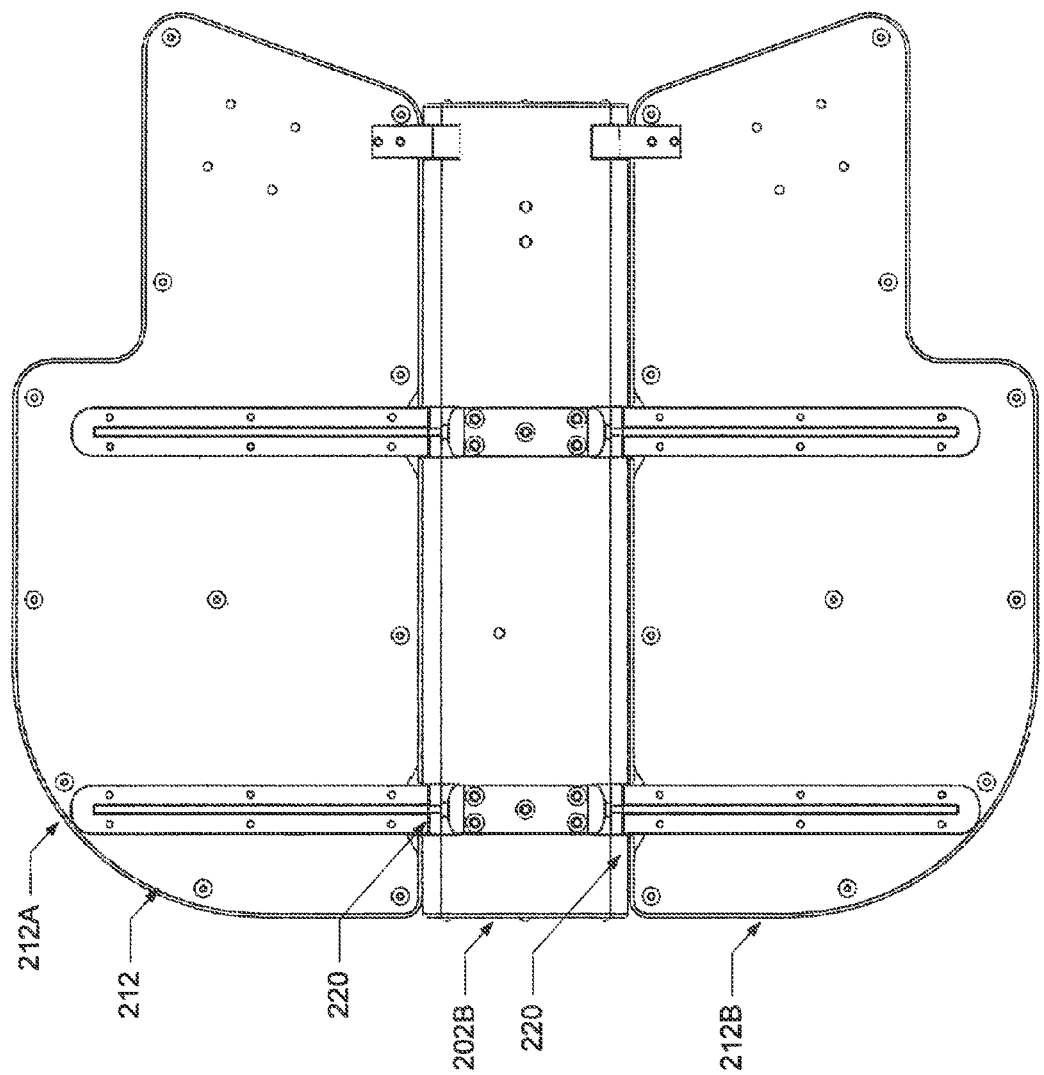
FIG. 28 illustrates a bottom view of a floor assembly in an unfolded position and coupled to the chassis assembly, according to another embodiment.

As shown in FIGS. 25-27, middle section 202C and base section 202B may be joined by coupling an end surface of middle section 202C to a top surface of base section 202B. Sections 202C and 202B may be joined by, for example, gluing, welding, riveting, or other methods known in the art. Alternatively, upper section 202C and base section 202B may be formed as an integral structure.

In another embodiment, upper section 202A and middle section 202C may form an "L" shape with middle section 202C being formed vertically and upper section 202A being formed horizontally on top of middle section 202C. Base section 202B and middle section 202C may form another "L" shape with base section 202B being formed horizontally and middle section 202C being formed vertically on top of base section 202B.

FIGS. 28-32 illustrate additional embodiments of floor assembly 212. Floor assembly 212 includes a first floor board 212A and a second floor board 212B coupled to base section 202B of chassis assembly 202 through respective folding mechanisms 220. Folding mechanism 220 may include, for example, a hinge having an elongated shaft disposed within the shaft housing of base section 202B and provide a rotatable joint between chassis assembly 202 and the respective floor board.

Figure 29:
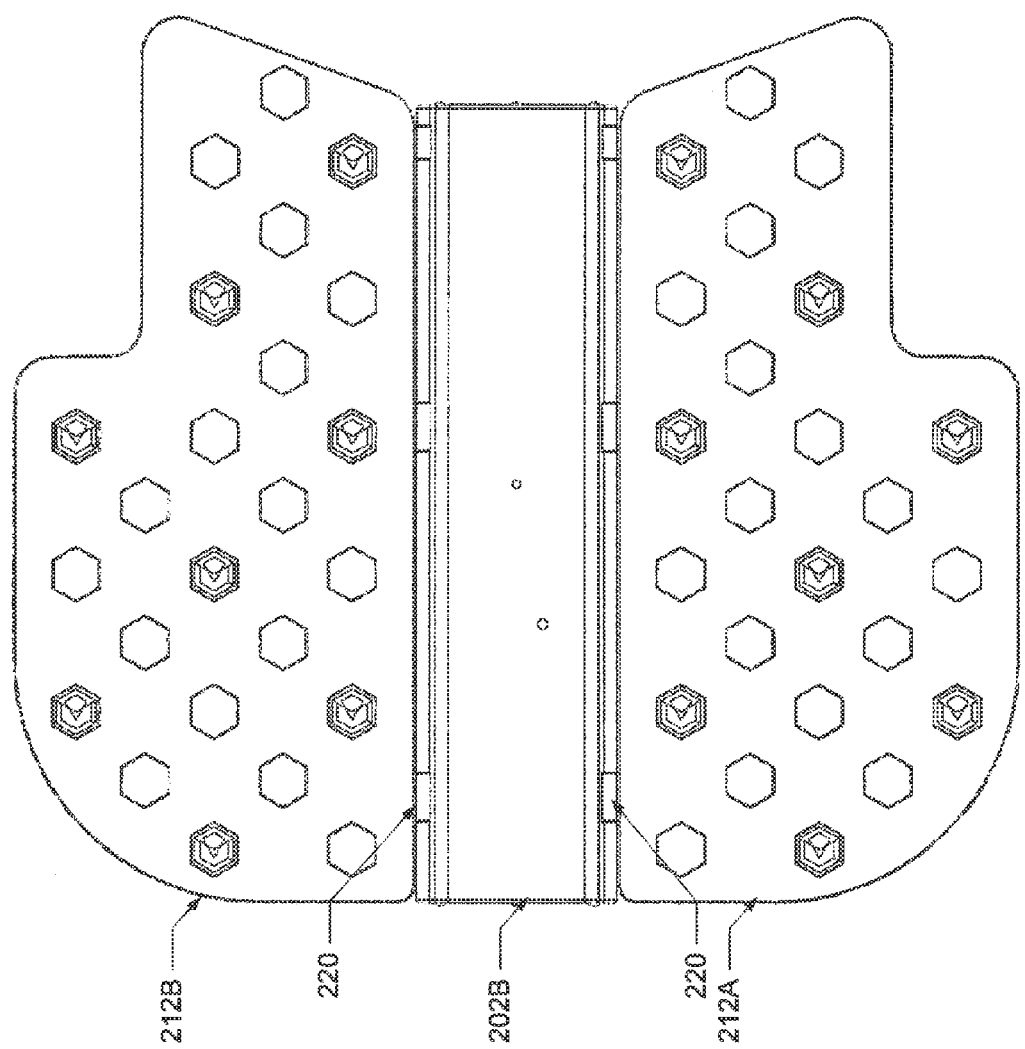
FIG. 29 illustrates a top view of the floor assembly in the unfolded position and coupled to the chassis assembly, according to another embodiment.
Figure 30:
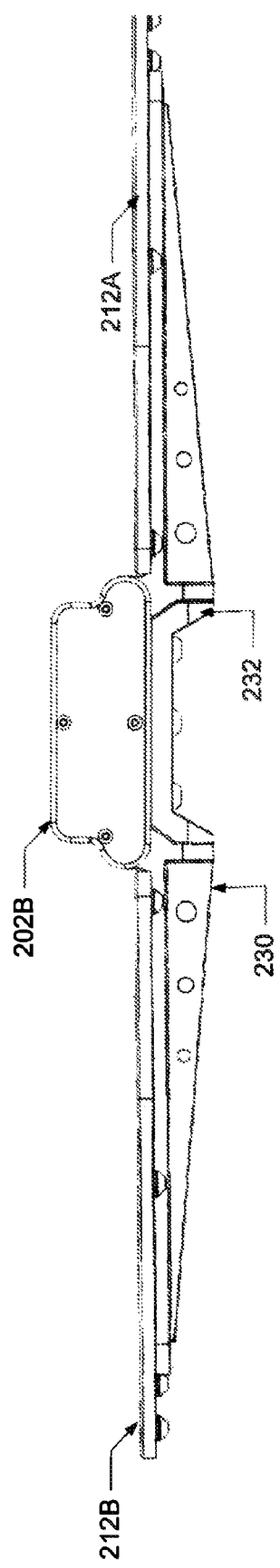
FIG. 30 illustrates an end view of the floor assembly in the unfolded position and coupled to the chassis assembly, according to another embodiment.
Figure 31:
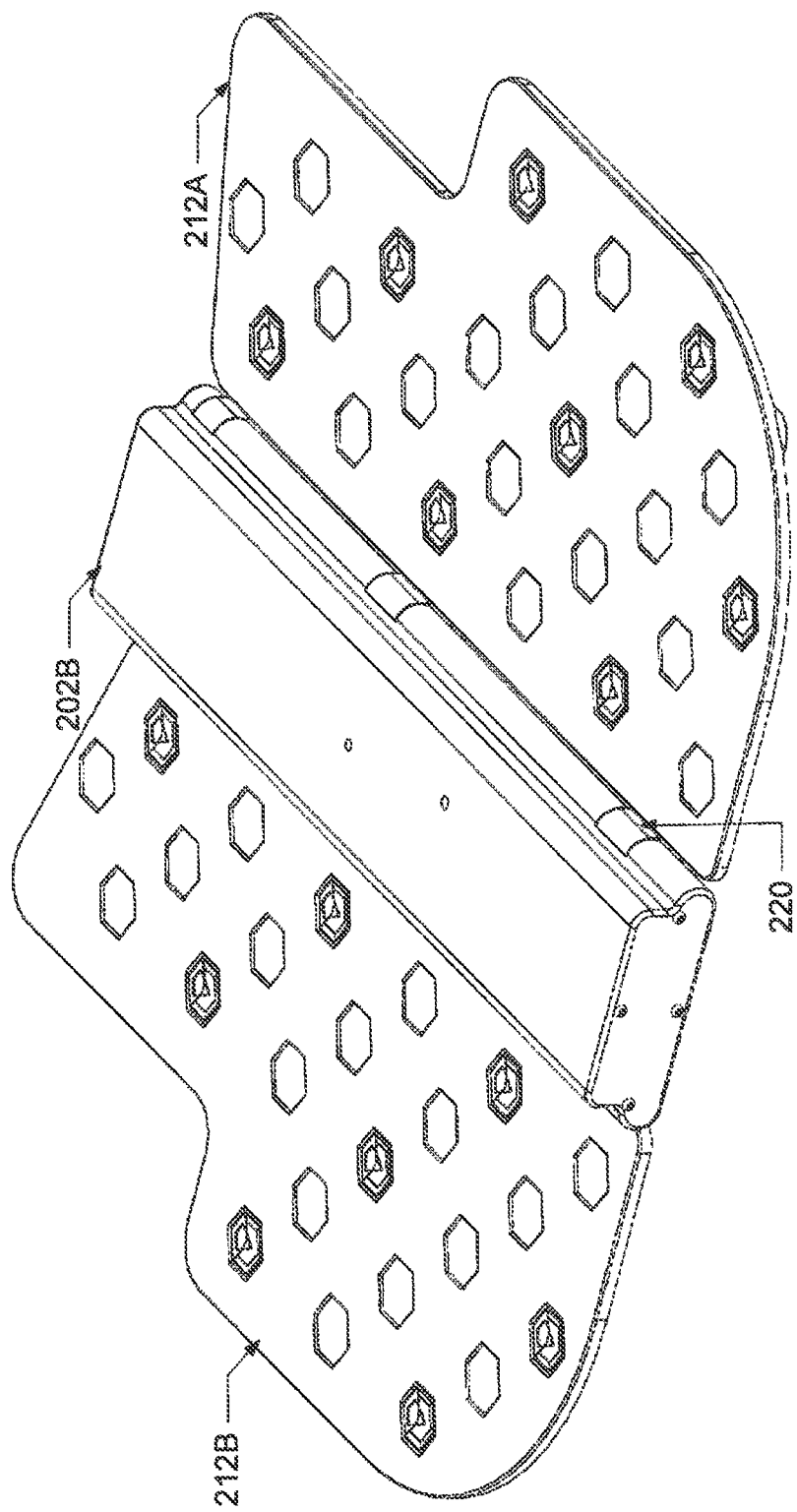
FIG. 31 illustrates an oblique view of the floor assembly in the unfolded position and coupled to the chassis assembly, according to another embodiment.
Figure 32:
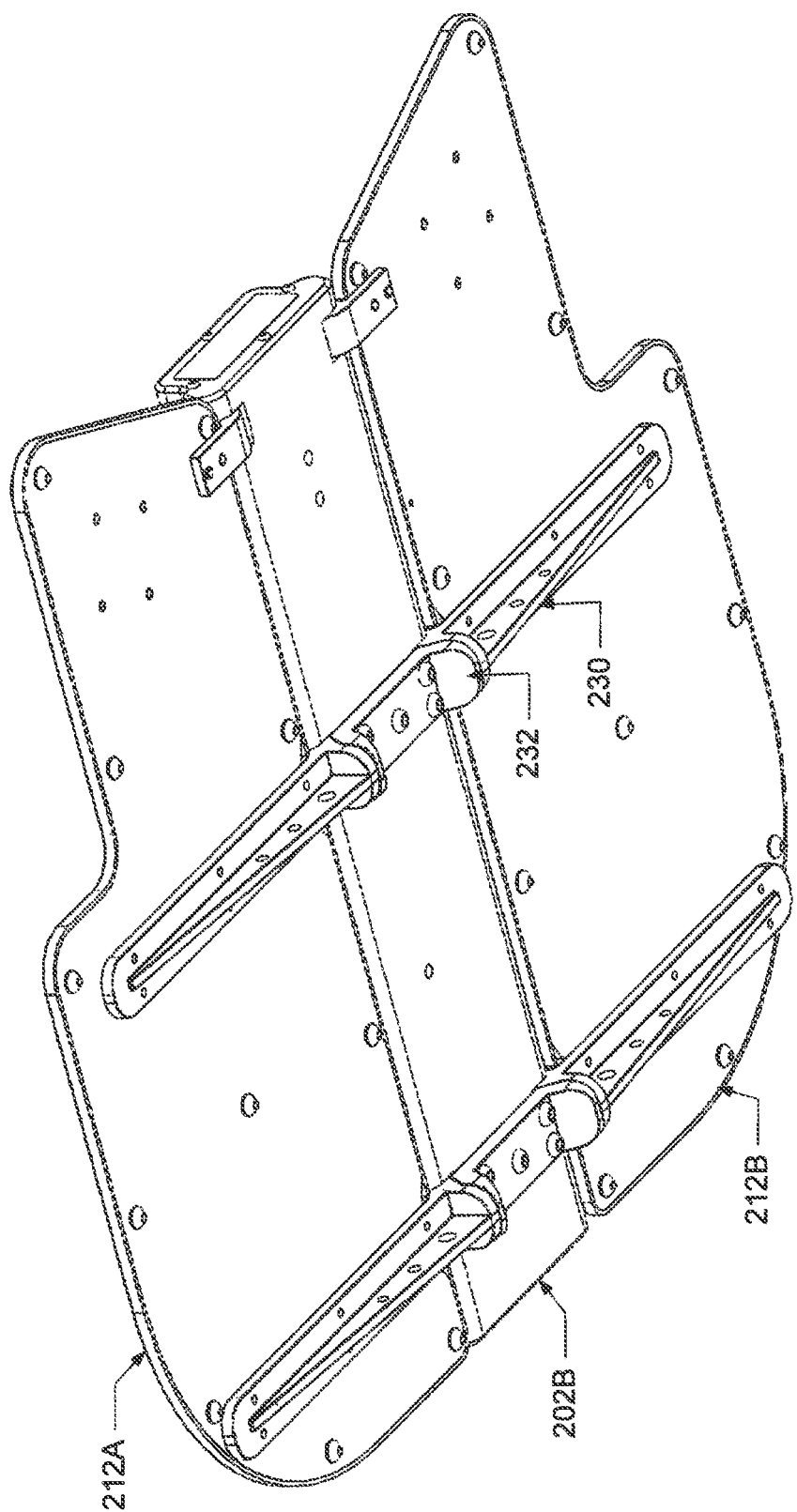
FIG. 32 illustrates another oblique view of the floor assembly in the unfolded position and coupled to the chassis assembly, according to another embodiment.

As shown in FIGS. 29 and 31, the top surface of each floor board may include anti-slippery patterns to improve friction between the floor board and the user's shoe. As shown in FIGS. 30 and 32, the bottom surface of each floor board may include one or more support elements 230 extending laterally to provide reinforcements to support the weight of the user. When each floor board is placed in a horizontal position (i.e., an unfolded position), an inner end section of the support element 230 may press against a stopper 232 attached to the bottom surface of base section 202B (see FIG. 30). Stopper 232 is designed to secure and maintain the respective floor board at the horizontal position.

Each floor board may be converted between the unfolded position (i.e., the horizontal position) to a folded position (i.e., a vertical position) by rotating or pivoting the floor board around respective folding mechanism 220. When floor assembly 212 is converted to the folded position, the floor boards 212A and 212B are rotated to their vertical positions and rest at the respective sides of chassis assembly 202 (see FIGS. 66-71).

Figure 33:
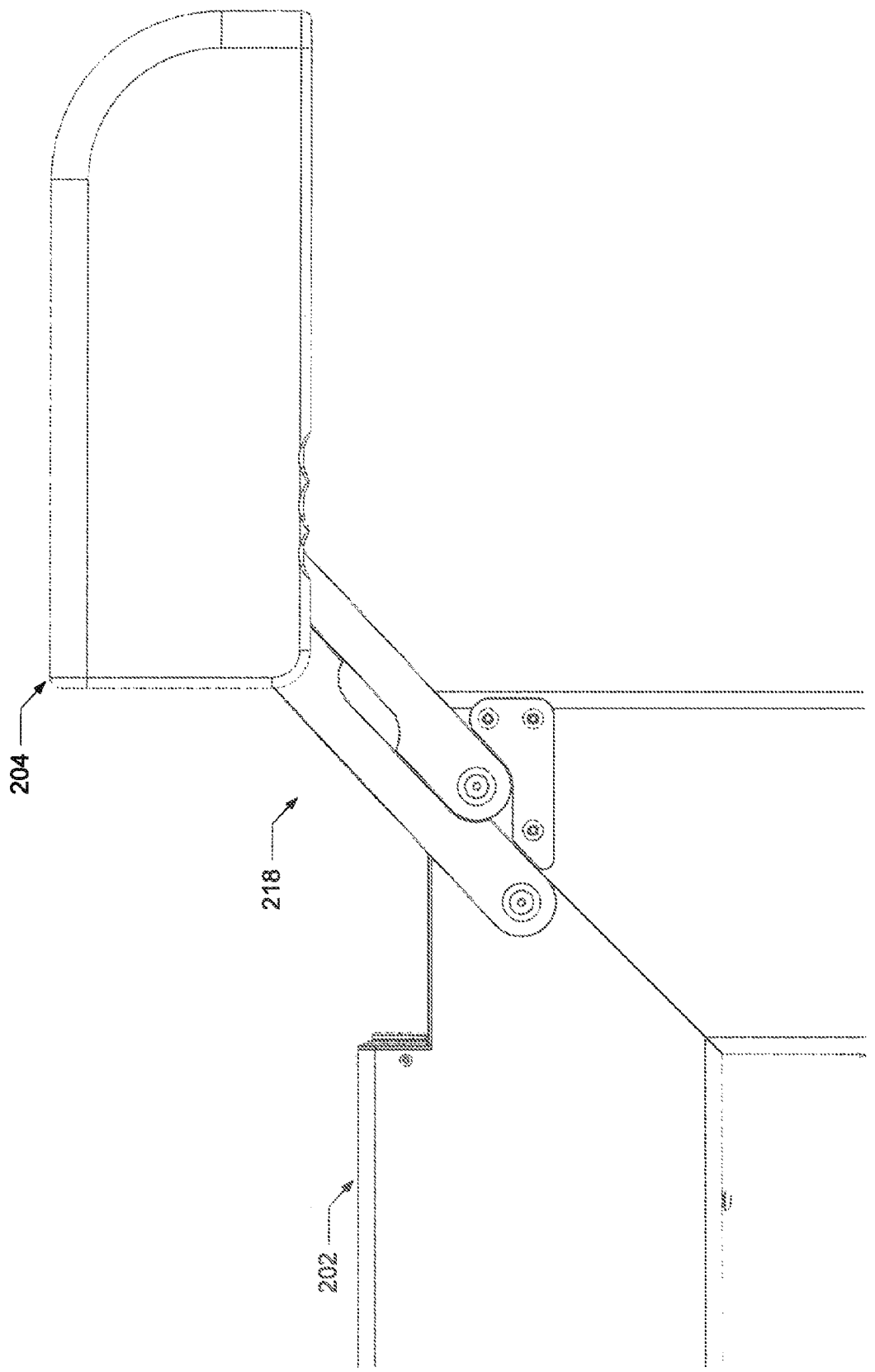
FIG. 33 illustrates a side view of a seat assembly in an unfolded position and coupled to the chassis assembly, according to another embodiment.
Figure 39:
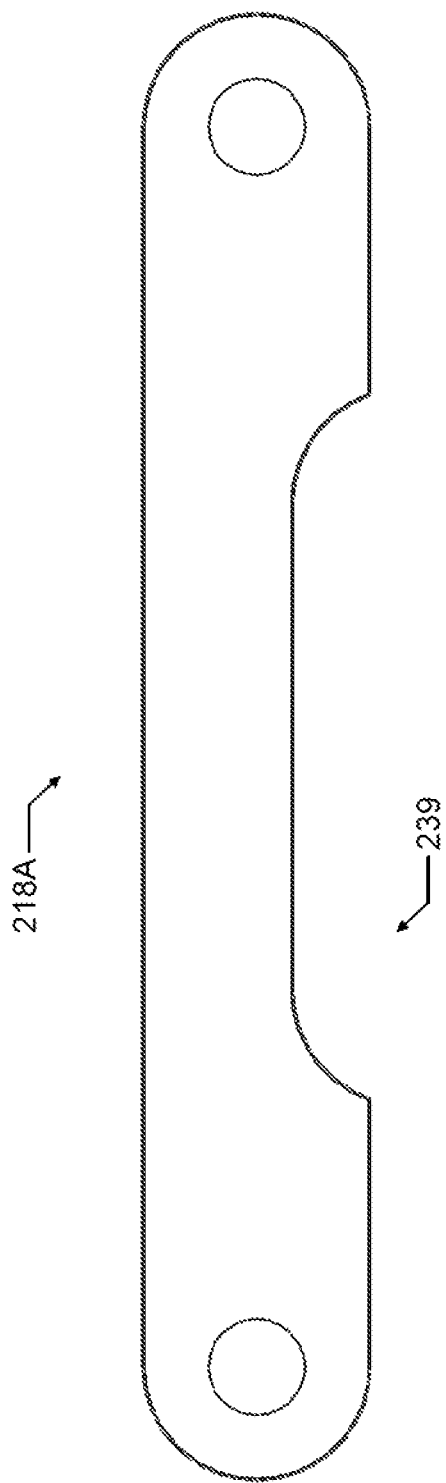
FIG. 39 illustrates a side view of an arm of the folding mechanism for the seat assembly, according to another embodiment.
Figure 40:
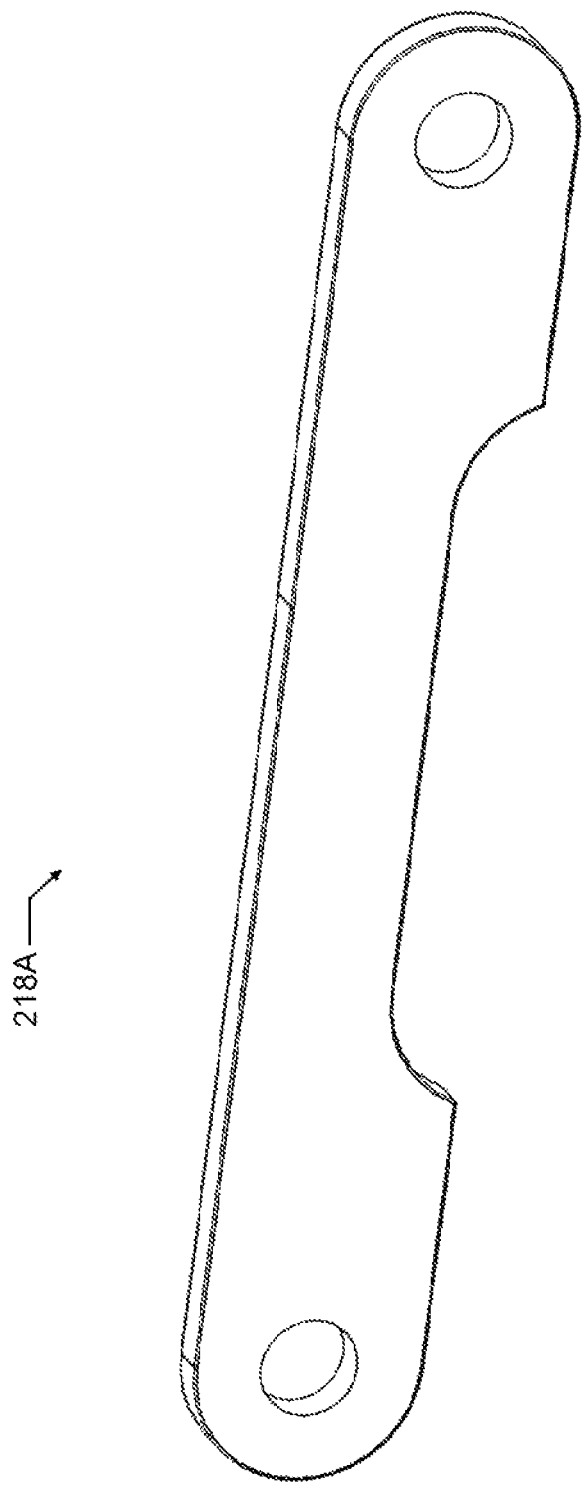
FIG. 40 illustrates an oblique view of the arm of the folding mechanism for the seat assembly, according to another embodiment.
Figure 41:
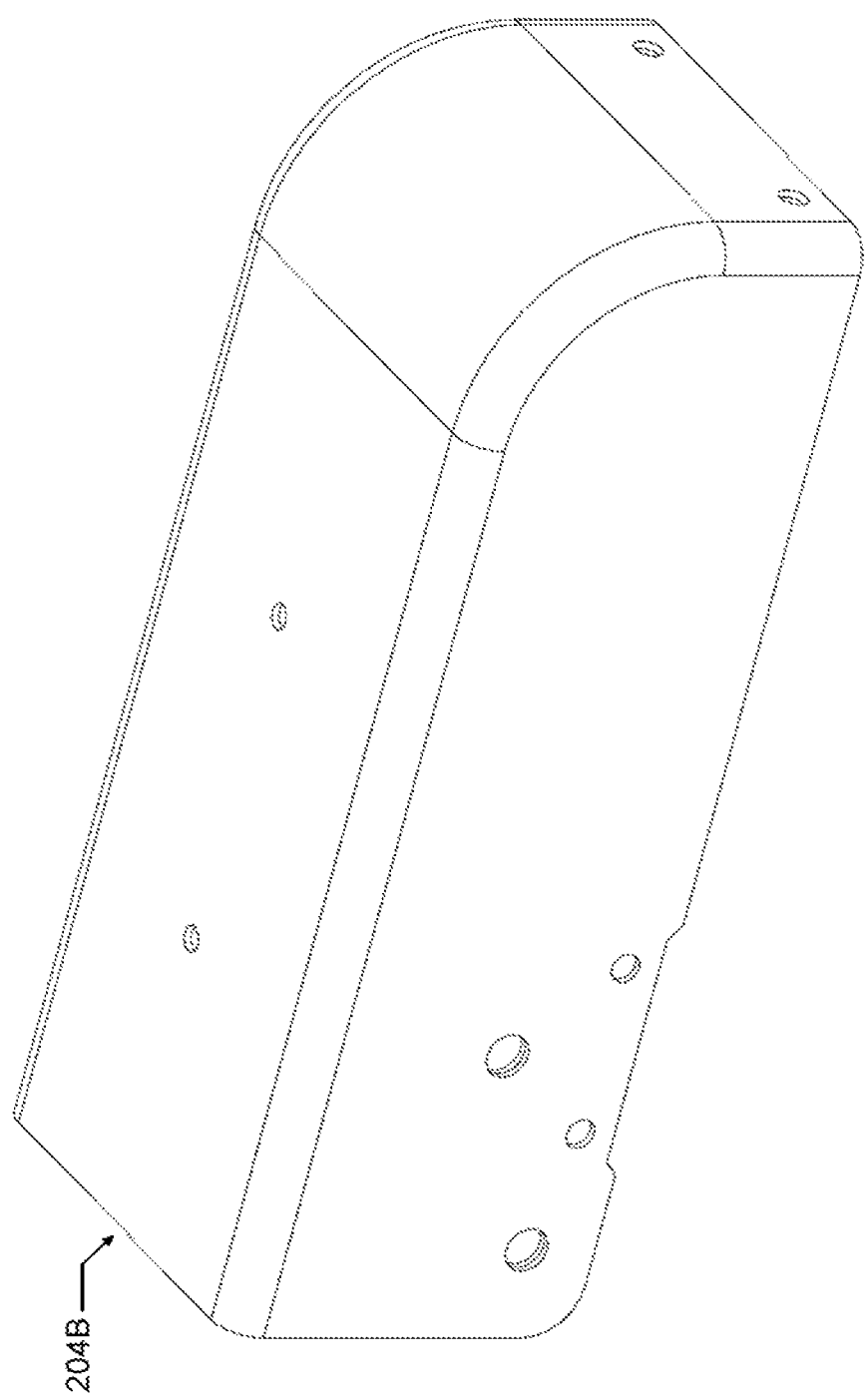
FIG. 41 illustrates an oblique view of the seat portion, according to another embodiment.
Figure 42:
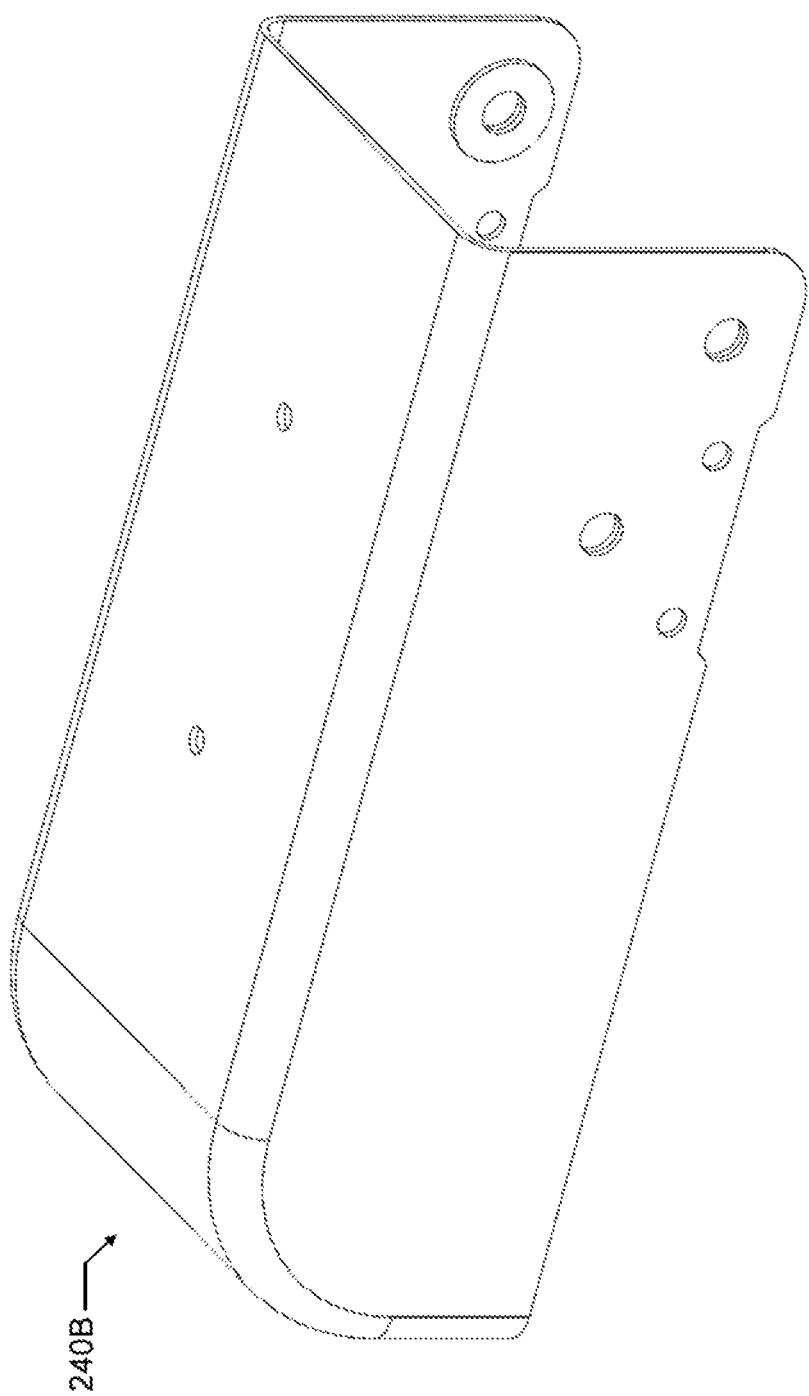
FIG. 42 illustrates another oblique view of the seat portion, according to another embodiment.
Figure 43:
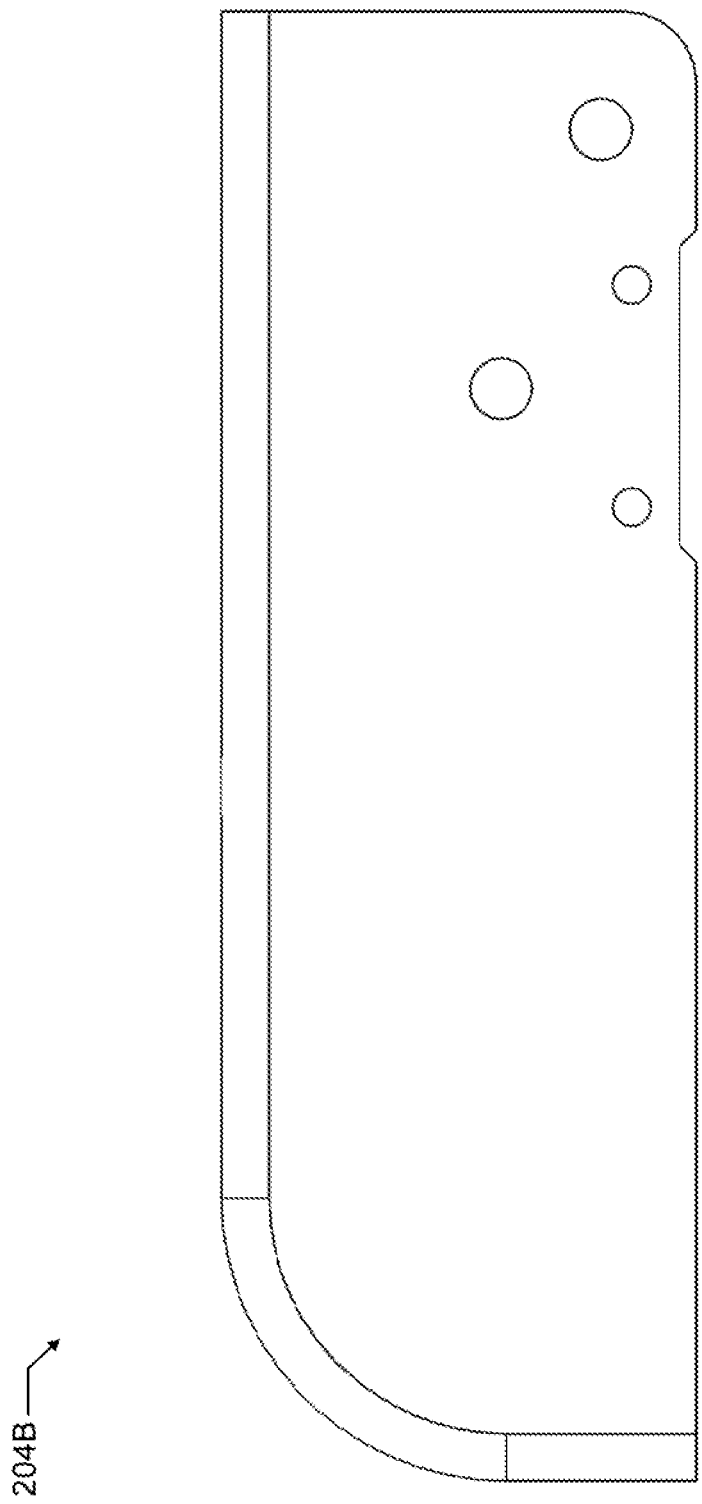
FIG. 43 illustrates a side view of the seat portion, according to another embodiment.

FIGS. 33-43 and 53-55 illustrate additional embodiments of seat assembly 204. As shown in FIG. 33, seat assembly 204 may be connected to a top portion of chassis assembly 202 through a folding mechanism 218. Folding mechanism 218 may include one or more folding arms 218A connected between seat assembly 204 and chassis assembly 202 through rotatable joints. In an embodiment, as shown in FIG. 25, folding mechanism 218 may include four arms 218A, two on each side of chassis assembly 202. As further shown in FIGS. 39 and 40, arms 218A may have substantially similar shapes and lengths. Each arm 218A may further include a cut-out portion 239 that matches an outer contour of arm 218A. As shown in FIGS. 33-38, 53, and 54, cut-out portions 239 on arms 218A may provide clearance to each other when seat assembly 204 is in the folded position (FIGS. 53 and 54) and the unfolded position (FIGS. 33-38). Alternatively, if arms 218A are spaced apart sufficiently, cut-out portion 239 may be omitted, and folding mechanism 218 maintains sufficient clearance during the rotation.

Figure 34:
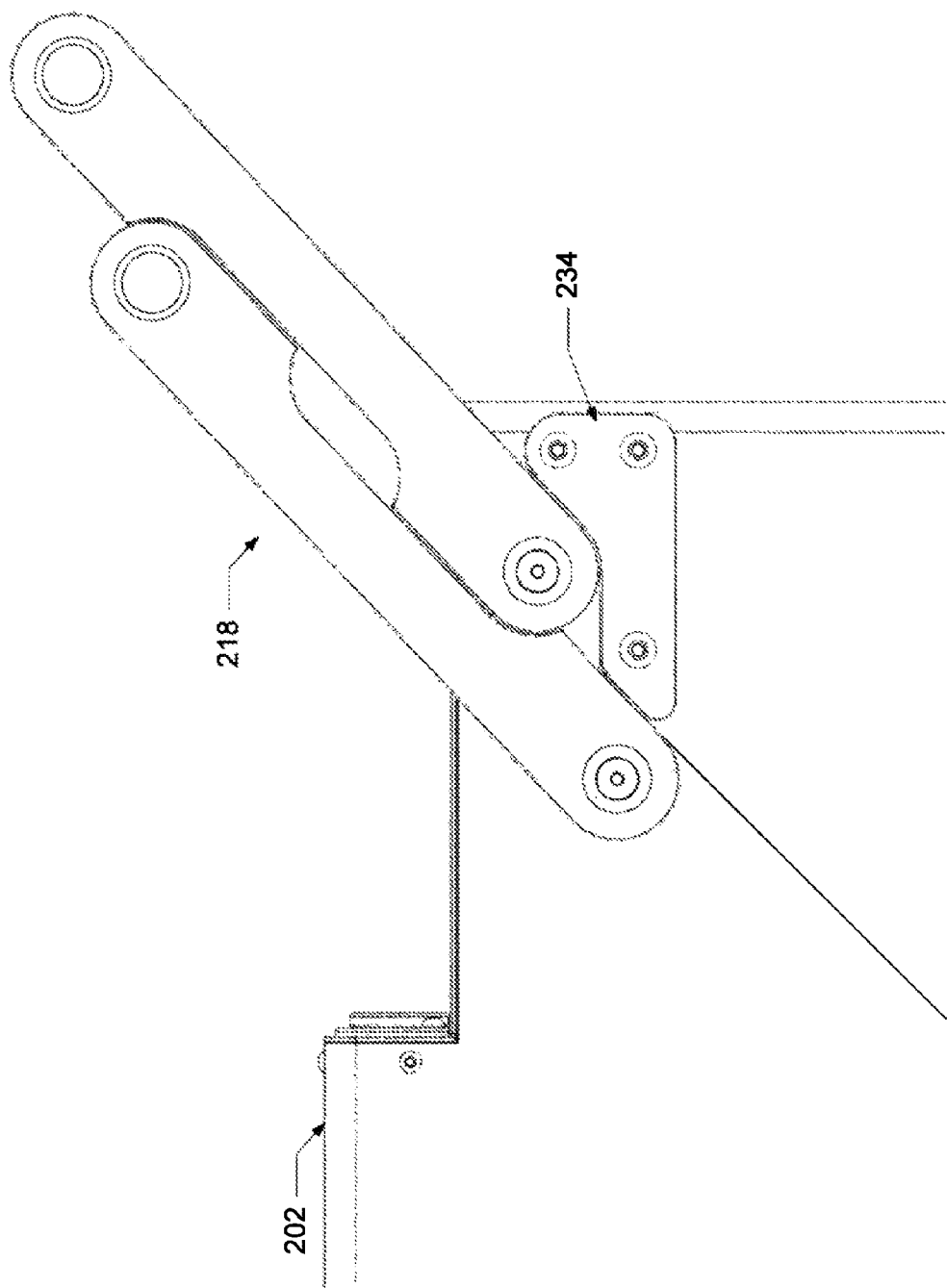
FIG. 34 illustrates a side view of a folding mechanism for the seat assembly, according to another embodiment.
Figure 35:
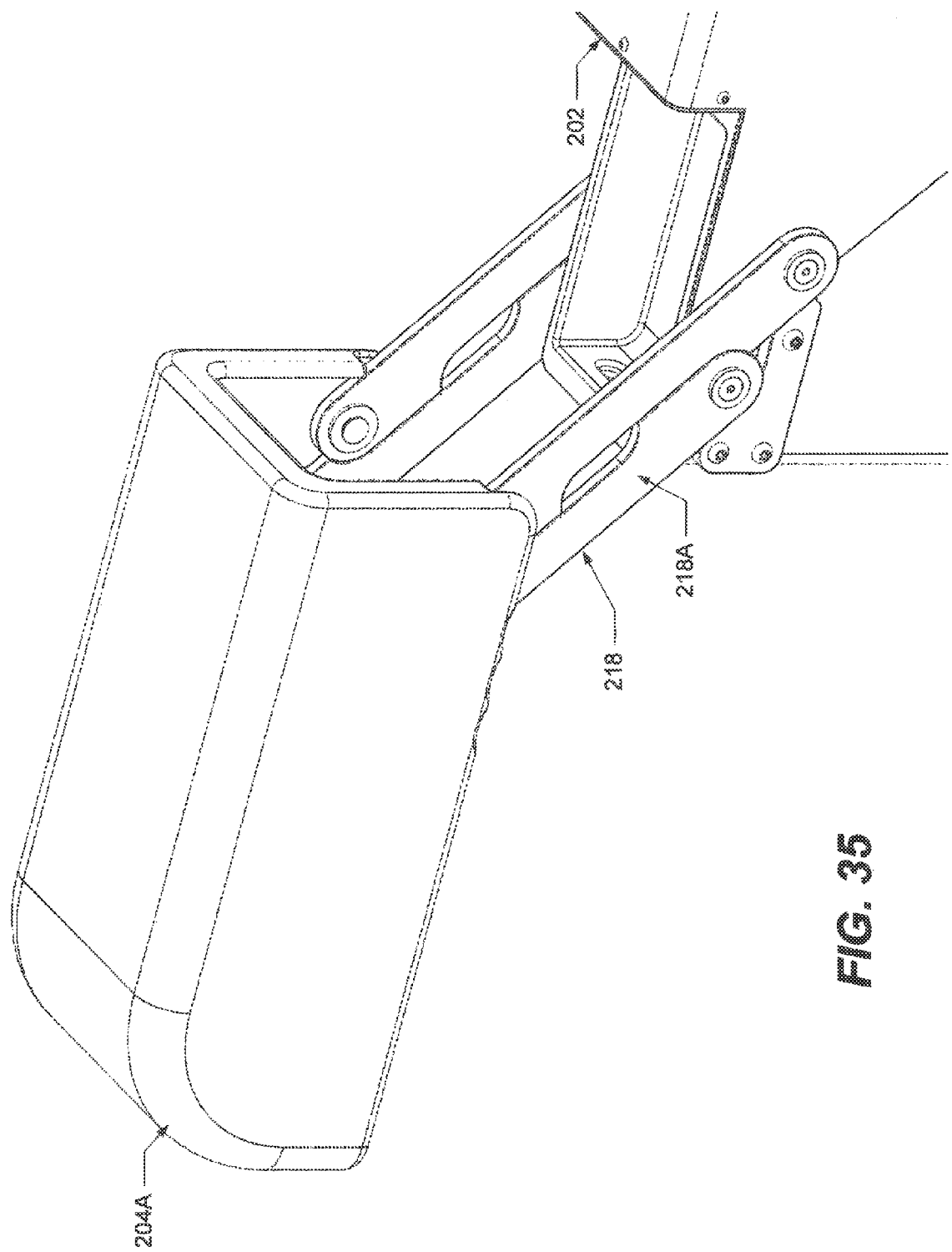
FIG. 35 illustrates an oblique view of the seat assembly in the unfolded position and coupled to the chassis assembly, according to another embodiment.
Figure 36:
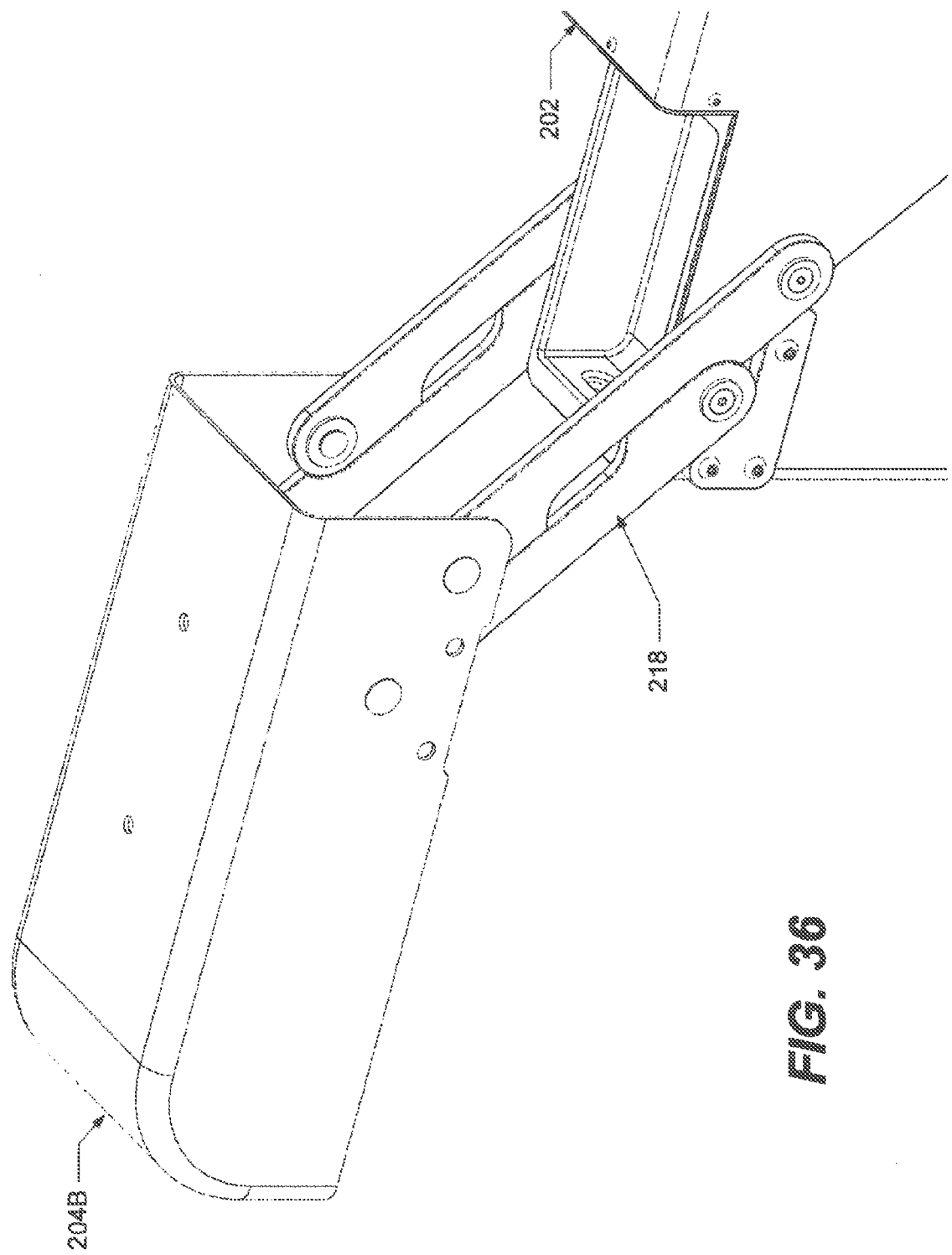
FIG. 36 illustrates an oblique view of a seat portion of the seat assembly in the unfolded position and coupled to the chassis assembly, according to another embodiment.
Figure 37:
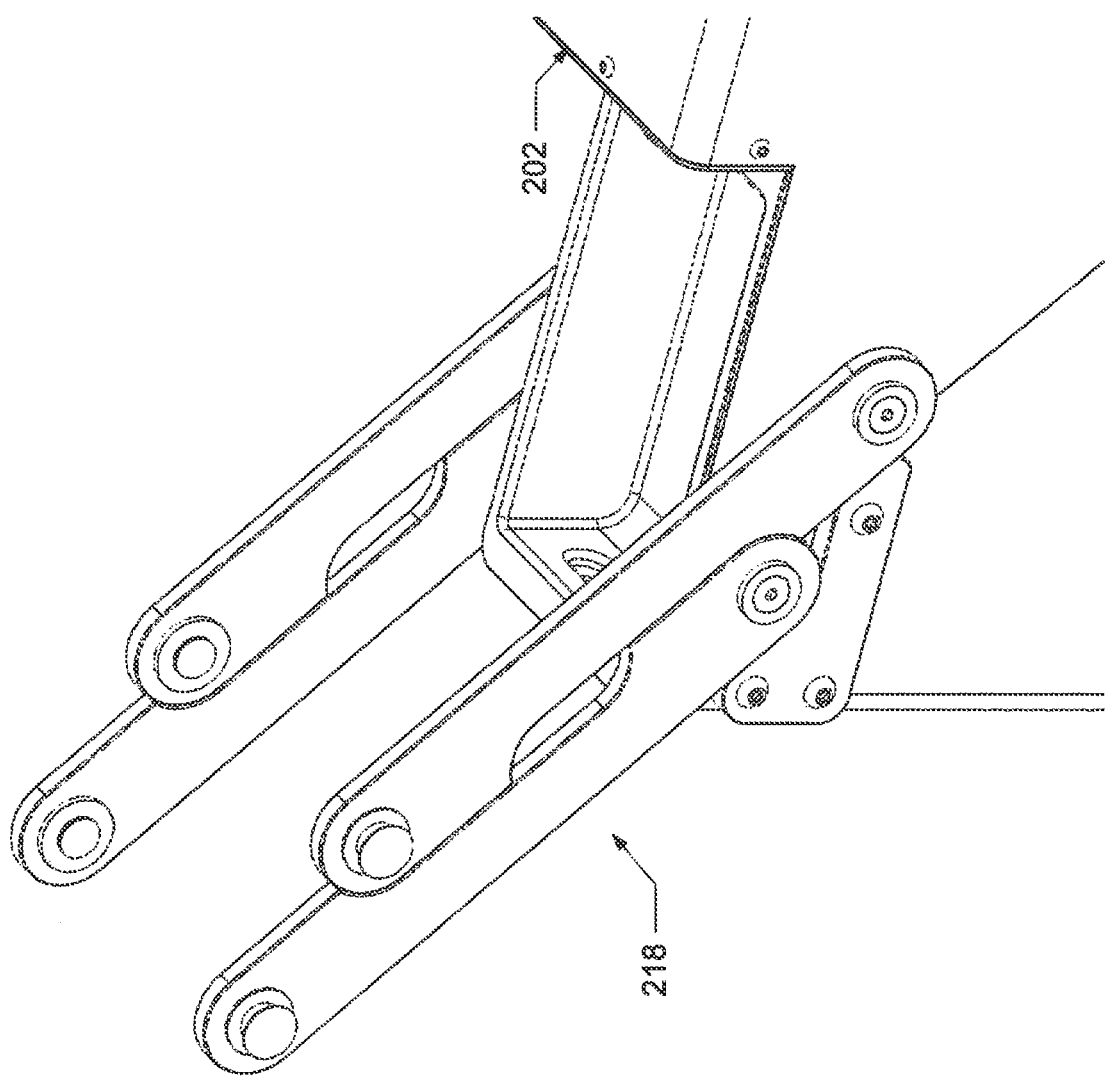
FIG. 37 illustrates an oblique view of the folding mechanism for the seat assembly, according to another embodiment.
Figure 38:
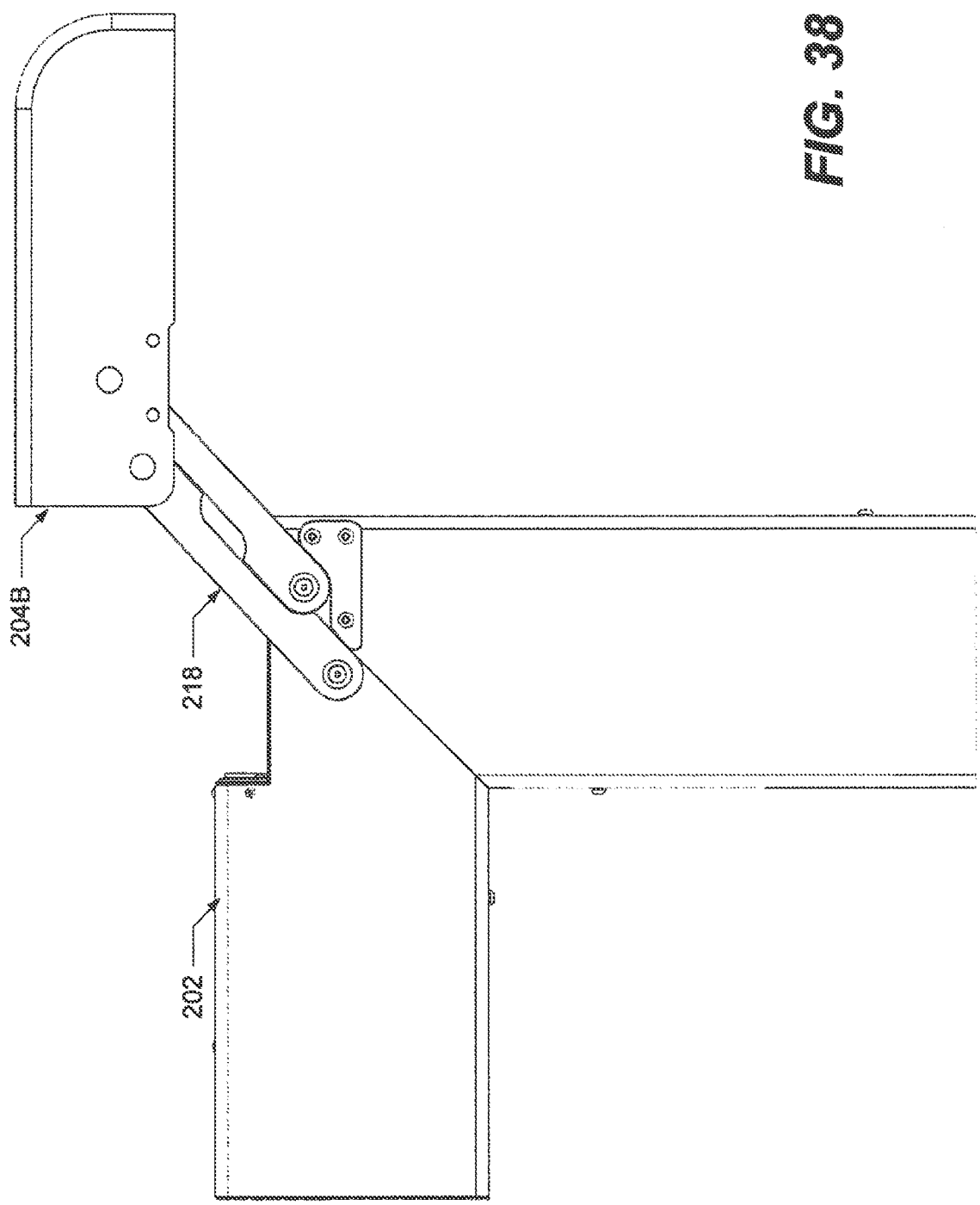
FIG. 38 illustrates a side view of the seat section of the seat assembly coupled to the chassis assembly, according to another embodiment.
Figure 54:
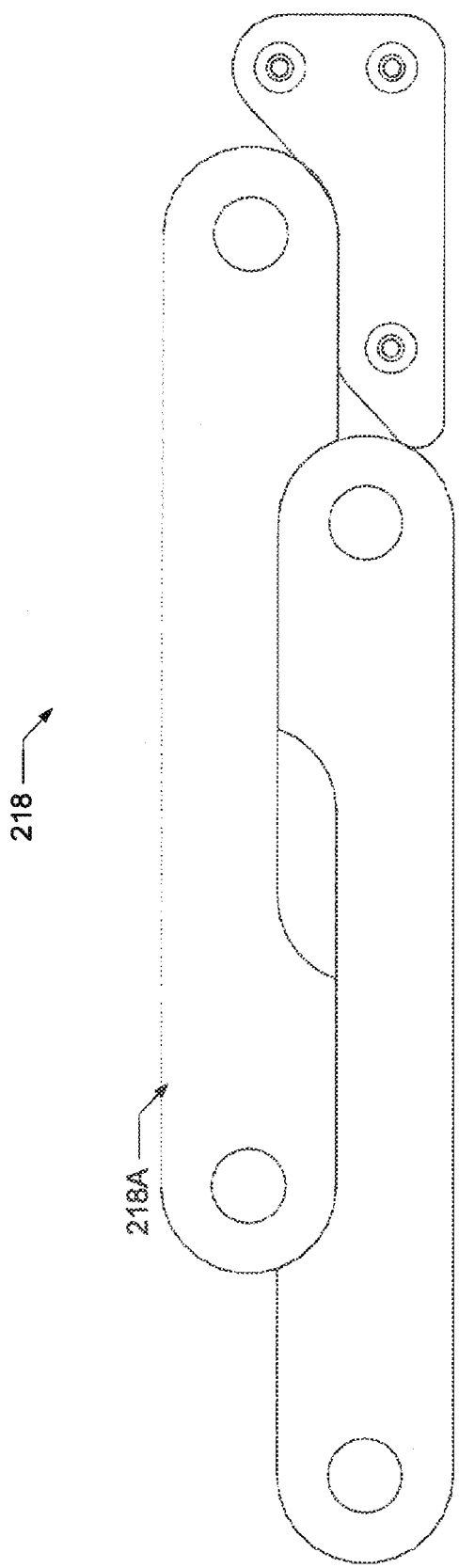
FIG. 54 illustrates a side view of the folding mechanism for the seat assembly in the folded position, according to another embodiment.
Figure 55:
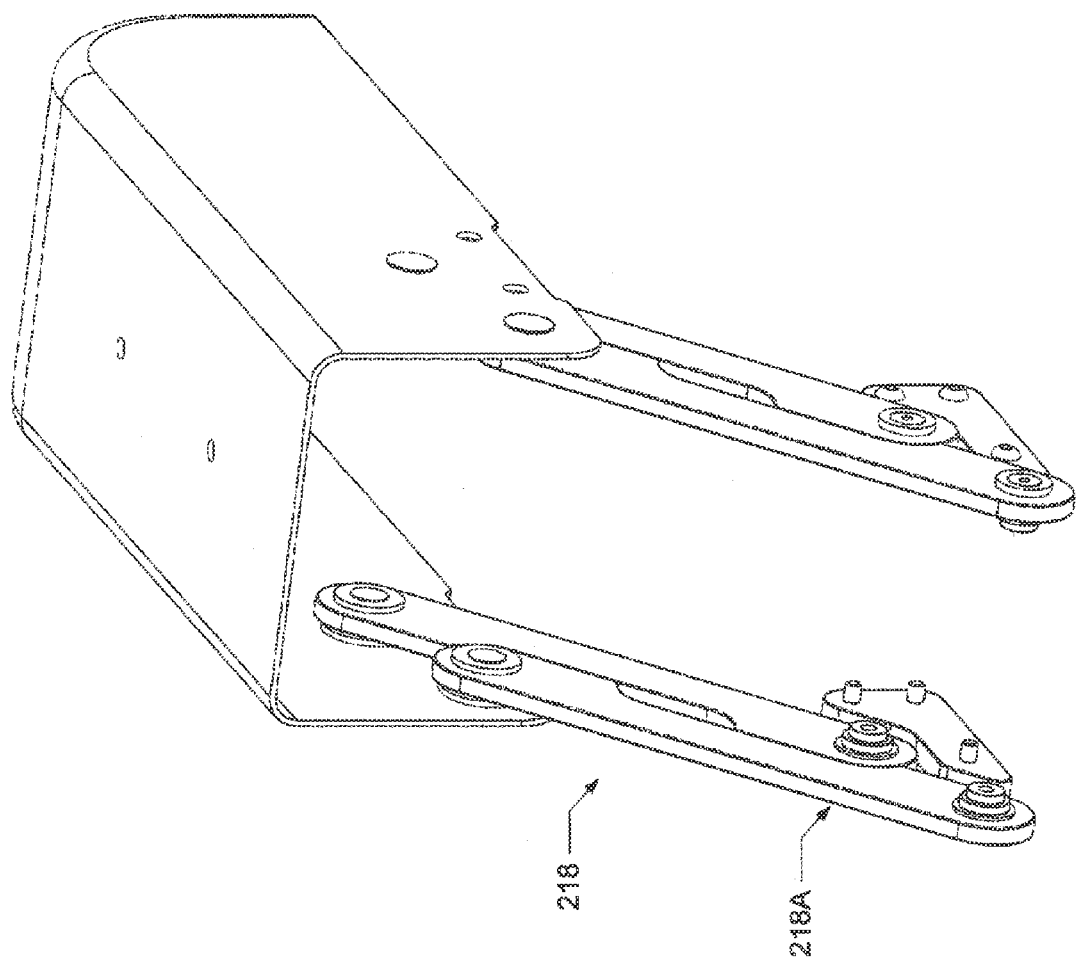
FIG. 55 illustrates an oblique view of the folding mechanism coupled to the seat portion of the seat assembly in the unfolded positions, according to another embodiment.
Figure 68:
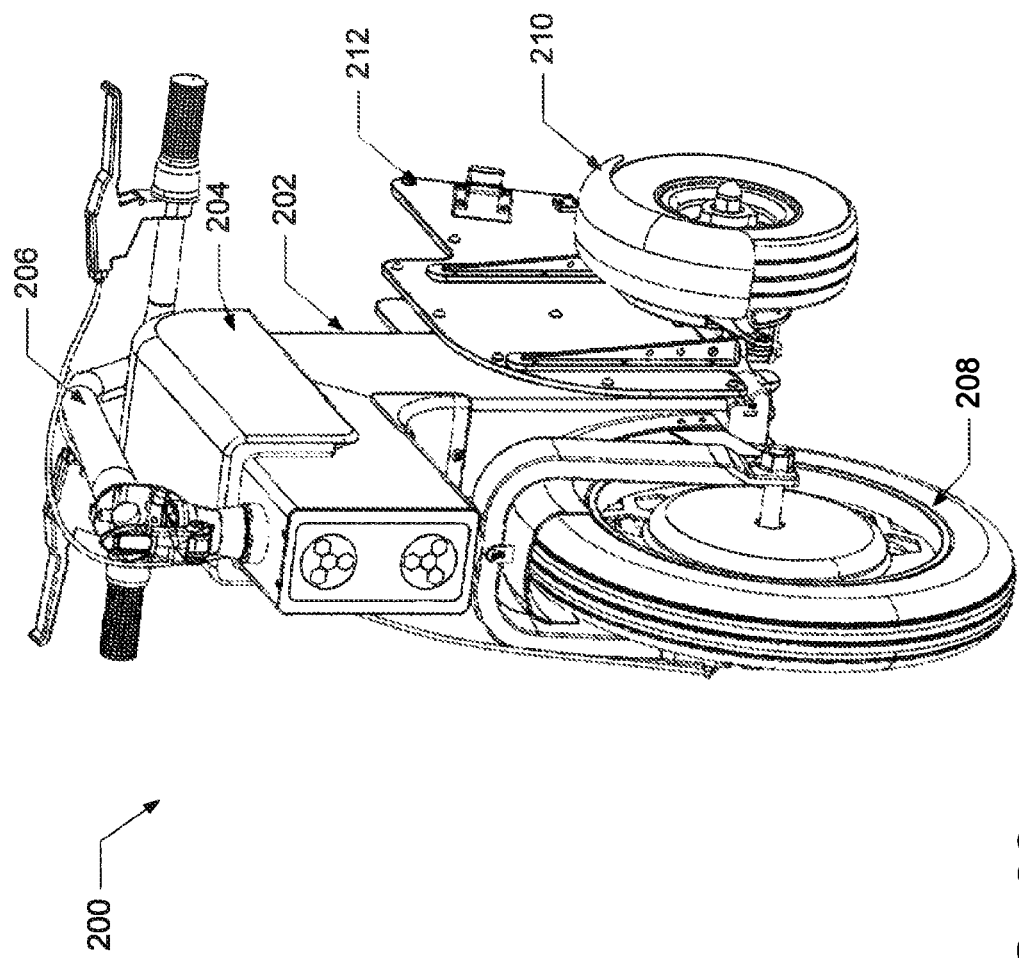
FIG. 68 illustrates an oblique view of the mobility device in the folded state, according to another embodiment.
Figure 70:
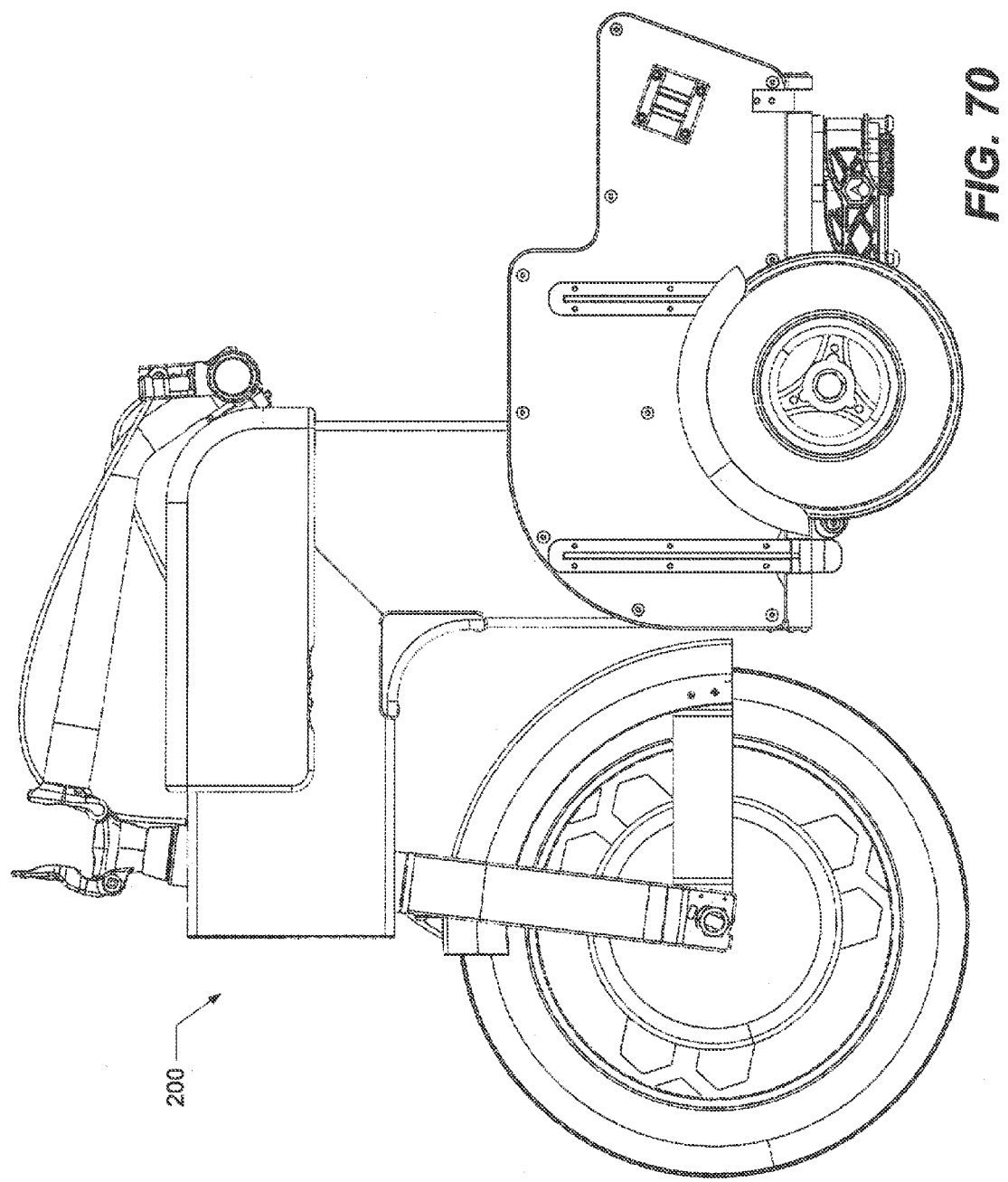
FIG. 70 illustrates a side view of the mobility device in the folded state, according to another embodiment.

Folding mechanism 218 allows seat assembly 204 to be converted between a folded position and an unfolded position. When seat assembly 204 is converted to the folded position, arms 218A are pivoted forwards (FIGS. 53 and 54) so that seat assembly 204 is coupled to and rests on the top portion of chassis assembly 202 (FIGS. 68 and 70). When seat assembly 204 is converted to the unfolded position, arms 218A are pivoted backwards to an oblique position or a predetermined angular position (see FIGS. 33-38). A stopper 234 (FIG. 34) may be mounted on chassis assembly 202 to maintain the angular position of at least one of arms 218A and to support seat assembly 204 in the unfolded position. In a further embodiment, as shown in FIGS. 33, 34, and 54, arms 218A on each side of chassis assembly 202 may be offset in the vertical and horizontal directions so that one of arms 218A rests on the other one of arms 218A when seat assembly 204 is in the folded position and the unfolded position. When seat assembly 204 is in the unfolded position, the offset allows arms 218A to provide a substantially leveled support to seat assembly 204.

Seat assembly 204 may include a seat cover 204A and a support element 204B. Support element 204B is coupled to folding mechanism 218 through the rotatable joints. Seat cover 204A may include a cushion layer mounted on support elements 204B to provide comfort to the user.

Figure 19:
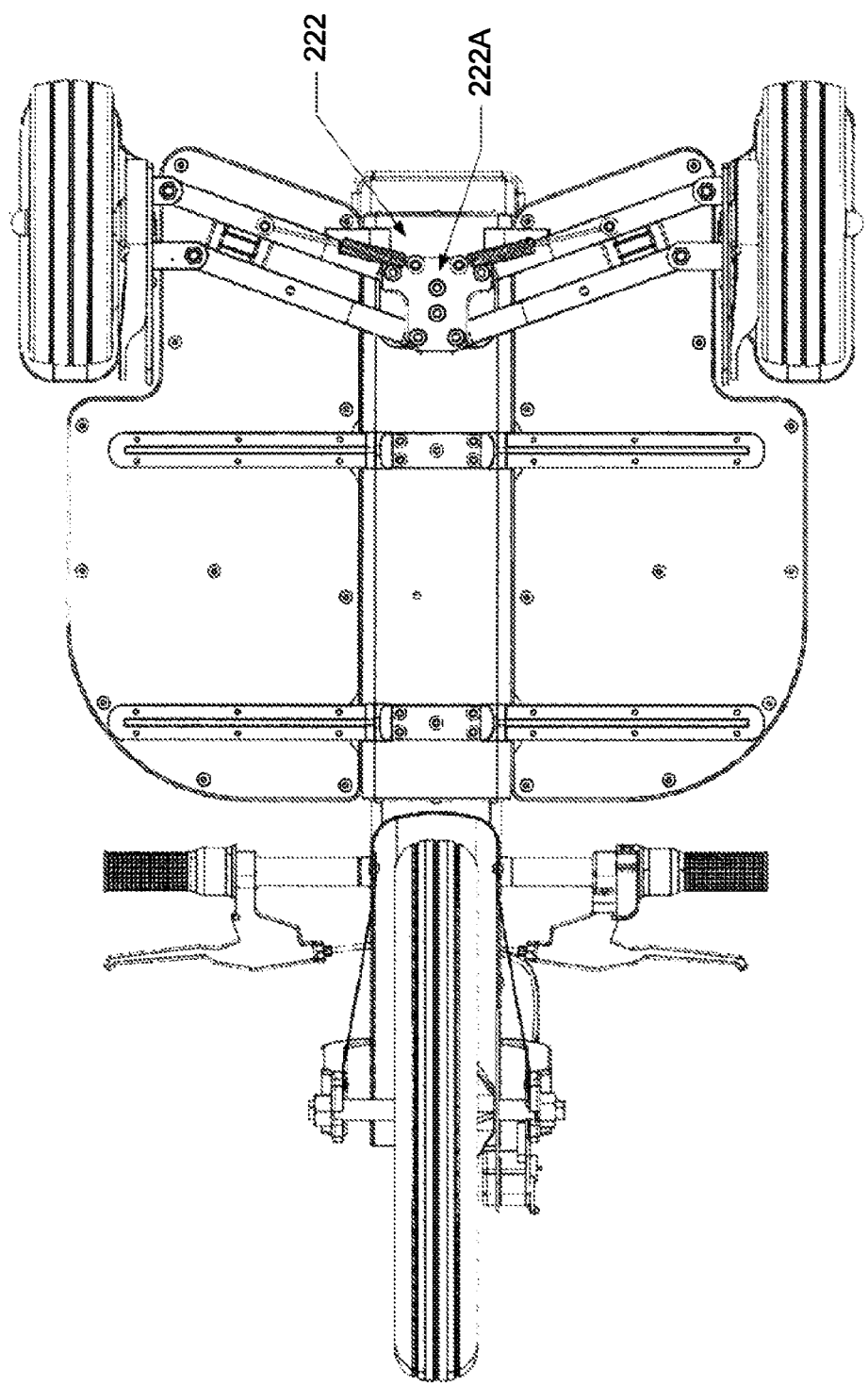
FIG. 19 illustrates a bottom view of the mobility device in the unfolded state, according to another embodiment.
Figure 44:
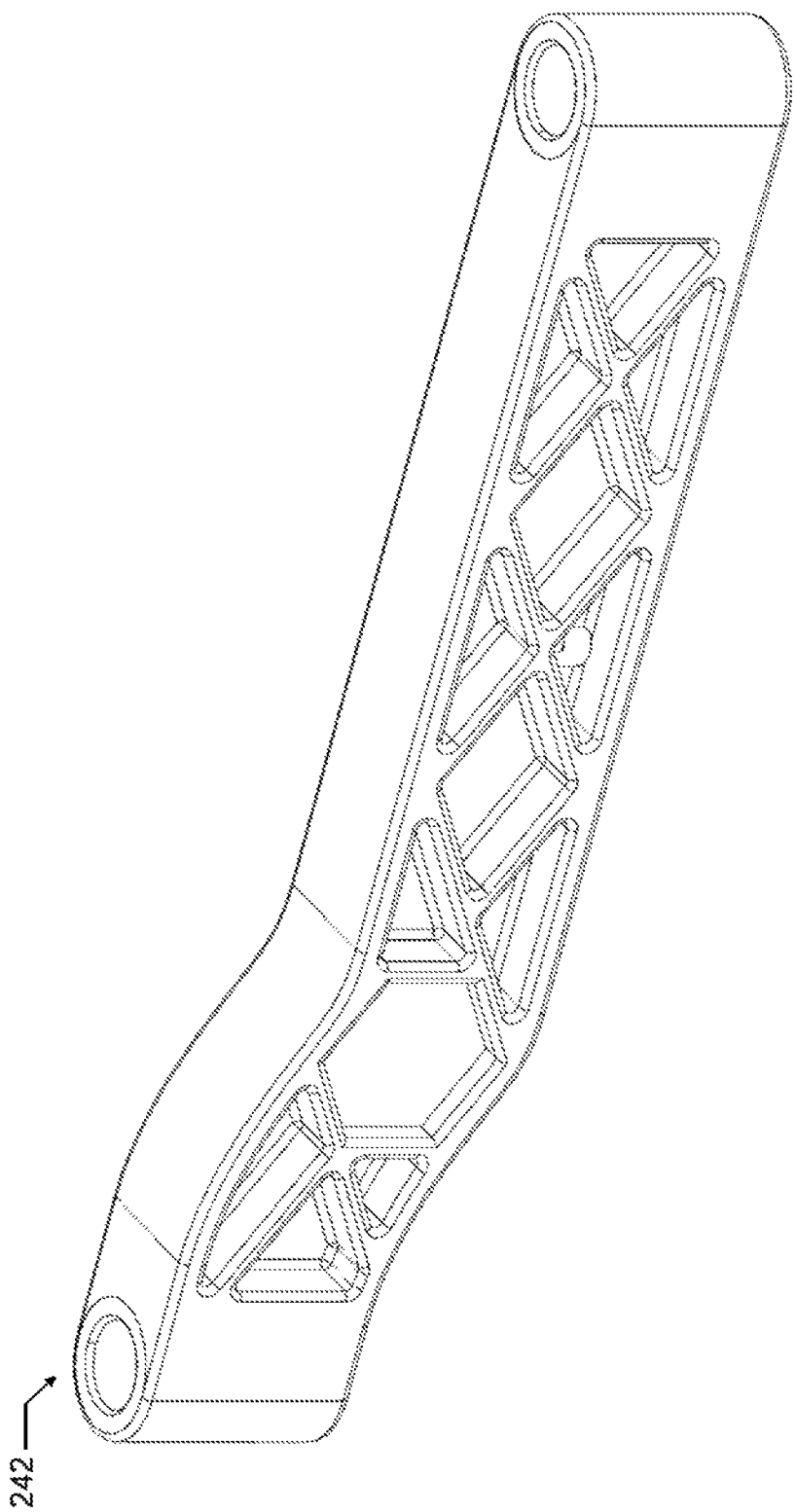
FIG. 44 illustrates an oblique view of a control arm for a folding mechanism for a rear wheel assembly, according to another embodiment.
Figure 45:
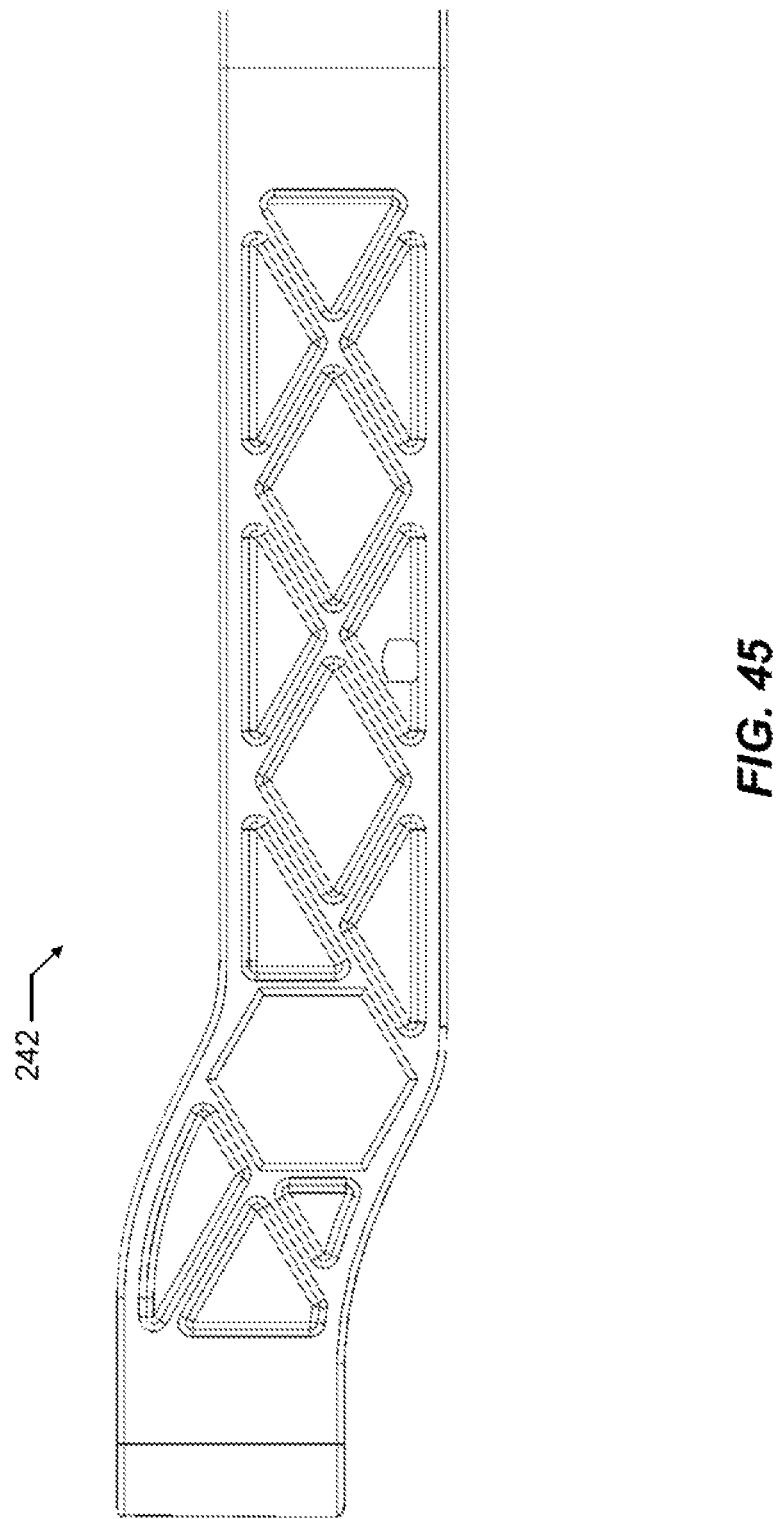
FIG. 45 illustrates a side view of the control arm for the rear wheel assembly, according to another embodiment.
Figure 46:
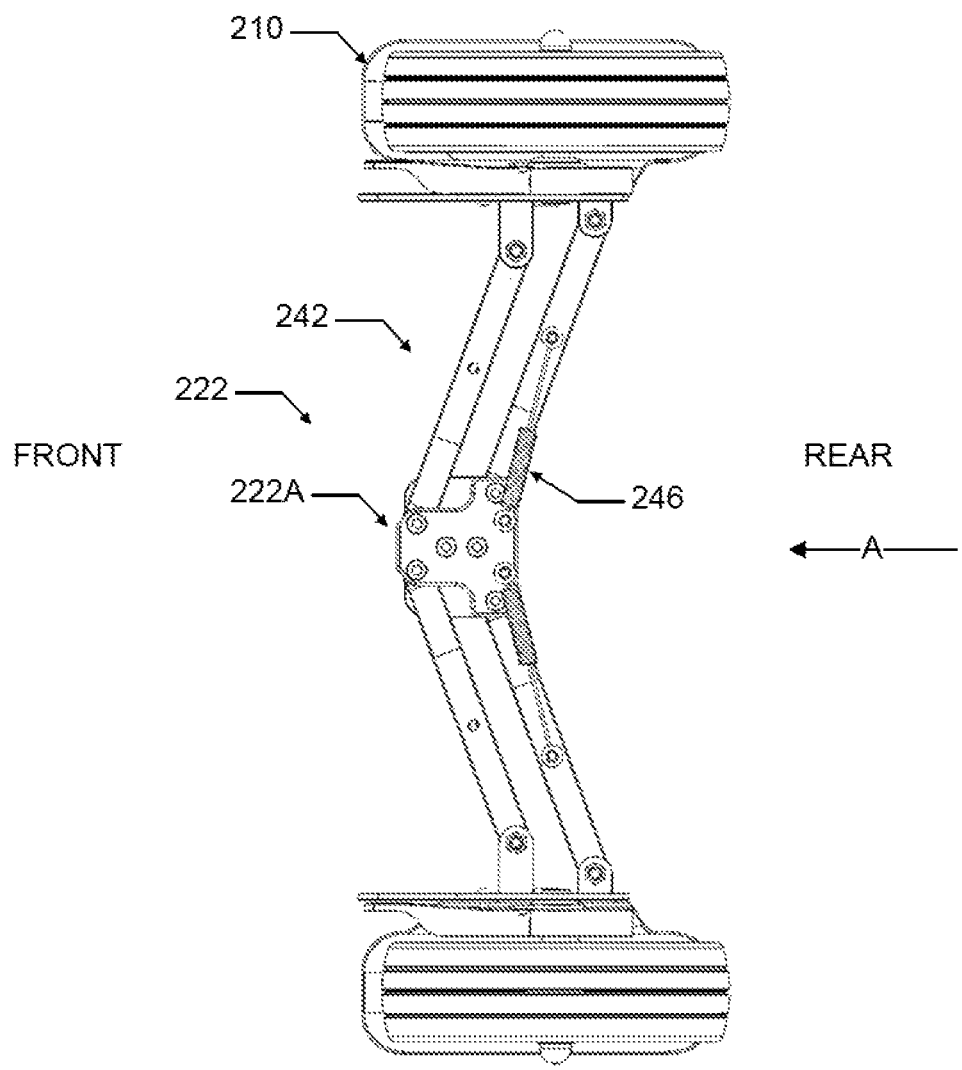
FIG. 46 illustrates a bottom view of the folding mechanism coupled to the rear wheel assemblies, according to another embodiment.
Figure 47:
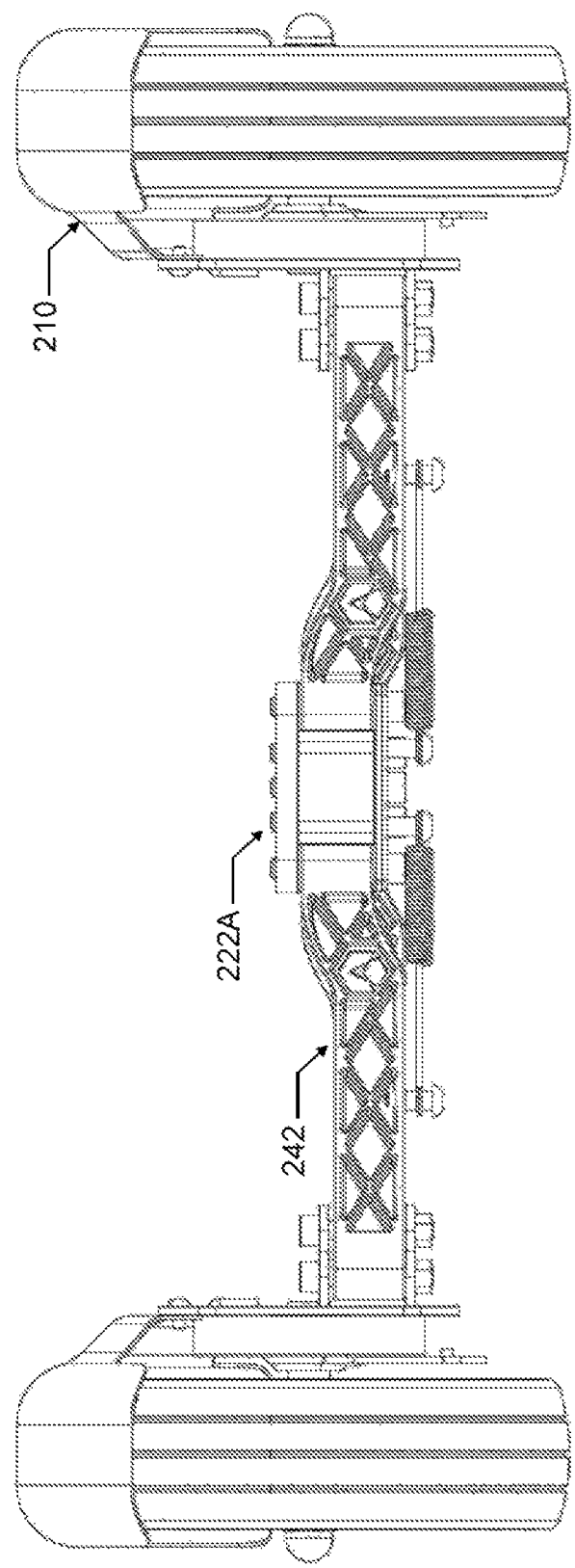
FIG. 47 illustrates a rear view of the folding mechanism coupled to the rear wheel assemblies, according to another embodiment.
Figure 48:
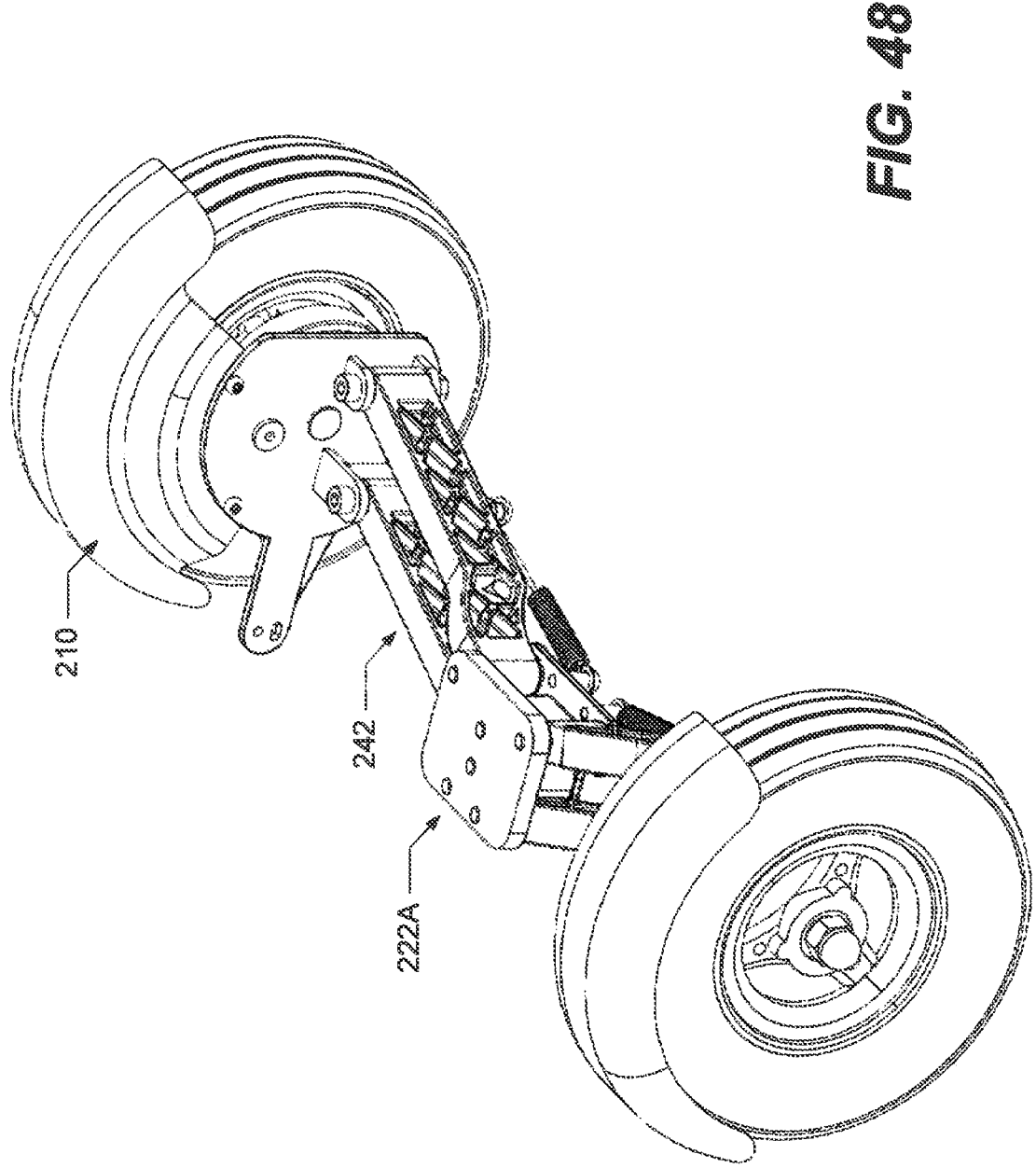
FIG. 48 illustrates an oblique view of the folding mechanism coupled to the rear wheel assemblies, according to another embodiment.
Figure 49:
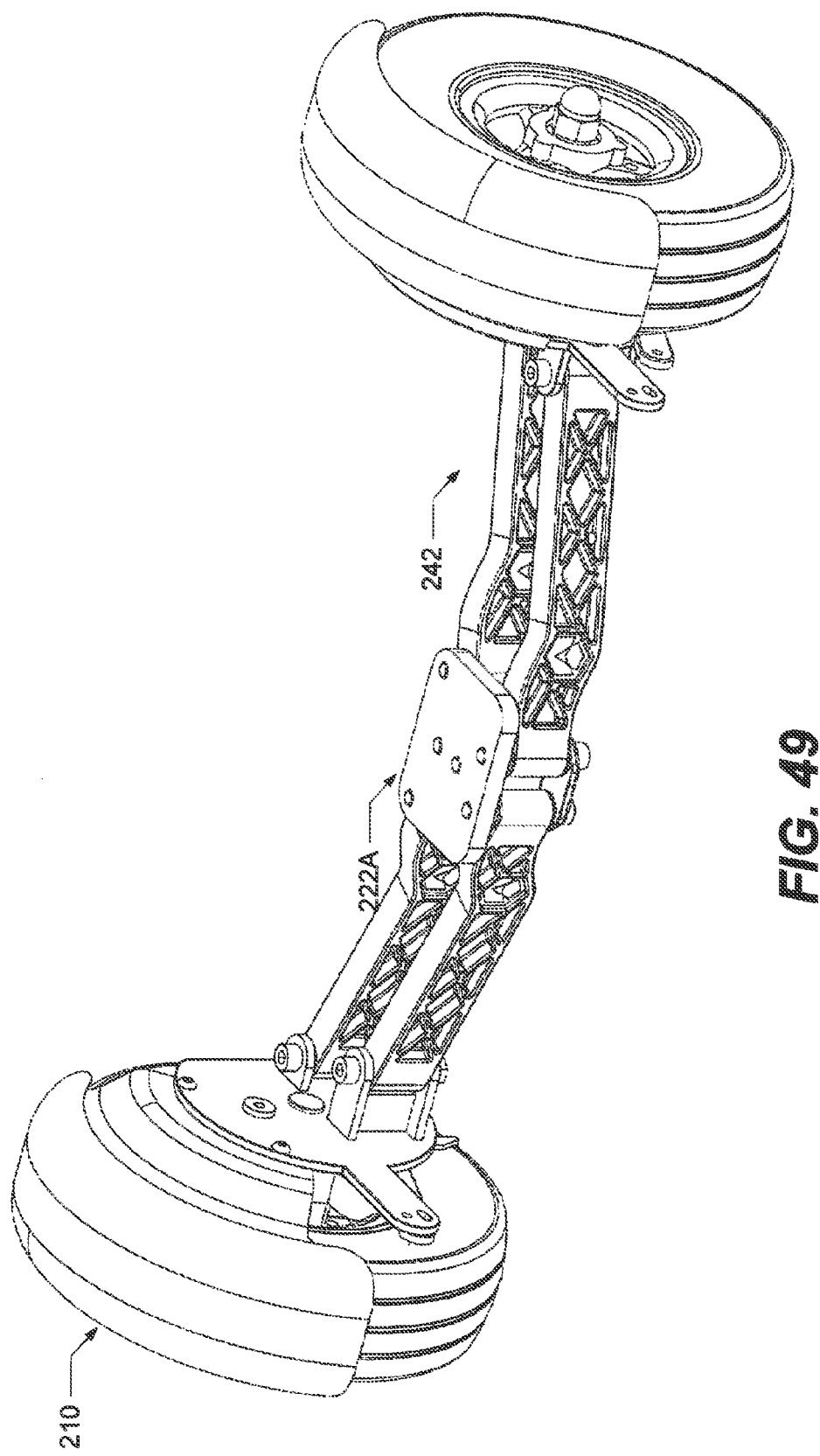
FIG. 49 illustrates another oblique view of the folding mechanism coupled to the rear wheel assemblies, according to another embodiment.

FIGS. 44-52 and 72-75 illustrate additional embodiments of rear wheel assembly 210 and folding mechanism 222 for connecting rear wheel assembly 210 to chassis assembly 202. As shown in FIGS. 46-47, folding mechanism 222 may include a center hub 222A and a plurality of control arms 242. Center hub 222A may be mounted to the bottom surface of base section 202B of chassis assembly 202 (FIG. 19). Control arms 242 may each have an elongated body with a shaft housing disposed at each end section of the elongated body (FIGS. 44 and 45). As shown in FIG. 46, which illustrates a bottom view of rear wheel assembly 210 and folding mechanism 222, control arms 242 may be connected to respective rear wheel assembly 210 and center hub 222A through rotatable joints. As further shown in FIG. 52, center hub 222A may include a top plate 5202 having a plurality of half shafts 5204 protruding therefrom. Each control arm 242 may be mounted to the center hub 222A through respective half shaft 5204 that passes through the shaft housing at a first end of control arm 242. Each rear wheel assembly 210 may include a shaft 256 passing through the shaft housing at a second end of control arm 242. Accordingly, each control arm 242 may be pivoted or rotated with respect to center hub 222A and respective rear wheel assembly 210.

Folding mechanism 222 allows rear wheel assembly 210 to be converted between a folded position (as shown in FIGS. 56-61) and an unfolded position (as shown in FIGS. 46-49). When control arm 242 is pivoted backwards to a first angular position with respect to center hub 222A (FIG. 50), rear wheel assembly 210 moves backwards and outwards with respect to chassis assembly 202 to the unfolded position (as shown in FIGS. 46-52). When control arm 242 is pivoted forwards to a second angular position with respect to center hub 222A (FIG. 73), rear wheel assembly 210 moves forwards and inwards with respect to chassis assembly 202 to the folded position (as shown in FIGS. 72-75).

Control arms 242 extend substantial laterally with respect to chassis assembly 202 in the first angular position and extend substantially axially with respect to chassis assembly 202 in the second angular position. Thus, rear wheel assemblies 210 in their folded positions have a much less lateral span than in their unfolded positions, thereby forming a more compact structure.

As further shown in FIGS. 46-48 and 57, a spring element 246 may be connected between the body of each control arm 242 and center hub 222A. Spring element 246 may provide an increased resistance within folding mechanism 222 and prevent rear wheel assembly 210 from being accidentally converted between the folded and unfolded positions.

Figure 50:
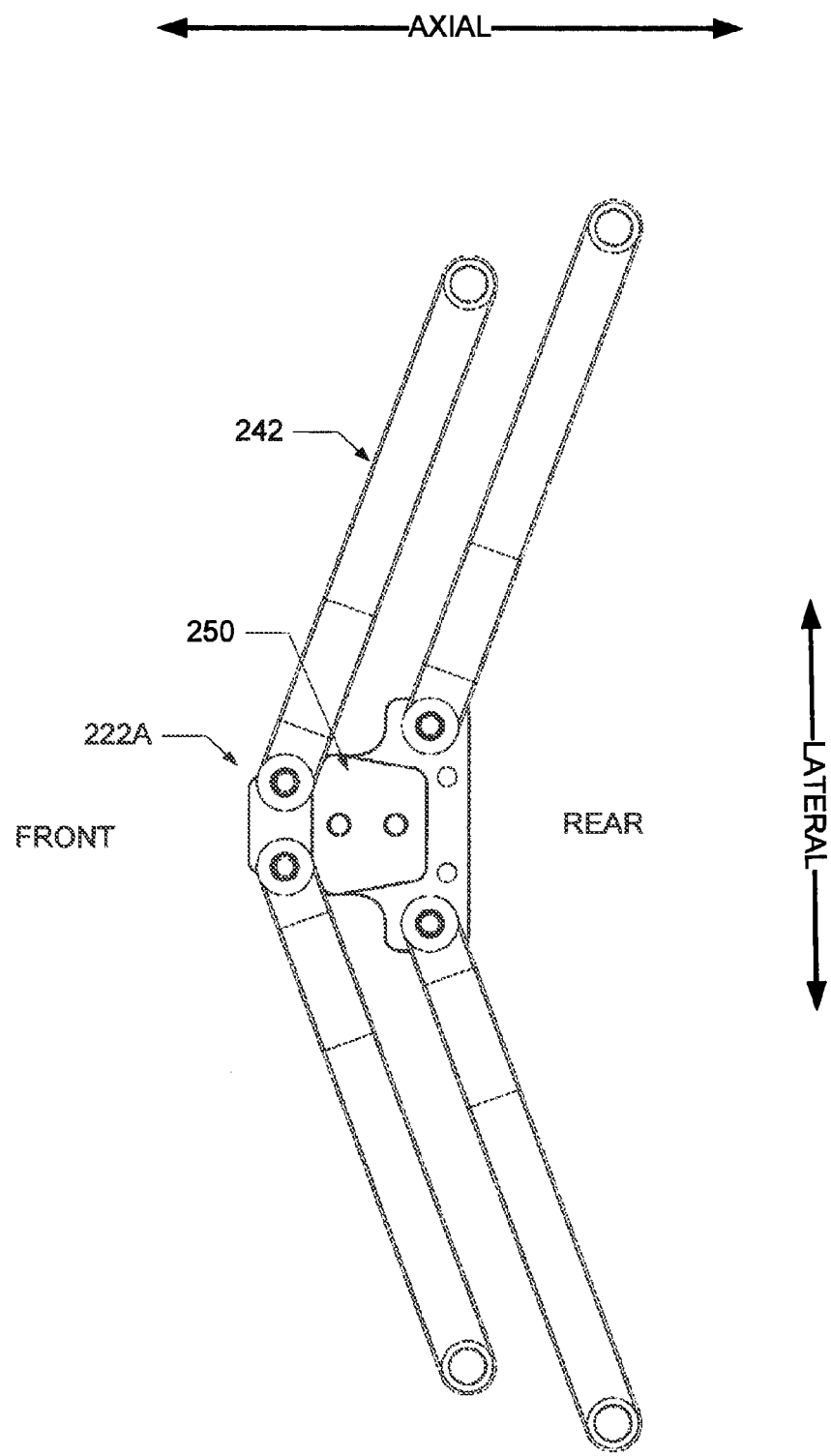
FIG. 50 illustrates a bottom view of the folding mechanism for the rear wheel assemblies, according to another embodiment.
Figure 51:
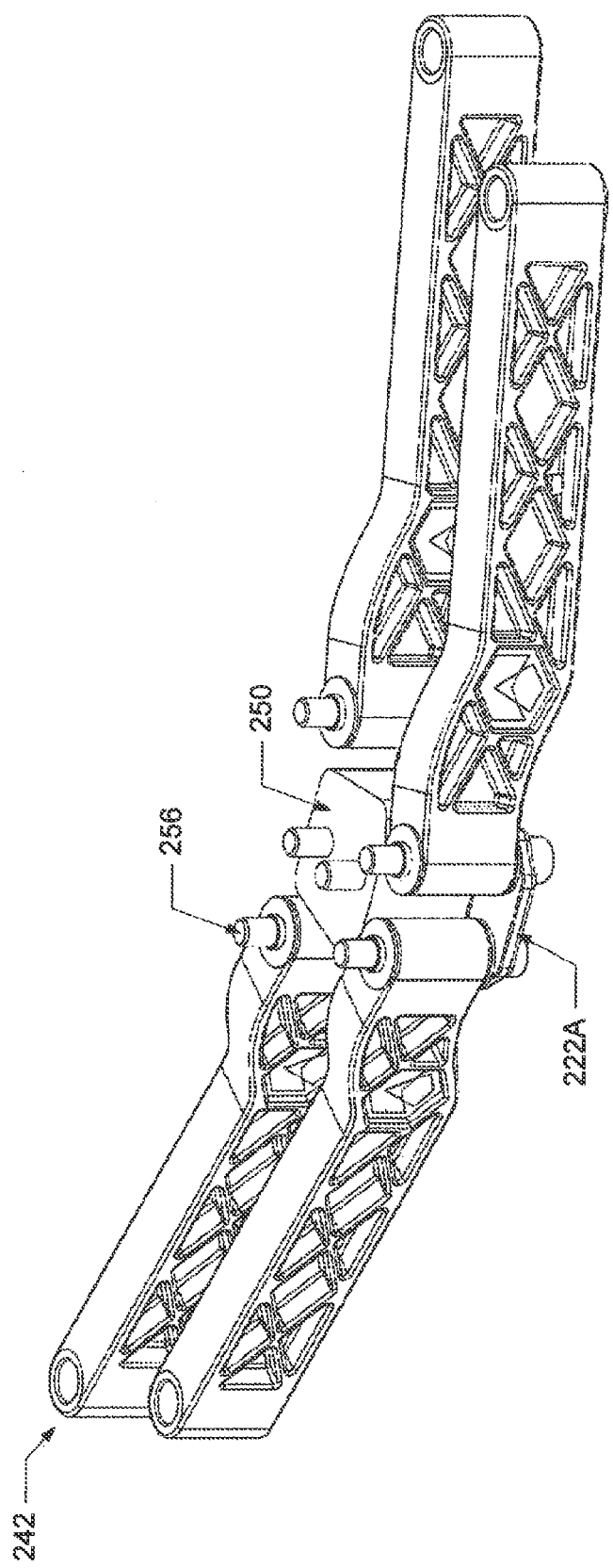
FIG. 51 illustrates an oblique view of the folding mechanism for the rear wheel assemblies, according to another embodiment.
Figure 52:
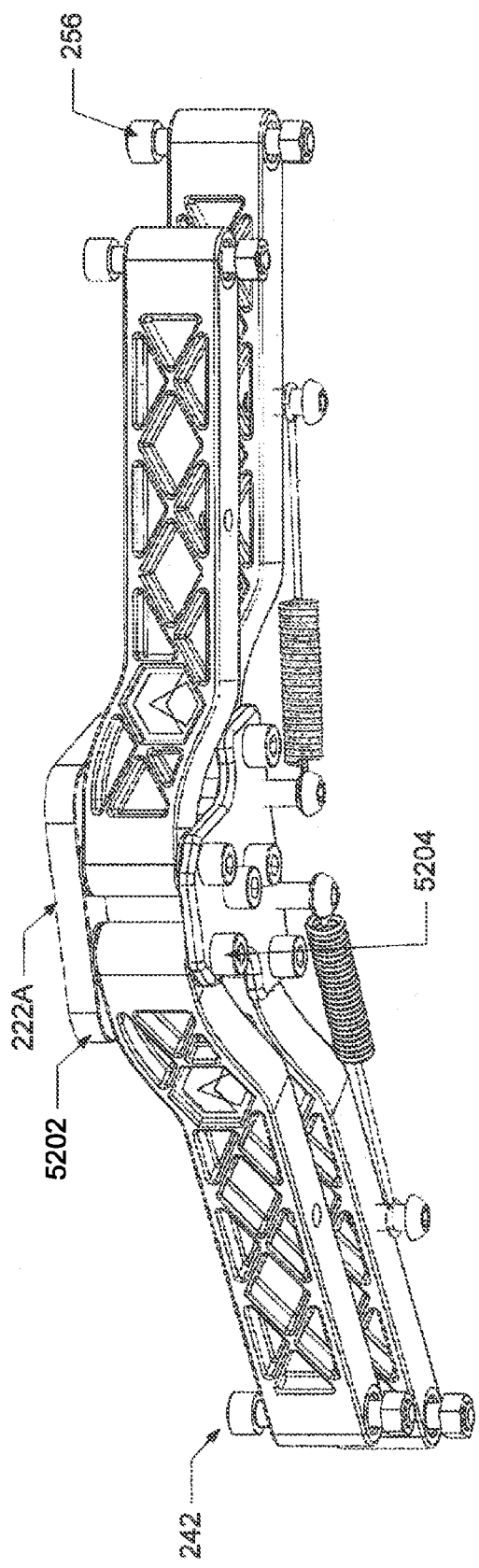
FIG. 52 illustrates another oblique view of the folding mechanism for the rear wheel assemblies, according to another embodiment.
Figure 53:
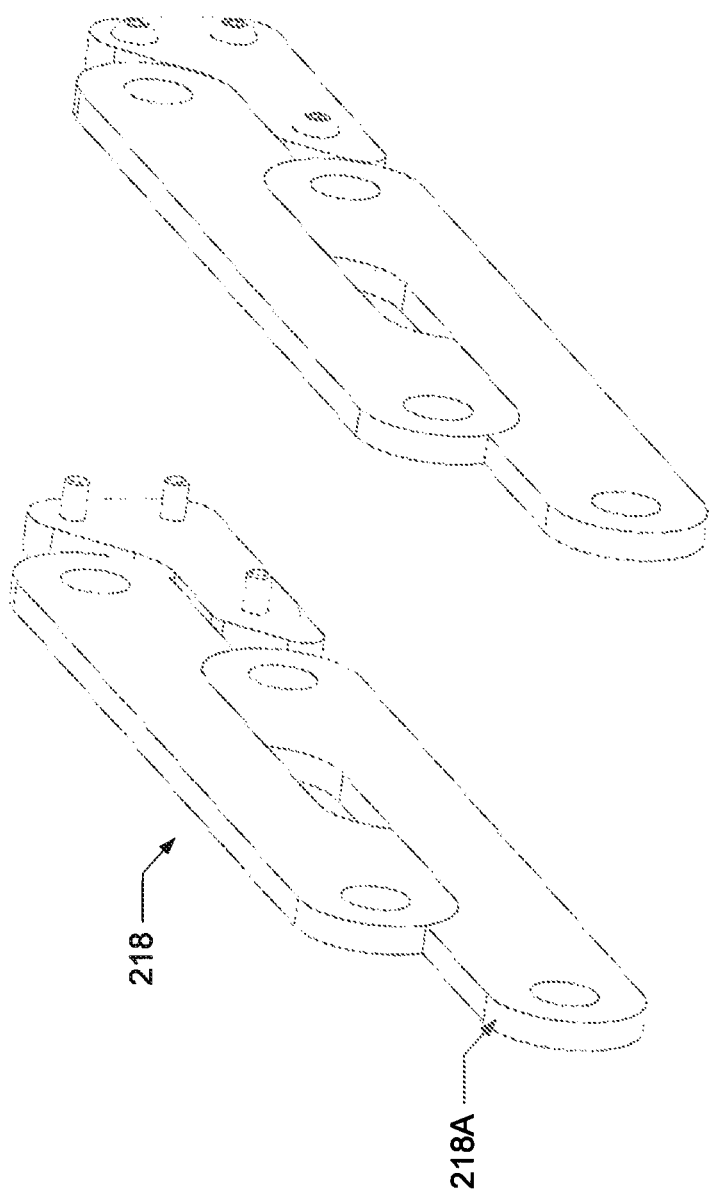
FIG. 53 illustrates an oblique view of the folding mechanism for the seat assembly in a folded position, according to another embodiment.

As further shown in FIGS. 50 and 51, center hub 222A may further include a stopper 250 for positioning control arms 242 at the unfolded position and prevent rear wheel assembly 210 from moving further backwards beyond a desired position during operation of device 200. In an embodiment, each rear wheel assembly 210 is coupled to a pair of substantially parallel control arms 242. Control arms 242 for each rear wheel assembly 210 remain parallel during the rotation between the first angular position and the second angular position. Stopper 250 may include a reinforced element coupled to center hub 222A and is pressed against at least one of control arms 242 corresponding to each rear wheel assembly 210 when rear wheel assembly 210 is converted to its unfolded position.

Figure 56:
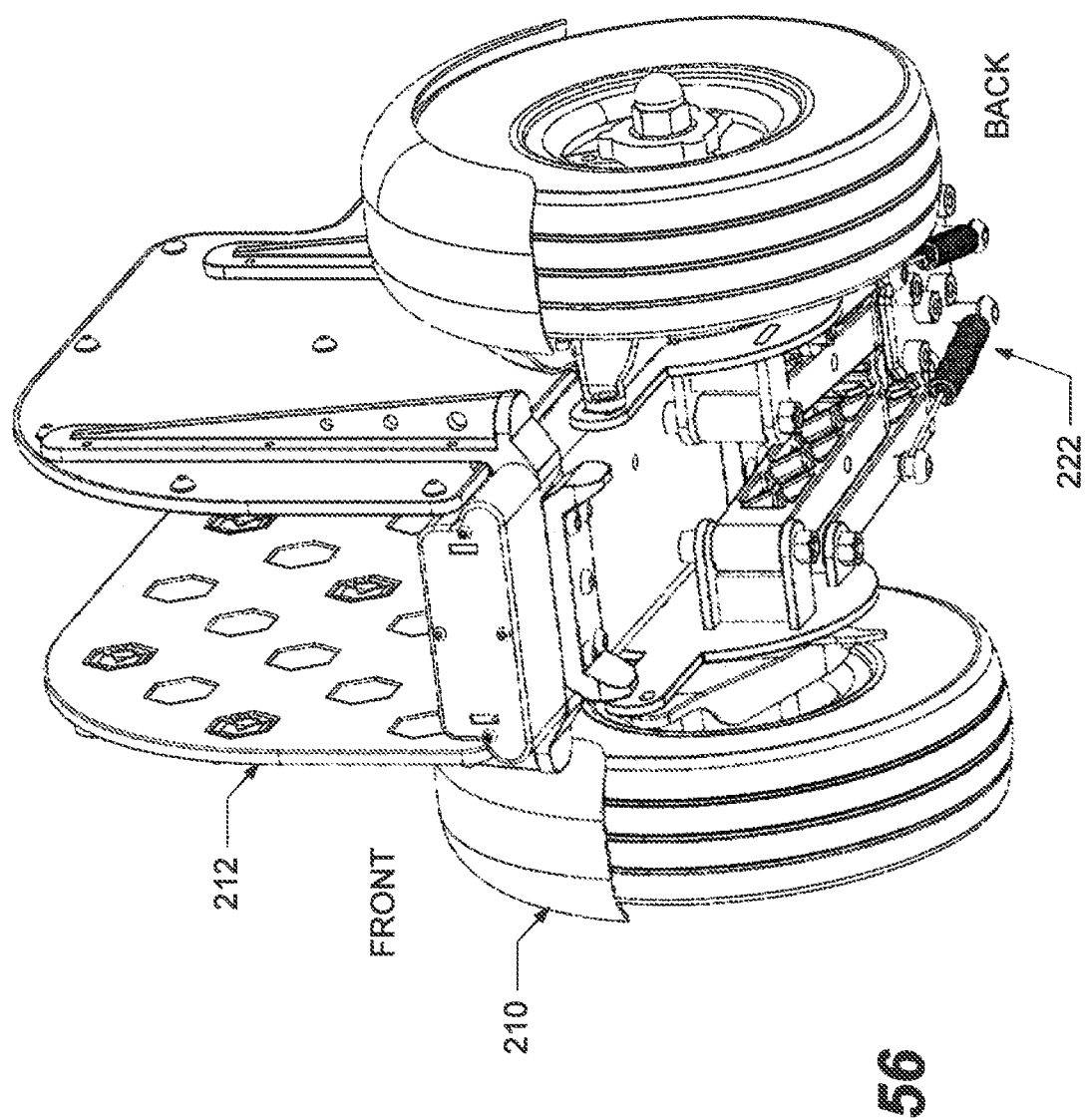
FIG. 56 illustrates an oblique view of the floor assembly and the rear wheel assemblies in the folded positions, according to another embodiment.
Figure 57:
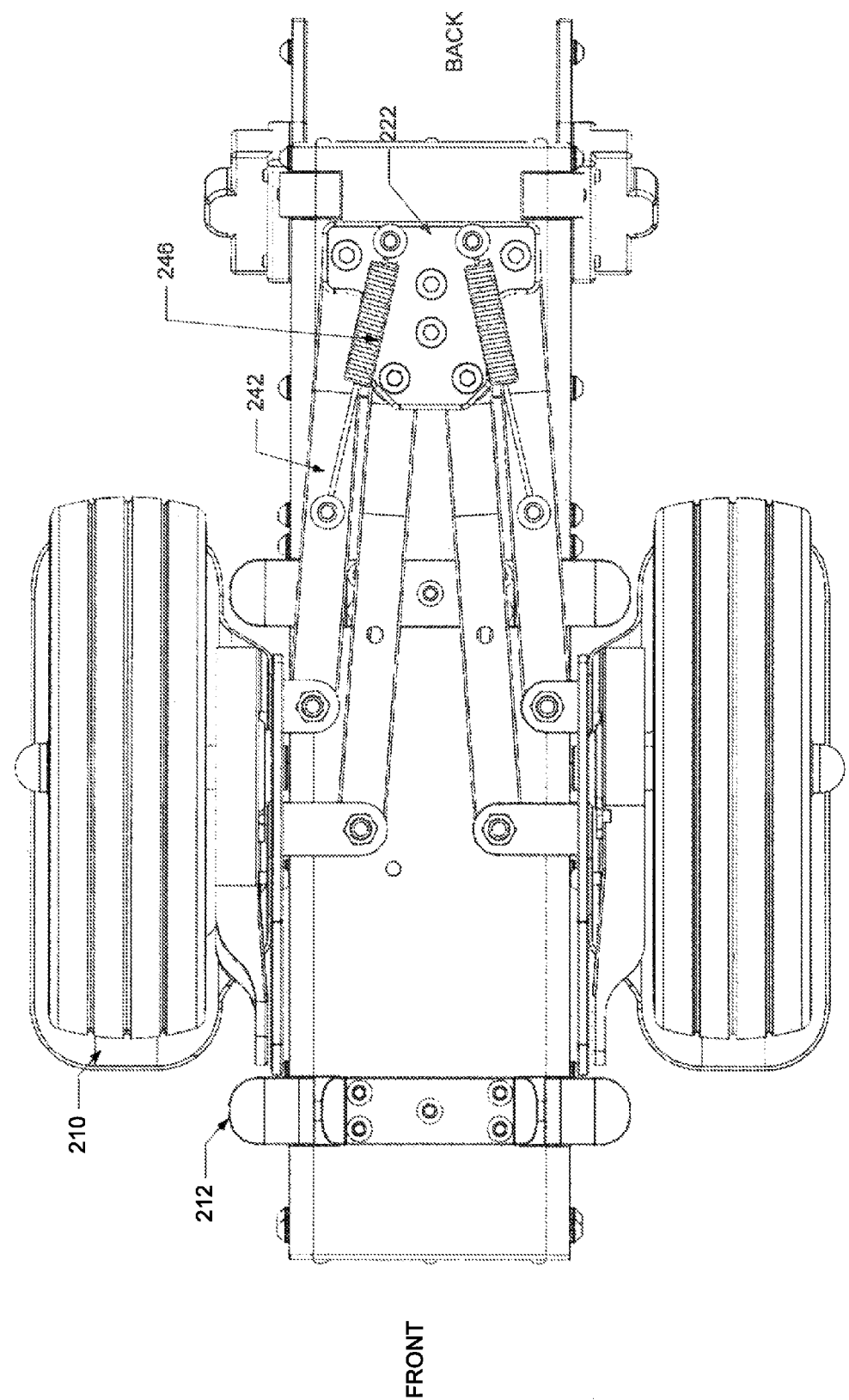
FIG. 57 illustrates a bottom view of the floor assembly and the rear wheel assemblies in the folded positions, according to another embodiment.
Figure 58:
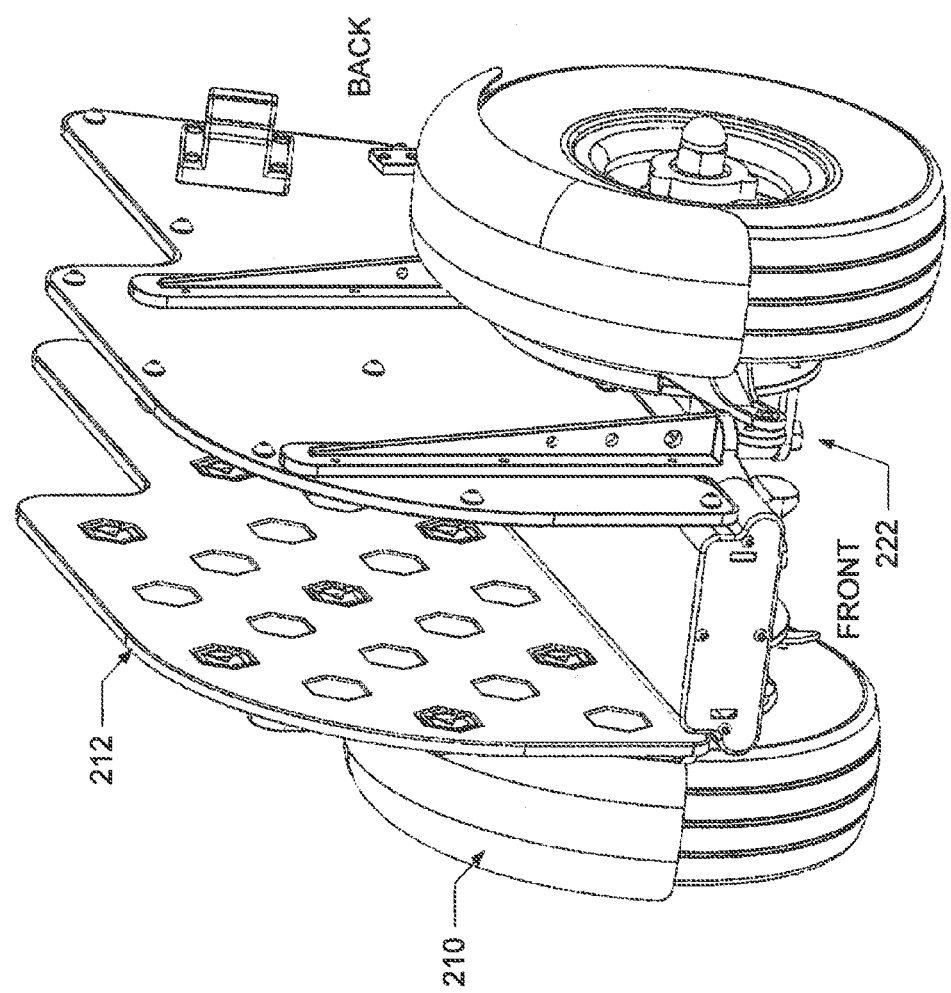
FIG. 58 illustrates another oblique view of the floor assembly and the rear wheel assemblies in the folded positions, according to another embodiment.
Figure 59:
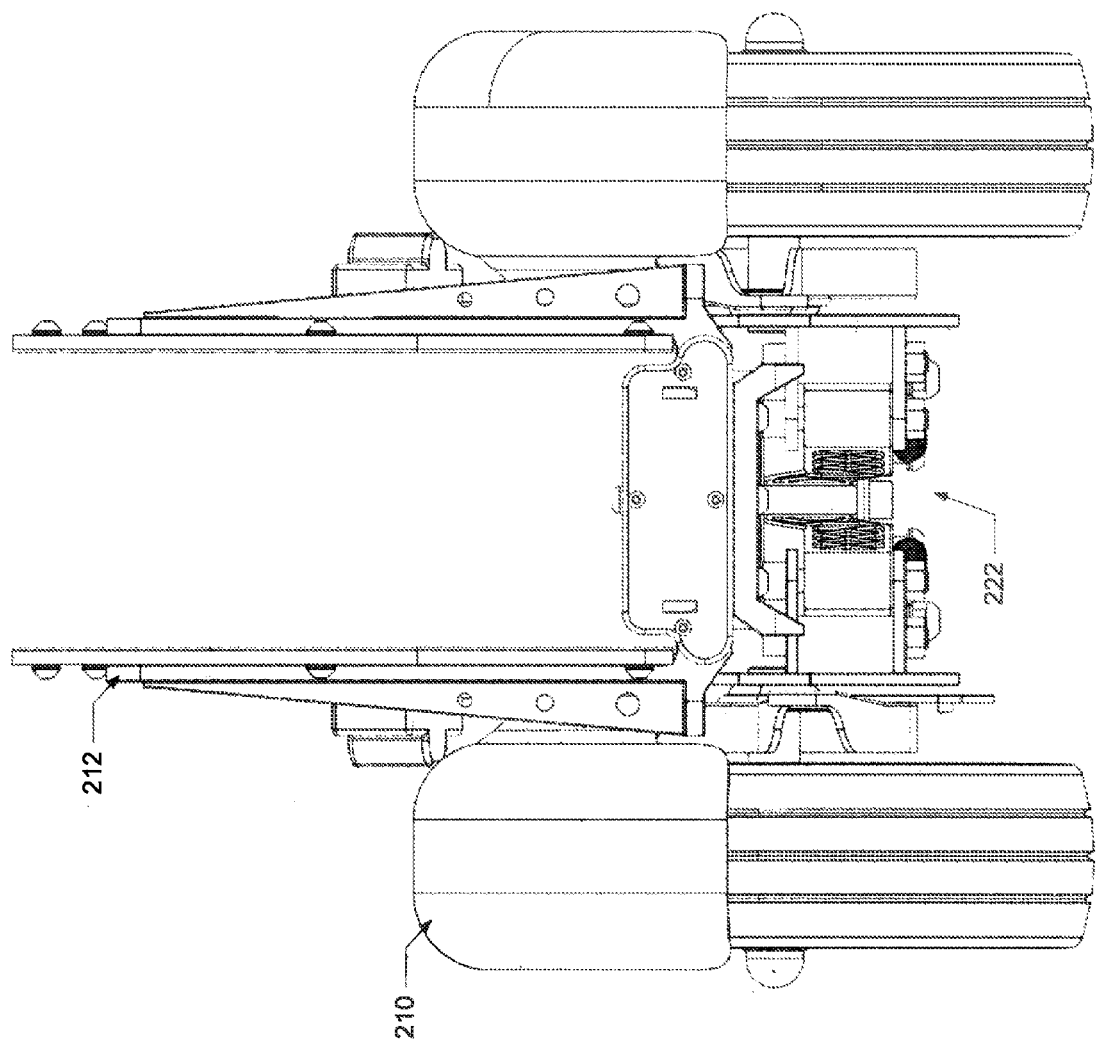
FIG. 59 illustrates a front view of the floor assembly and the rear wheel assemblies in the folded positions, according to another embodiment.
Figure 60:
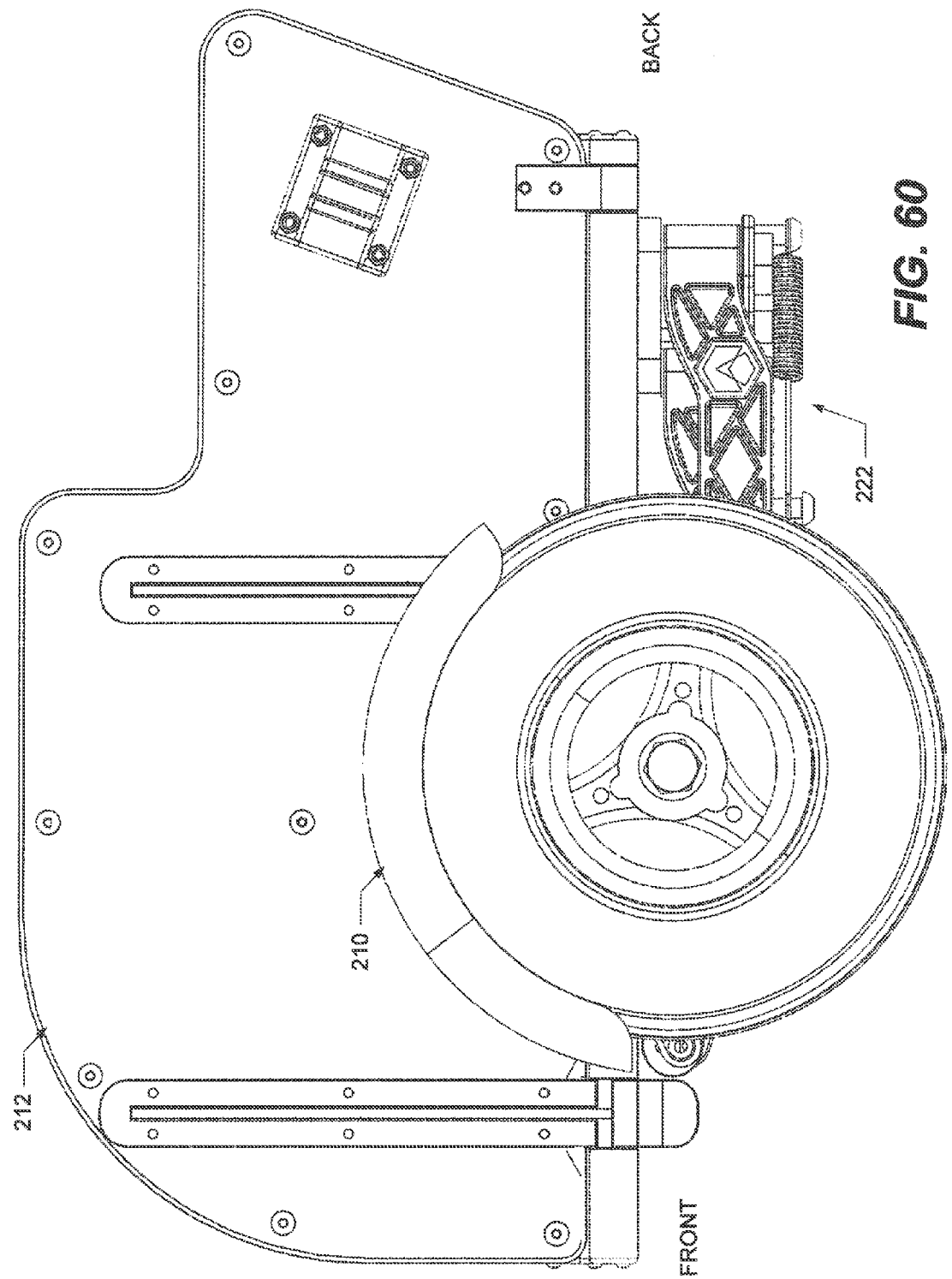
FIG. 60 illustrates a side view of the floor assembly and the rear wheel assemblies in the folded positions, according to another embodiment.
Figure 61:
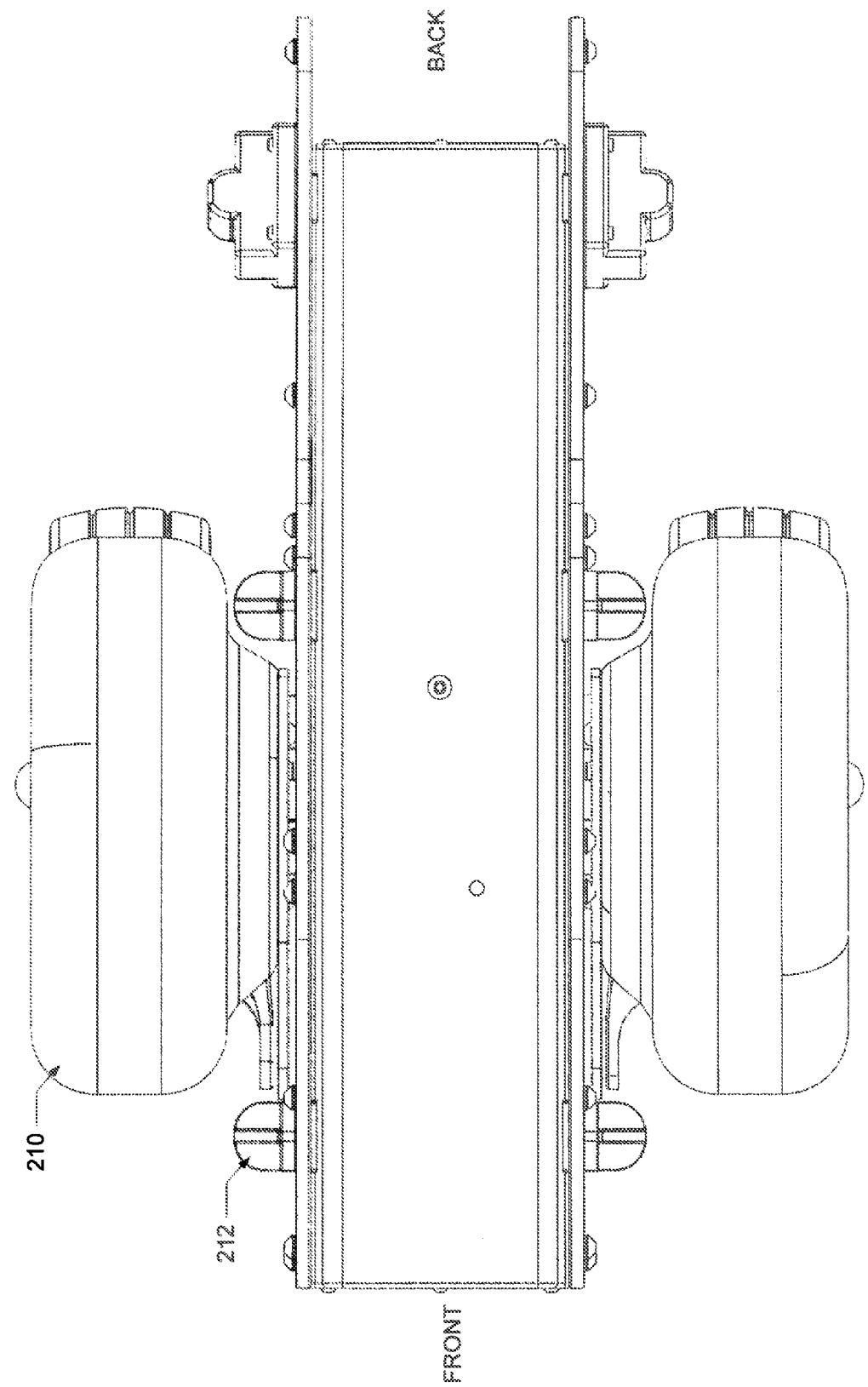
FIG. 61 illustrates a top view of the floor assembly and the rear wheel assemblies in the folded positions, according to another embodiment.

FIGS. 56-61 illustrate various views of floor assembly 212, rear wheel assembly 210, and folding mechanism 222 in their folded positions, according to some embodiments. In these figures, steering assembly 206, front wheel assembly 208, seat assembly 204, and upper section 202A of chassis assembly 202 are omitted for ease of illustration. FIG. 56 illustrates an oblique view showing that floor assembly 212 is pivoted to a vertical folded position (i.e., the folded position). Rear wheel assemblies 210 are pivoted forwards to the folded positions and pressed against the bottom surface of respective floor board 212A and 212B. As a result, the structure formed by floor assembly 212, rear wheel assembly 210, and folding mechanism 222 in their folded positions has a smaller lateral span than in their unfolded positions. FIG. 57 illustrates a bottom view of floor assembly 212, rear wheel assembly 210, and folding mechanism 222 in their folded positions. FIG. 58 illustrates another oblique view of floor assembly 212, rear wheel assembly 210, and folding mechanism 222 in their folded positions. FIG. 59 illustrates a front view of floor assembly 212, rear wheel assembly 210, and folding mechanism 222 in their folded positions. FIG. 60 illustrates a side view of floor assembly 212, rear wheel assembly 210, and folding mechanism 222 in their folded positions. FIG. 61 illustrates a top view of floor assembly 212, rear wheel assembly 210, and folding mechanism 222 in their folded positions.

In an embodiment, rear wheel assemblies 210 may be folded and unfolded independently from each other. Thus, folding one of the rear wheel assemblies 210 does not affect the other. In another embodiment, rear wheel assemblies 210 may be folded simultaneously when any one of rear wheel assemblies 210 is folded.

Figure 66:
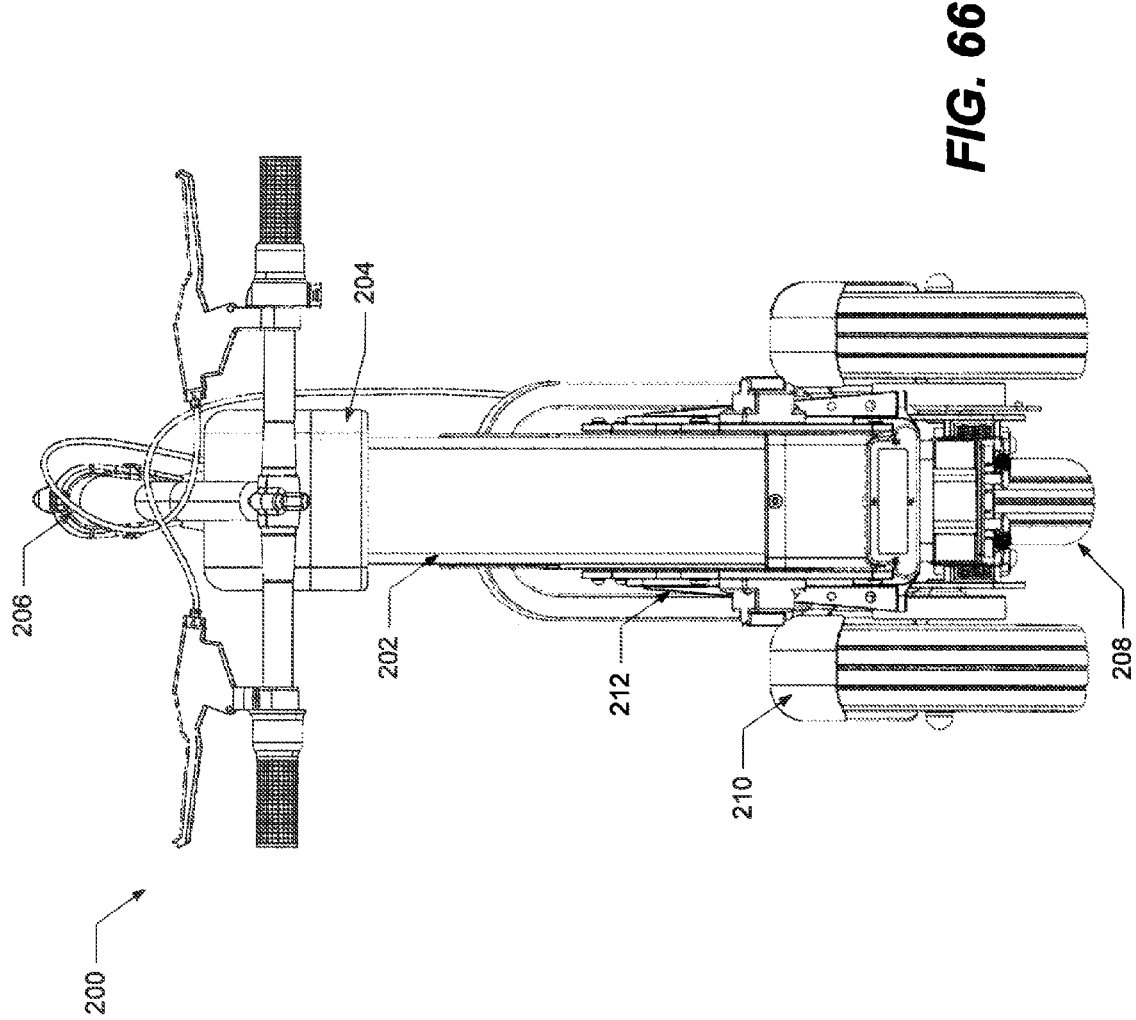
FIG. 66 illustrates a rear view of the mobility device in a folded state, according to another embodiment.
Figure 67:
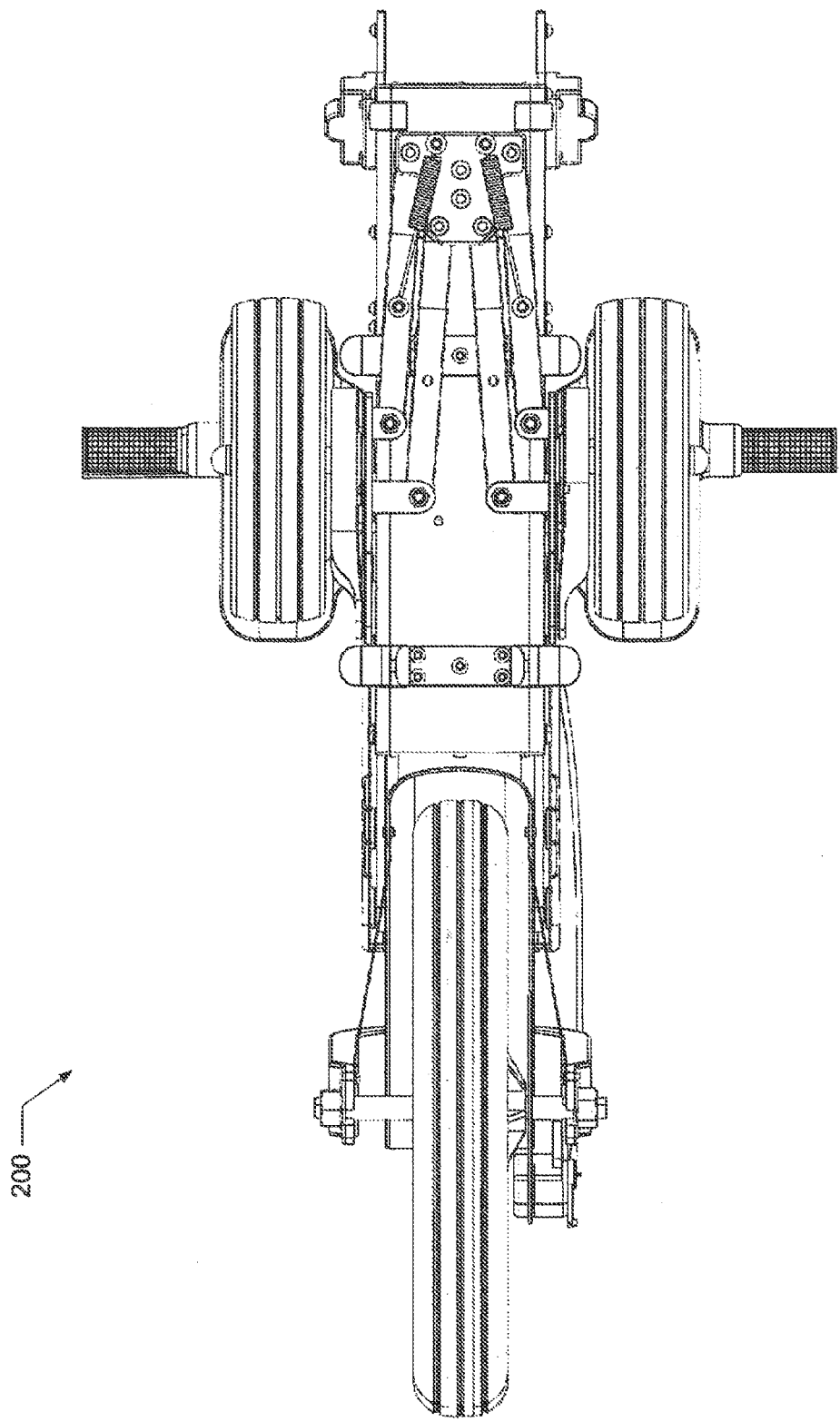
FIG. 67 illustrates a bottom view of the mobility device in the folded state, according to another embodiment.
Figure 69:
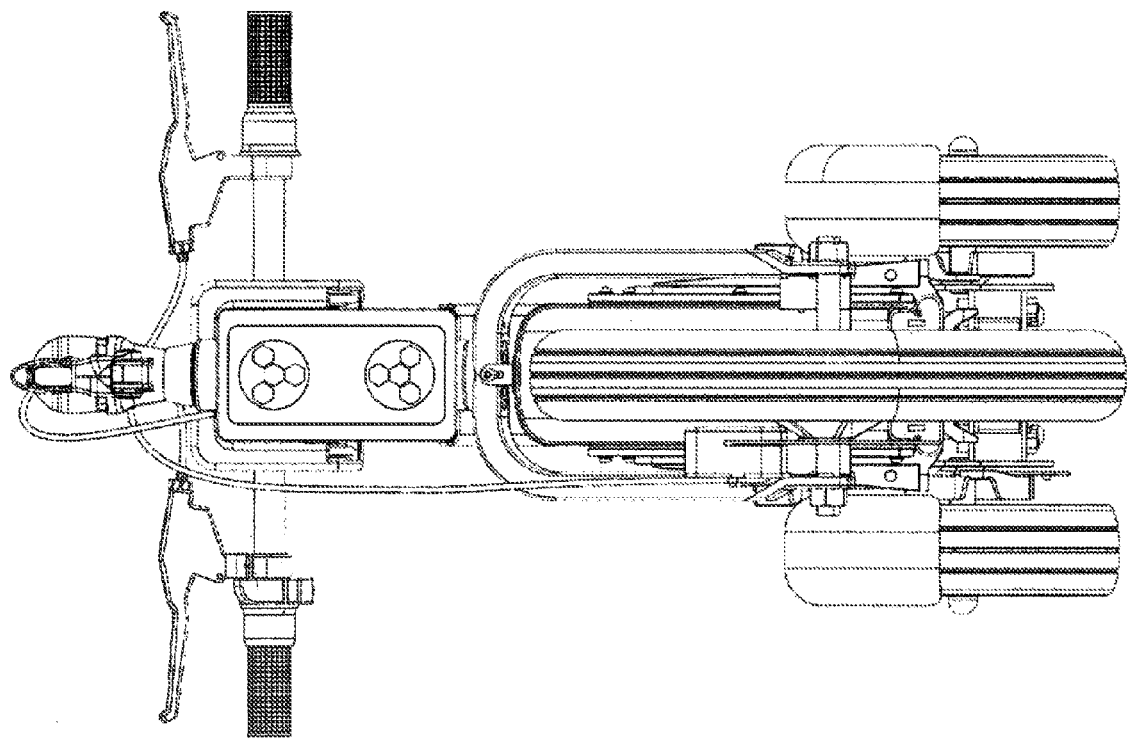
FIG. 69 illustrates a front view of the mobility device in the folded state, according to another embodiment.
Figure 71:
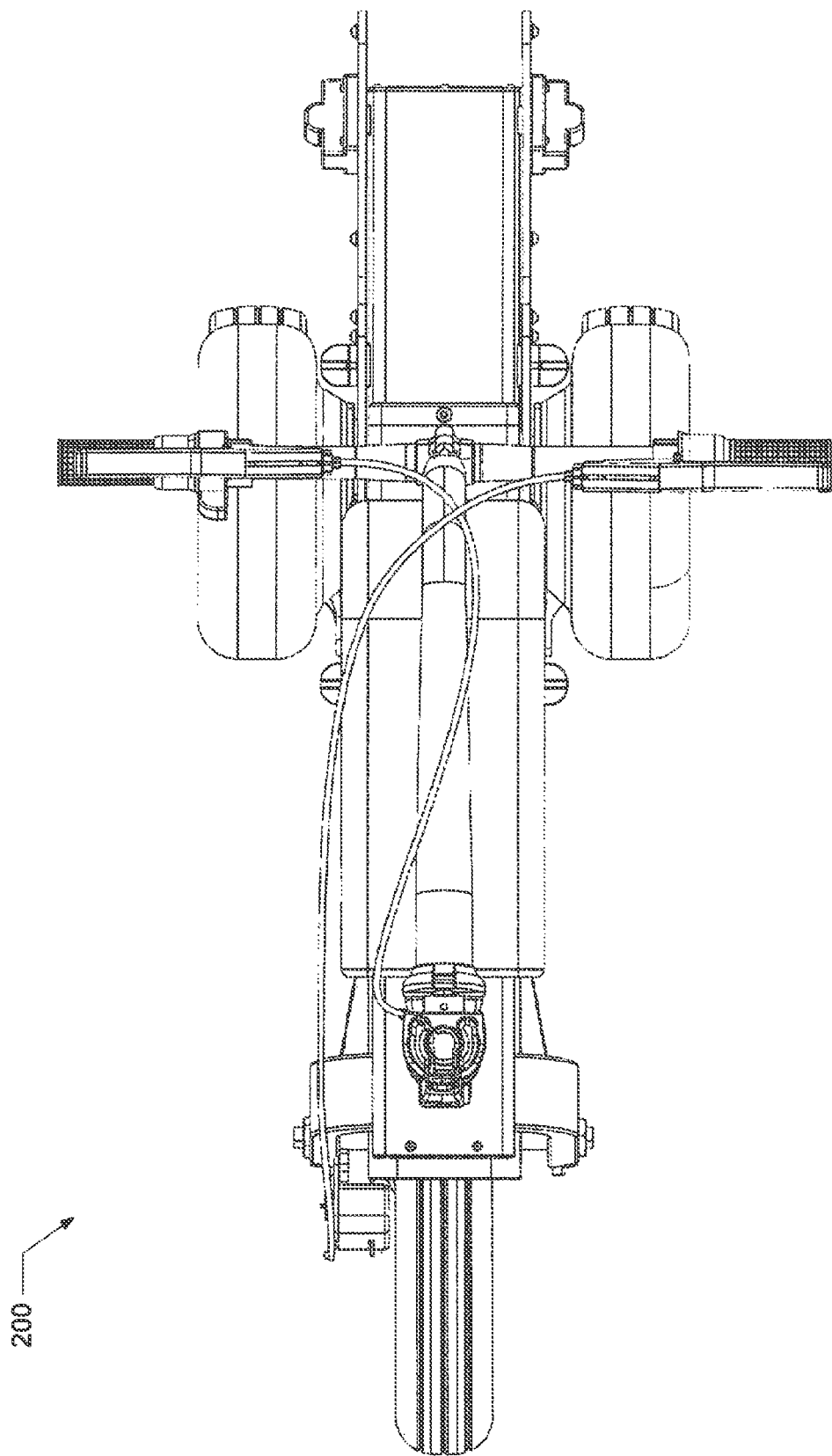
FIG. 71 illustrates a top view of the mobility device in the folded state, according to another embodiment.
Figure 72:
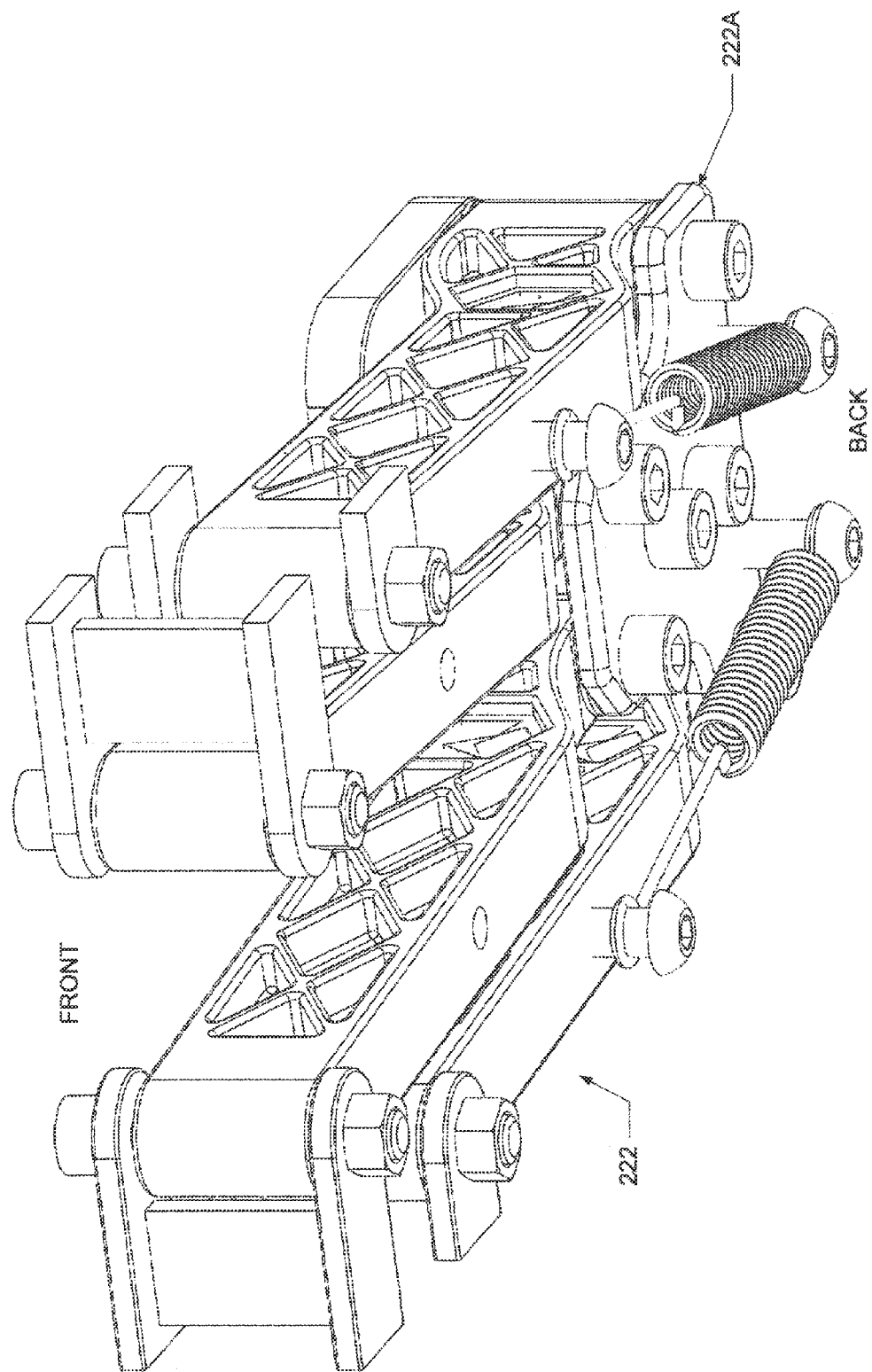
FIG. 72 illustrates an oblique view of the folding mechanism for the rear wheel assemblies in the folded position, according to another embodiment.
Figure 73:
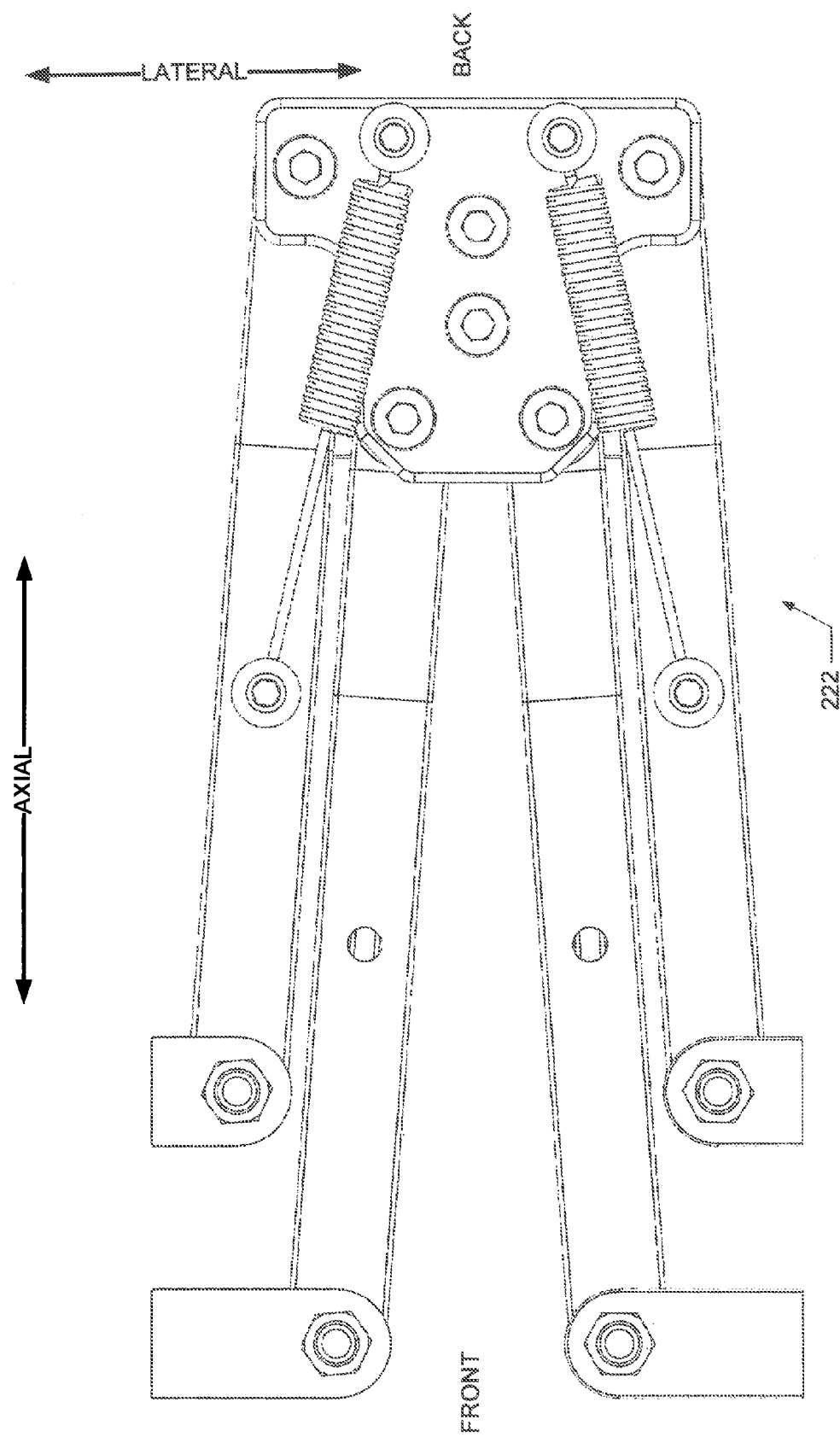
FIG. 73 illustrates a bottom view of the folding mechanism for the rear wheel assemblies in the folded position, according to another embodiment.
Figure 74:
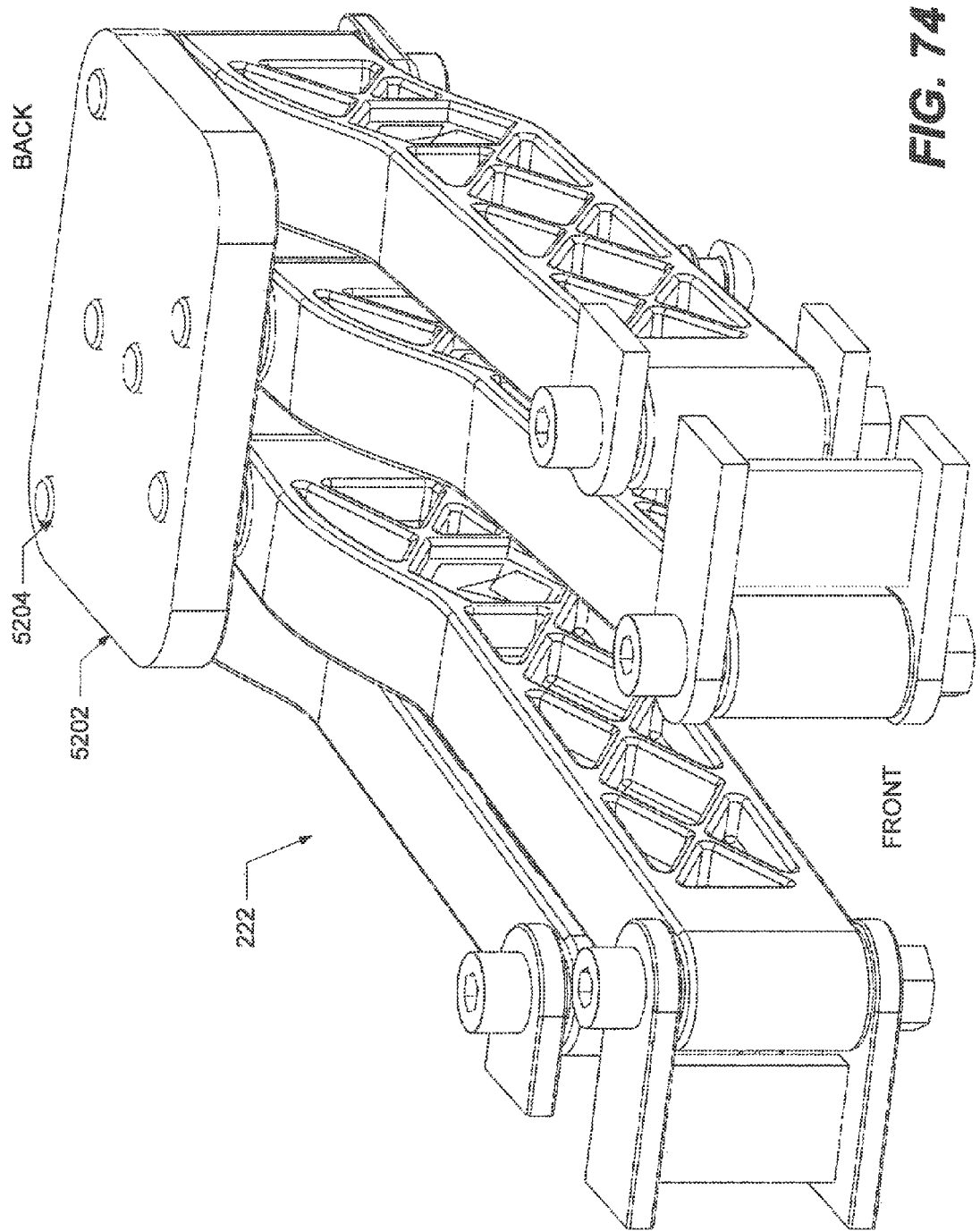
FIG. 74 illustrates an oblique view of the folding mechanism for the rear wheel assemblies in the folded position, according to another embodiment.
Figure 75:
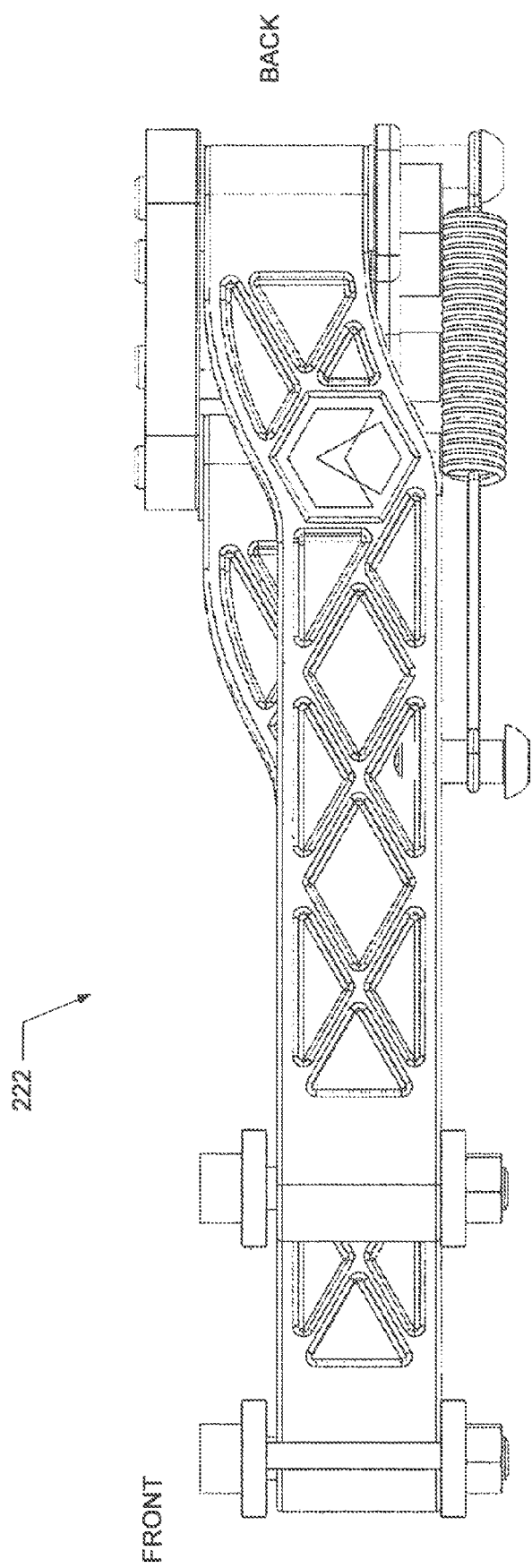
FIG. 75 illustrates a side view of the folding mechanism for the rear wheel assemblies in the folded position, according to another embodiment.

FIGS. 66-71 illustrate various views of mobility device 200 in its folded state when the components described above are converted to their folded positions, according to some embodiments. In particular, FIG. 66 illustrates a rear view of device 200 in its folded state. FIG. 67 illustrates a bottom view of device 200 in its folded state. FIG. 68 illustrates an oblique view of device 200 in its folded state. FIG. 69 illustrates a front view of device 200 in its folded state. FIG. 70 illustrates a side view of device 200 in its folded state. FIG. 71 illustrates a top view of device 200 in its folded state. Compared with its unfolded state (FIGS. 14-19), device 200 in its folded state forms a compact structure that occupies significantly less space in both the vertical and horizontal (axial and lateral) directions. When fully folded or unfolded/open, rear wheel assembly 210 can be locked in its folded or unfolded position. In one embodiment, the locking is achieved by assisting springs (see springs on FIGS. 72 and 73) at the bottom of folding mechanism 222. The springs are shorter in either the folded or fully opened position than in other positions, and thus help secure the position of the wheel and also keep the foot pads in an upright position when folded.

In addition, device 200 in its folded state has a substantially more regular overall shape, such as a rectangular shape. As a result, device 200 in its folded state is much easier to be transported and stored. In addition, device 200 provides a convenient and inexpensive transportation and/or entertainment means that may be quickly and easily deployed and unfolded when desired.

The mobility device described above may be folded up to a small footprint for easy storage in a home, office, car, bus, train, and any other locations as a user desires. Compared with conventional devices, the mobility device described herein provides the user with a more appropriate, lightweight, and streamlined means of transportation in any urban or suburban settings. The mobility device described herein may enable the user to use any form of public or personal transportation, such as a bus or car, while using the device. According to another aspect, the mobility device may be folded up for storage in a car, bus, office, home, etc. The device, when folded, may be easily and conveniently lifted, moved up/down stairs, or carried over different terrains that are impassable to other modes of transportation.

According to another aspect, a backpack accessory may be provided for the mobility device described herein and has specialized pockets for storage of extra batteries and parts of the mobility device. According to another aspect, the mobility device may allow easy customizations of the time/range by adding/subtracting optional extra batteries to/from the backpack or other parts of the device. According to another embodiment, the mobility device may be rolled or pushed by a user when under-powered or coasting.

In addition, the mobility device may further include a basket or a container mounted to, for example, the steering assembly, the chassis assembly, or the floor assembly, which allows the user to carry personal effects, groceries, work-related items, etc., for transportation. The mobility device may include mounting points for mounting many different types of baskets or other devices such as cameras, cell phones, scanners, etc.

According to another aspect, various components, such as the steering assembly, the front wheel assembly, the floor assembly, the rear wheel assembly, and the seat assembly, may each include a quick-release mechanism that allows these components or parts thereof to be easily and quickly removed from the chassis assembly for storage and transportation.

According to another embodiment, the mobility device may enable the user to comfortably travel at speeds in excess of 10 miles per hour for long periods of time (e.g., many hours) without fatigue.

According to another aspect, the mobility device may be configured to travel in reverse without using a reverse gear. For example, the front wheel assembly described above may be rotated 180 degrees by the steering assembly so as to be converted between a forward mode and a backward mode. In the forward mode, the front wheel assembly may drive the mobility device forward when the user applies the throttle. In the backward mode, the front wheel assembly may drive the mobility device backward when the user applies the throttle. The coupling and the space between the front wheel assembly and the chassis assembly are configured to allow the 180-degree rotation of the front wheel assembly. In an alternative embodiment, the rear wheel assembly may be rotated 180 degrees for conversion between the forward mode and the backward mode and operates similarly to the front wheel assembly described above.

Another aspect is the ability to use energy storage technology, which is more efficient than current energy storage offerings.

According to anther embodiment, the mobility device may include a sensor, such as an inertial-type sensor, an accelerometer, a gyroscope, etc., for controlling the device. The sensor may detect a motion or a posture of the user or the mobility device and generate a control signal accordingly. The controller may receive the control signals and control the mobility device according to the motion and/or posture. As shown in FIG. 11, mobility device 100 may further include an antenna 140 and a receiver disposed within, for example, controller 122 for receiving remote control signals from a cellphone, a smartphone, a laptop, a computer, etc. Antenna 140 and the receiver may allow the user to control mobility device 100 remotely.

According to one embodiment, the mobility device may provide the user with a means of transportation to replace a car or other forms of transportations. Alternatively, the mobility device may provide a means for the user to get from one form of public transportation to another. For example, there are often gaps in the public transportation system that may make travel inconvenient. When the user drives to a train station, a special permit may be required to park the car at the train station, thus causing it inconvenient to take the train at all. The mobility device described herein may provide the transportation between a home of the user to the train directly. The mobility device may be quickly folded or unfolded and carried on board the train easily and safely.

The mobility device is light and small enough to fit in most vehicles and, thus, may be used in parking lots, work environments, airports, shopping malls, military bases, corporate campuses, or large compounds or on public transportation. According to another embodiment, the device may be waterproof so as to allow the user to use the device in water or rain.

According to another embodiment, the mobility device may include a programmable horn. The programmable horn may be configured to generate low-volume and high-volume sounds so that it may be adapted for indoor or outdoor use as desired without startling others by gently alerting people to the oncoming device. The horn may also allow the user to customize and/or download sounds to be used as horn sounds.

A horn button may be disposed on the steering assembly or the chassis assembly of the device and allow the user to activate the horn without losing control of the device.

According to another embodiment, the mobility device may include a taillight similar to those of other vehicles. The taillight may be activated when the brake system is applied or blinked when the device is turned. The taillight may also increase visibility at night or in adverse weather conditions.

According to another embodiment, the electric motor and the brake assembly described above may be disposed in one or more of the front wheel assembly or the rear wheel assemblies.

According to another embodiment, the mobility device may include a leaning suspension that causes the device to lean into turns and still maintain full suspension travel. The floor boards may lean with the suspension. Alternatively, the hinges between the chassis assembly and the floor boards may allow the floor board to remain parallel to the ground during turning.

According to another embodiment, the mobility device may include a built-in lock that may retract into the chassis assembly. The lock may retract completely out of the way when the device is in use. When the device is not in use, the lock may be deployed to pass through the front wheel and lock back around the chassis. The lock may be locked or unlocked using a key that starts the mobility device. The lock is configured to secure all main and valuable parts as well as other properties of the user on-board the device so that the device is completely secured to an immovable object.

Compared with existing conventional devices, the mobility device described herein is relatively inexpensive and may be purchased in larger quantities. It may be folded up to a significantly smaller footprint such that it can be stored effectively with respect to costs and spaces.

The mobility device described here may serve entertainment or recreational purposes as well as provide a convenient transportation means that satisfies local regulations and rules banning other personal mobility devices. The mobility device is safe to the users and non-users and requires minimal training and skills to operate. The mobility device allows the user to conveniently mount and dismount and provides a stable and balanced platform during traveling.

In addition, the mobility device described here may operate on electrical power or other forms of clean and renewable energy or other fuels. It does not require special permits to operate and does not require parking spaces when not in use. The mobility device is light in weight and convenient to operate by both adults and minors.

When not in use, the mobility device may be folded and stored in a backpack or suitcase and hidden from plain view. Thus, the user may carry the mobility device to any public or private facilities, such as bus, train, or movie theatre, without violating the local rules and regulations. The mobility device does not require any redesign of roads, streets, or public/private facilities for proper and safe operation.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A foldable mobility device, comprising:
   a chassis assembly;
   a steering assembly rotatably coupled to the chassis assembly;
   a seat assembly coupled to the chassis assembly through a first folding mechanism configured to convert the seat assembly between a first folded position and a first unfolded position;
   a front wheel assembly coupled to the steering assembly and configured to be rotated by the steering assembly for steering the foldable mobility device;
   a first and second rear wheel assemblies coupled to the chassis assembly through a second folding mechanism configured to convert the first and second rear wheel assemblies between a second folded position and a second unfolded position; and
   a floor assembly coupled to the chassis assembly through a further folding mechanism configured to convert the floor assembly between a further folded position and a further unfolded position, the floor assembly in the further unfolded position providing a platform for accommodating a user,
   wherein, when the floor assembly, the first rear wheel assembly, and the second rear wheel assembly are unfolded, the floor assembly rests on the second folding mechanism associated with the first and second rear wheel assemblies.

2. The foldable mobility device of claim 1, wherein:
   the steering assembly includes a third folding mechanism configured to convert the steering assembly between a third folded position and a third unfolded position;
   the third folding mechanism includes a rotatable joint separating the steering assembly into an upper portion and a lower portion; and
   the upper portion is configured to be rotated between the third folded position and the third unfolded position, the upper portion being configured to rest on a top portion of the chassis assembly in the third folded position.

3. The foldable mobility device of claim 2, wherein:
   the floor assembly includes a first and second floor boards coupled to the chassis assembly through the further folding mechanism;
   the first and second floor boards are pivoted to a substantially vertical position when the floor assembly is in the further folded position; and
   the first and second floor boards are pivoted to a substantially horizontal position when the floor assembly is in the further unfolded position.

4. The foldable mobility device of claim 3, wherein each of the first and second floor boards extends vertically and rests between the chassis assembly and the respective one of the first and second rear wheel assemblies when the first and second rear wheel assemblies are folded.

5. The foldable mobility device of claim 4, wherein, when the floor assembly, the first rear wheel assembly, and the second rear wheel assembly are folded, the first rear wheel assembly and the second rear wheel assembly maintain, respectively, the first floor board and the second floor board at the further folded position.

6. The foldable mobility device of claim 3, wherein each of the first and second floor boards includes a locking member, and
   when the floor assembly, the first rear wheel assembly, and the second rear wheel assembly are unfolded, the locking member of each of the first and second floor boards is coupled to the second folding mechanism.

7. The foldable mobility device of claim 6, wherein the locking member secures the first and second rear wheel assemblies at the second unfolded position.

8. The foldable mobility device of claim 7, wherein, when the foldable mobility device is folded, the first and second floor boards are folded before the first and second rear wheel assemblies so as to release the first and second rear wheel assemblies from the second unfolded position.

9. The foldable mobility device of claim 3, wherein the second folding mechanism includes:
   a first pivoting portion coupled between the first rear wheel assembly and the chassis assembly, and
   a second pivoting portion coupled between the second rear wheel assembly and the chassis assembly.

10. The foldable mobility device of claim 9, wherein, when the first and second rear wheel assemblies are unfolded, the first and second pivoting portions extend laterally from different sides of the chassis assembly.

11. The foldable mobility device of claim 10, wherein, when the first and second rear wheel assemblies are folded, the first and second pivoting portions are pivoted forwardly and rest under the chassis assembly.

12. The foldable mobility device of claim 11, wherein, when the first and second rear wheel assemblies are folded, a lateral dimension of the second folding mechanism is substantial similar to a lateral dimension of the chassis assembly.

13. The foldable mobility device of claim 1, further comprising:
   a battery pack disposed within the chassis assembly; and
   a motor configured to receive electrical power from the battery pack and drive at least one of the front wheel assembly, the first rear wheel assembly, or the second rear wheel assembly.

14. The foldable mobility device of claim 13, wherein the motor is disposed within a wheel hub of the at least one of the front wheel assembly, the first rear wheel assembly, or the second rear wheel assembly.

15. The foldable mobility device of claim 1, wherein the second folding mechanism includes a spring that is shorter at fully folded and unfolded positions than other positions between the fully folded and unfolded positions.

16. The foldable mobility device of claim 1, wherein, when the floor assembly, the first rear wheel assembly, and the second rear wheel assembly are unfolded, the second folding mechanism provides vertical support to maintain the floor assembly in the further unfolded position.

* * * * *